US012754748B1

(12) United States Patent
Puvvadi et al.

(10) Patent No.: US 12,754,748 B1
(45) Date of Patent: Oct. 6, 2026

(54) AGENTS FOR FOUNDATION MODELS

(71) Applicant: Amazon Technologies, Inc., Seattle, WA (US)

(72) Inventors: Meghana Puvvadi, Redmond, WA (US); Tania Khattar, Bellevue, WA (US); Santosh Kumar Ameti, Bellevue, WA (US); Harshal Pimpalkhute, Redmond, WA (US); Kartik Natarajan, Shoreline, WA (US); John Baker, Bellevue, WA (US); Chethan Krishna Nagaraja Rao, Bellevue, WA (US); Rama Krishna Sandeep Pokkunuri, Redmond, WA (US); Atul Deo, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 186 days.

(21) Appl. No.: 18/593,524

(22) Filed: Mar. 1, 2024

Related U.S. Application Data

(60) Provisional application No. 63/509,500, filed on Jun. 21, 2023.

(51) Int. Cl.
*G06F 17/00* (2019.01)
*G06F 9/451* (2018.01)

(52) U.S. Cl.
CPC .................................... *G06F 9/451* (2018.02)

(58) Field of Classification Search
CPC ....................................................... G06F 9/451
See application file for complete search history.

(56) References Cited

U.S. PATENT DOCUMENTS

2014/0108506 A1* 4/2014 Borzycki ............ H04L 67/1095 709/204
2019/0377853 A1* 12/2019 Obaidi .................... G06F 21/32
2020/0023862 A1* 1/2020 Rodriguez Bravo .... G07C 9/38
2024/0259190 A1* 8/2024 Karthikeyan ...... G06Q 30/0225

OTHER PUBLICATIONS

Franck Le et al., Rethinking data-driven networking with foundation models: challenges and opportunities. In Proceedings of the 21st ACM Workshop on Hot Topics in Networks. Association for Computing Machinery, 188-197, <https://doi.org/10.1145/3563766.3564109>, Nov. 2022.*

Steven I. Ross et al., The Programmer's Assistant: Conversational Interaction with a Large Language Model for Software Development. In Proceedings of the 28th International Conference on Intelligent User Interfaces. Asso. for Computing Machinery, 491-514. <https://doi.org/10.1145/3581641.3584037>, Mar. 2023.*

Amazon Bedrock API Reference, Amazon Web Services, Inc., 2023.

Amazon Bedrock User Guide, Amazon Web Services, Inc., 2023.

* cited by examiner

*Primary Examiner* — Greta L Robinson

(74) *Attorney, Agent, or Firm* — Knobbe, Martens, Olson & Bear, LLP

(57) ABSTRACT

Disclosed are various embodiments for configuring and orchestrating agents of a foundation model. Various embodiments of the present disclosure can receive a selection of a foundation model from a plurality of foundation models. Various embodiments can also receive action information about an application programming interface (API) and receive knowledge base information. Various embodiments can then generate an agent prompt based at least in part on the selection of the foundation model, the action information, and the knowledge base information, then deploy an agent.

20 Claims, 39 Drawing Sheets

AGENTS FOR FOUNDATION MODELS

CROSS-REFERENCE TO RELATED APPLICATIONS

This application claims the benefit of and priority to U.S. Provisional Application No. 63/509,500 filed on Jun. 21, 2023, entitled "CLOUD-BASED MANAGED SERVICES FOR FOUNDATION MODELS AND ASSOCIATED APPLICATIONS," the contents of which are incorporated by reference in their entirety herein and reproduced as APPENDIX A to this application.

BACKGROUND

Neural network models, such as transformer-based models, have become increasingly more capable in solving complex problems in various domains in recent years. Some large models can have billions of parameters. Training and executing the models, as well as applications built using the models, can require substantial computing resources. Further, some models have been trained to communicate with certain application programming interfaces (APIs). However, configuring a model to communicate with APIs has been burdensome and requires substantial effort to ensure that the model is correctly configured.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to preparing foundation models, such as large language models (LLMs) and/or small language models (SLMs) using resources of a cloud provider network or cloud computing environment, to run agents, such as a chat bot, that can execute actions on application programming interfaces (APIs) or access predefined information (knowledge bases) to effectuate a client's needs. Foundation models (such as LLMs or SLMs) can receive input (e.g., text input, sound input, video input, etc.), interpret the contents, and provide a possible response to the input. However, foundation models have been limited to providing simplistic responses for which it was already trained, but the foundation models could not reach out to the world to perform various actions. For example, a foundation model may be able to provide information about a hotel if the foundation model was trained with information describing the hotel, however the foundation model would not have been able to assist a client book a room at that hotel. Accordingly, the scope of concerns for foundation models has been limited to providing basic responses without performing additional actions.

Further, configuring foundation models is often challenging. Often, technical specialists would have to manually configure foundation models according to developer specifications, which can be costly and confusing for a layperson. Configuring a foundation model to act as an agent for a hotel chain, for example, could be time consuming and require various data scientists, programmers, or other technical specialists to ensure that the foundation model acts as expected. Accordingly, a need exists for configuring a foundation model that can be simplified for everyday users without the need of technical specialists.

Various embodiments of this disclosure are directed to configuring a foundation model to act as an agent and perform various actions that interact with the real world, like invoking APIs to perform various business functions. Various embodiments of this disclosure make it easy to create and deploy fully managed agents that execute complex business tasks by dynamically invoking APIs and knowledge bases. Embodiments of the present disclosure automatically create base prompts, performs orchestration, and retrieves data with very minimal agent instruction and tools. Such embodiments make configuring foundation models that can perform various activities, such as invoking APIs to perform various business functions, easier for the average user, without requiring technical specialists to configure everything manually. In the following discussion, a general description of the system and its components is provided, followed by a discussion of the operation of the same.

Figure 1:
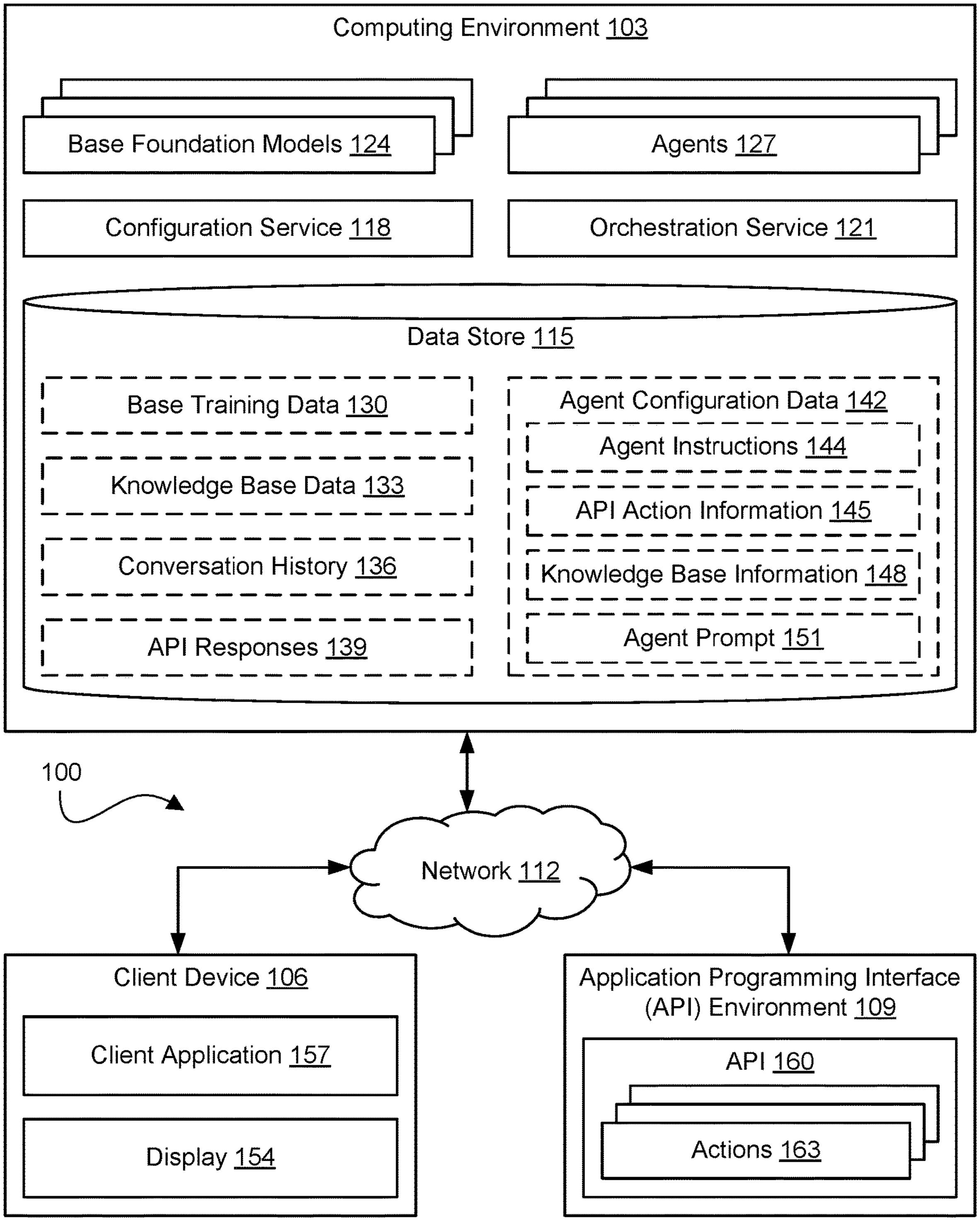
FIG. 1 is a drawing of a networked environment according to various embodiments of the present disclosure.

With reference to FIG. 1, shown is a networked environment 100 according to various embodiments. The networked environment 100 includes a computing environment 103, a client device 106, and Application Programming Interface (API) environment 109, which are in data communication with each other via a network 112. The network 112 includes, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, and other types of networks.

The computing environment 103 can include, for example, a server computer or any other system providing computing capability. Alternatively, the computing environment 103 can employ a plurality of computing devices that can be arranged, for example, in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource and/or any other distributed computing arrangement. In some cases, the computing environment 103 can correspond to an elastic computing resource where the allotted capacity of processing, network, storage, or other computing-related resources can vary over time.

Various applications and/or other functionality can be executed in the computing environment 103 according to various embodiments. Also, various data can be stored in a data store 115 that can be accessible to the computing environment 103. The data store 115 can be representative of a plurality of data stores 115 as can be appreciated. The data stored in the data store 115, for example, can be associated with the operation of the various applications and/or functional entities described below.

The components executed on the computing environment 103, for example, can include a configuration service 118, an orchestration service 121, one or more base foundation models 124 (generically as "a base foundation model 124"), one or more agents 127 (generically as "an agent 127"), and other applications, services, processes, systems, engines, or functionality not discussed in detail herein.

The term "foundation model" can refer to large neural network-based machine learning (ML) models. A foundation model can be trained initially (also call "pre-trained") using enormous amounts of data, such as the base training data 130. The resulting pre-trained foundation model can be a base foundation model 124 that can learn enough about the input to be relatively easily adapted for many different downstream tasks. The base foundation model 124 can also be referred to as a pre-trained foundation model, a baseline foundation model, or a core foundation model to distinguish them from fine-tuned or configured instances of foundation models, also referred to as agents 127. In some embodiments, a base foundation model 124 can be fine-tuned one or more times. In some embodiments, a base foundation model 124 can further be configured to execute to a specified computing device or computing devices, such as the computing environment 103.

The base foundation models 124 can be referred to as "large" because of the number of parameters that they each comprise (e.g., billions or more parameters). The base foundation models 124 can be referred to as "foundation" models in a sense that they can provide a foundation for performing many different kinds of inference or prediction tasks. Some base foundation models 124 can be large language models (LLMs) and/or small language models (SLMs), which can be pre-trained using natural language inputs, are a type of foundation model that can be used for a variety of applications including summarization, question-answering chatbots, classification and the like. Pre-training of foundation models may often use unsupervised, self-supervised or semi-supervised training techniques. A base foundation model 124 may be fine-tuned (e.g., using a relatively small amount of labeled examples) or configured by a configuration service 118 for specific use cases and specific problem domains, although the base foundation model 124 can itself be able to perform high-quality inference tasks in many cases.

A base foundation model 124 can be fine-tuned or otherwise configured to become an agent 127. In some embodiments, a base foundation model 124 and an agent 127 can be otherwise identical. In some embodiments, base foundation models 124 and agents 127 can differ only in that the agent 127 is more finely-tuned to effectuate a specific business purpose when compared to a corresponding base foundation model 124. In some embodiments, a base foundation model 124 can be trained using various prompts to configure an agent 127. The configuration service 118 can configure a base foundation model 124 using the agent configuration data 142 to generate an agent 127. By doing this, the agent 127 can be more narrowly tailored to perform specific functions as configured by the client. For example, a client may wish to configure an agent that can communicate with customers to manage their hotel bookings. The agent 127 can be configured to prompt the customers or obtain certain information from the customers in a way that the base foundation model 124 would not have without the additional fine-tuning of the configuration. The agent 127 can be configured to understand when the foundation model should seek external information (e.g., by executing an API action, by accessing a knowledge base, etc.). Further discussion of configuring an agent 127 is further described with reference to FIG. 5.

Figure 2:
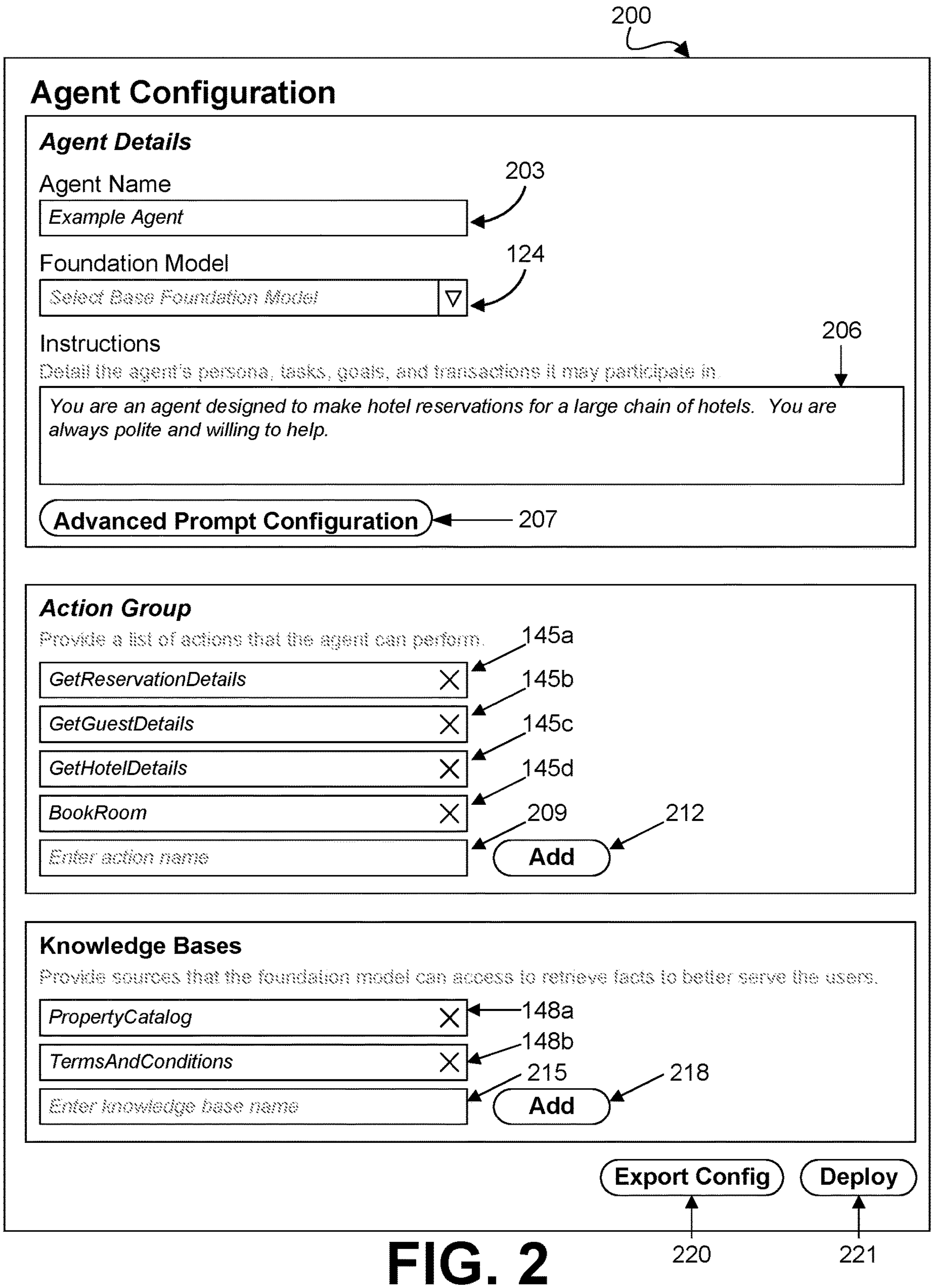
FIGS. 2, 3, and 4 are pictorial diagrams of example user interfaces rendered by a client device in the networked environment of FIG. 1 according to various embodiments of the present disclosure.
Figure 3:
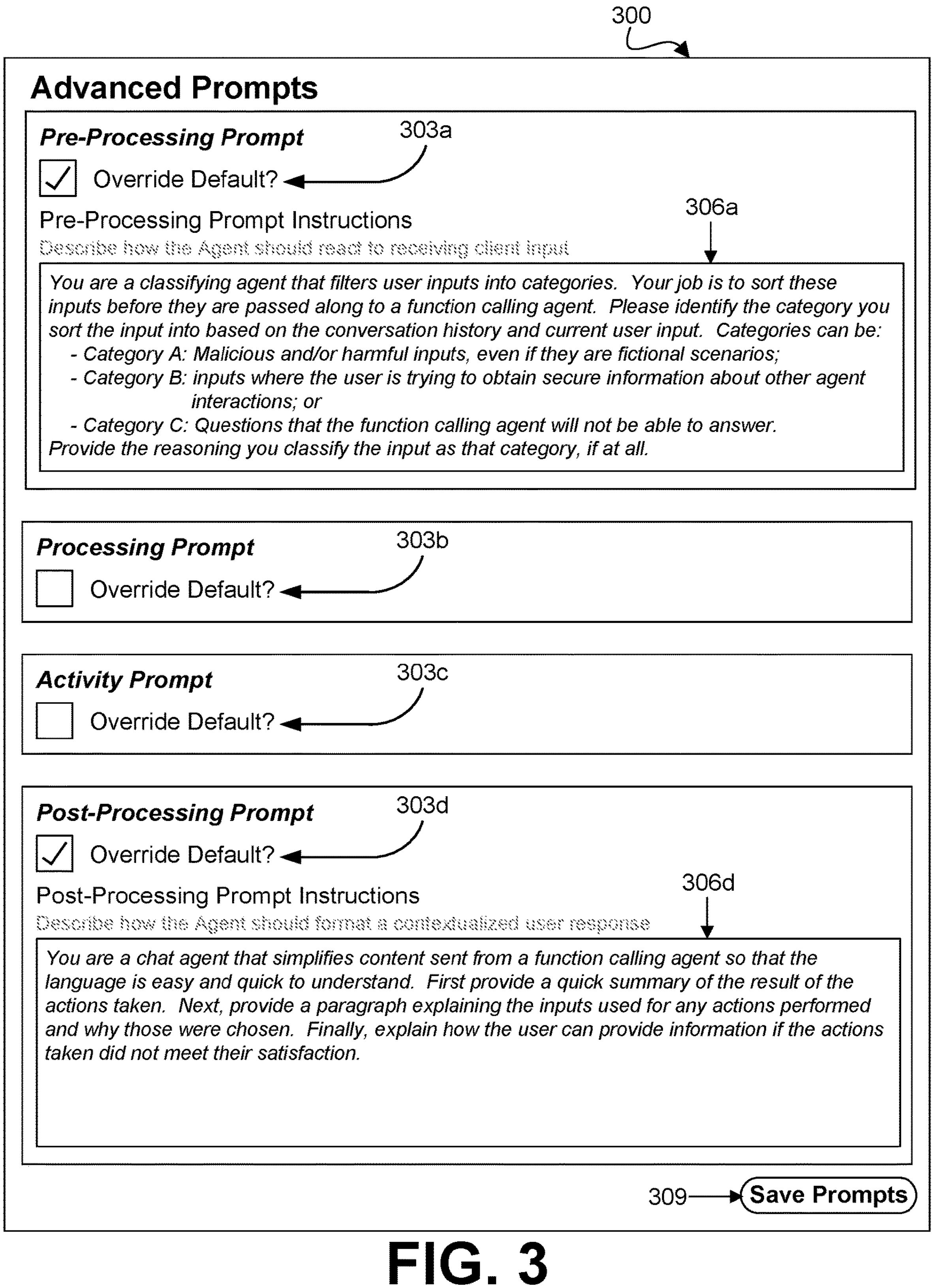

The configuration service 118 can be executed to configure a base foundation model 124 to become an agent 127. The configuration service 118 can be used to set up an agent 127 by obtaining various information corresponding to the agent configuration data 142. For instance, the configuration service 118 can receive a selection of a base foundation model 124, API action information 145 (e.g., API connection information, API parameters and schema, description for when certain actions of the API should be invoked, etc.), knowledge base information 148 (e.g., knowledge base storage location, types of information stored, etc.), and various other information. FIGS. 2 and 3 represent pictorial diagrams of user interfaces that can be used to collect the agent configuration data 142 for the configuration service 118. Using the agent configuration data 142, the configuration service 118 can generate an agent prompt 151, which can be used to configure a base foundation model 124 to make an agent 127. The configuration service 118 can then deploy the agent 127 configured with the agent prompt 151.

Once the configuration service 118 has deployed the agent 127, the orchestration service 121 assists the agent 127 in handling client input to generate results for the end user. If the agent 127 needs additional configuration to be more specialized or to better suit the business needs of the client, then the configuration service 118 can be used to continue configuring the agent 127. In various embodiments, a snapshot can be taken of the agent 127 to create a versioned instance of the foundation model, also called a versioned agent. A snapshot of the agent 127 can be stored as any other agent 127. In various embodiments, a snapshot of an agent 127 can be immutable, such that no further configurations can be made to the snapshot. In some embodiments, agents 127 can be mutable, such that further configuration can be made. Once a client has tested an agent 127 and the client believes that a specified version or a specified snapshot of the agent 127 is suitable for production, the configuration service 118 can be used to publish the versioned agent 127.

A published version of the agent 127 can be exported by a client and/or shared from the configuration service 118 such that various clients can now utilize, deploy, and/or implement the agent 127 for their own uses. In at least some embodiments, the configuration service 118 can set permissions on the agent 127 to share the agent 127 with various other clients. In some embodiments, the agent configuration data 142 can be downloaded (e.g., as a JSON file, as a ZIP file, etc.) by a client application 157 and/or shared by the configuration service 118. Further discussion of the functionality of the configuration service 118 is further described with reference to FIG. 5.

The orchestration service 121 can be executed to coordinate communications between an end user, an agent 127, an API environment 109, and information stored in the data store 115, such as knowledge base data 133 and conversation histories 136. For example, the orchestration service 121 can receive input from a client device and pre-process the client input (e.g., validate that the input is the type of input for which the agent 127 is capable of providing a valid answer, cleaning of formatting the input data, etc.). The orchestration service 121 can then send the client input to the agent 127.

For each response from an agent 127 or otherwise, the orchestration service can "log" or "commit to a trace" any action or response, such that a client or an agent 127 can receive the step by step actions being orchestrated. The trace or log can help a client follow the reasoning process of the agent 127 that leads the agent 127 to the response it gives at that point in the conversation. In various embodiments, there can be traces at various different events. For example, there could be a trace that is logged before or after pre-processing user input, before or after processing the user input, before or after, performing the API action or accessing the knowledge base, before or after contextualizing a response to the client, and/or after a failure has occurred.

In some embodiments, the agent 127 can provide a response indicating that an activity should be performed (e.g., invoke an API, access a knowledge base, etc.). In such embodiments, the orchestration service 121 can parse the activity request from the agent 127 to discern what activity the orchestration service should perform. The orchestration service 121 can then perform the activity (e.g., invoke an API, access a knowledge base, etc.) on behalf of the agent 127. In various embodiments, the activity can result in a response (an "activity response"). For instance, an API can return a JSON-formatted activity response that indicates the result of perform the API action along with providing additional information to the end user. In various embodiments, the orchestration service 121 can format an activity response so that the agent 127 receives consistently formatted activity responses. In some embodiments, the orchestration service 121 can perform a plurality of activities, as instructed by the agents 127. In such embodiments, the orchestration service 121 can perform each of the activities (e.g., invoking an API, accessing a knowledge base, etc.) until each of the activities has been completed. In various embodiments, the activity response(s) can be sent to the agent 127.

In various embodiments, the agent 127 can provide a request indicating that a response should be sent to the client device (a "client communication request"). An agent 127 can provide the orchestration service 121 with a client communication request in response to receiving the client input or in response to receiving an activity response. The orchestration service 121 can then send the client communication request to the client device 106 and wait for additional client input from the client device. Further discussion of the functionality of the orchestration service 121 is further described with reference to FIG. 6.

The data stored in the data store 115 can include, for example, base training data 130, knowledge base data 133, conversation histories 136, API responses 139, agent configuration data 142, and potentially other data. The base training data 130 can represent data sources or data corpuses to train a base foundation model 124. In at least some embodiments, the base training data 130 can represent a substantially large number of text tokens used to train a base foundation model 124. In some embodiments, base training data 130 can also include some base prompts that can assist the agent 127 become better prepared to act as a chat agent. For instance, the base training data 130 can include information about how to greet people when first initiating a conversation, information about blacklisted language or blacklisted topics, information about ensuring digital security over the internet (e.g., not sharing passwords, and information about not disclosing confidential information, etc.). The information of the base training data 130 can be used as a way to make configuring the base foundation models 124 to an agent 127 more streamlined. Additional information can be stored in the base training data 130.

The knowledge base data 133 can represent a set of facts, configurable by the client, for which an agent 127 can reference real-time (using the orchestration service 121) to provide a factually-grounded client communication request. In various embodiments, knowledge base data 133 can be represented as a key-value store, where the key can represent a question, a topic, an index, or a concept, and the value can represent an answer, an explanation of the topic, indexed data, or details on a concept, respectively. In some embodiments, knowledge base data 133 can be tokenized data derived from pre-existing files, such as company policy documents or other types of documents. Knowledge base data 133 can be modified without affecting the configuration of an agent 127, thus allowing clients to easily update information that the agent 127 would deliver without re-deploying a new agent of the agent 127. In at least some embodiments, knowledge base data 133 can be shared by and/or accessed by multiple agents 127.

The conversation history 136 can represent a detailed log of interactions between a client and an agent 127. For instance, when a client device sends client input to the orchestration service 121, the orchestration service 121 can log the client input in the conversation history. The orchestration service 121 can also log into the conversation history 136 that the orchestration service 121 has sent the client input to an agent 127. The orchestration service 121 can also log any response from the agents 127 within the conversation history. In some embodiments, the agent 127 can direct the orchestration service 121 to perform an activity (e.g., invoking an API, accessing a knowledge base, etc.), and requests and responses made to perform the activity can be logged to the conversation history 136. The conversation history 136 can also be used to display a user-friendly conversation to the client device 106. In such situations, portions of the conversation history 136 can be redacted to make reviewing the information more user-friendly. The conversation history 136 can be used by an agent 127 to identify information to perform activities (e.g., invoking an API, accessing a knowledge base, etc.). For example, if a client asks the agent 127 to book a hotel room, the agent 127 can access the conversation history 136 to determine if all the necessary information has been provided to initiate the corresponding API action to book a hotel room, such as the hotel they want to stay at, the number of nights, how many rooms, how many people, etc.

The API responses 139 can represent a response provided as a result of invoking an API as an activity on behalf of the agent 127. Although API responses 139 can be logged in the conversation history 136 if the API responses are text, responses from an API that return documents or multimedia files would need to be logged in the conversation history 136 by reference to their corresponding file as an API response 139 file.

The agent configuration data 142 can represent various types of information used to configure a base foundation model 124 to become an agent 127. In at least some embodiments, the agent 127 can be configured to act as a chat agent. The agent configuration data 142 can include, for example, agent instructions 144, API action information 145, knowledge base information 148, an agent prompt 151, and potentially other data. For instance, the agent configuration data 142 can also include a name for the agent 127, a selection of the base foundation model 124, any agent instructions 144 that detail an persona, tasks, goals, and transactions that the agent 127 can participate in, and various other types of information. In at least some embodiments, the agent configuration data 142 (in whole or in part) can be exported and/or imported to the data store 115 by the configuration service 118. In at least some embodiments, the agent configuration data 142 (in whole or in part) can be shared with various clients such that the various clients can deploy an agent 127 based on the agent configuration data 142. As previously mentioned, the agent configuration data 142 can be exported, imported, and/or shared in whole or in part, which means agent information 144, API action information 145, knowledge base information 148, and the agent prompt 151 can be shared separately or jointly to one or more clients.

The agent information 144 can include various types of information that can be used to provide guidance, instruction, or identity to an agent 127. For instance, agent information 144 can include an agent name and a persona prompt. A personal prompt can be used to provide context to the agent 127 when providing any response. For example, a persona could be "an agent to assist in booking hotel rooms. You are nice and polite." The first sentence of the persona could be used by the agent 127 to make certain selections of language that other agents that assist in booking hotel rooms might use, if that information is available to the agent 127. The second sentence of the persona could also be used by the agent 127 to ensure that responses provided do not provide mean or inappropriate responses. The agent information 144 can also include configuration for specific prompts. For example, when a client device 106 provides client input to the orchestration service 121, the orchestration service 121 can wrap the client input with a specific prompt to inform the agent 127 that the following information is coming from a client. A specific prompt can include various types of information about clients, contextual information, placeholder spots for knowledge base data 133, placeholder spots for conversation histories 136, placeholder spots for API responses 139, and various other information. Specific prompts can be used for and differentiated by any time the orchestration service 121 interacts with the agent 127. For example, there could be a specific prompt for when a user provides input, there could be a specific prompt for when an API 160 provides an API response 139, there could be a specific prompt for when knowledge base data 133 is to be sent to an agent 127, there could be a specific prompt for requesting a specific type of response from the agent 127, or various other points in which the orchestration service 121 and the agent 127 interact.

The API action information 145 can represent a subset of the agent configuration data 142 that pertains to how the agent 127 can interact with external APIs, such as an API 160 on the API environment 109. The API action information 145 can include an action name, an API endpoint (e.g., network address, etc.), a specified function/method to call on the API, an API schema, instructions for when the agent 127 should invoke this action, and how to format the response from the API to the agent 127.

An API schema can detail any of the available method calls available on the API, along with any necessary and optional parameters. The API action information 145 can represent information related to one or more API actions that the agents 127 can utilize. The API schema could be formatted in accordance with a specified API format, such as the OpenAPI Schema JSON format, API Blueprint, or RESTful API modeling language (RAML) format. The API schema could also be represented as a Web Services Description Language (WSDL) format, other XML-based formats, or any format to convey the information about the functionality and parameters of the API. As an example for an API schema that describes an "Insurance Claims Automation API," the following API schema is formatted with OpenAPI Schema JSON format: {"openapi": "3.0.0", "info": {"title": "Insurance Claims Automation API", "version": "1.0.0", "description": "APIs for sending reminders to policy holders for insurance claims."}, "paths": {"/send-reminders": {"post": {"summary": "API to send reminder to the customer about pending documents for open claim", "description": "Send reminder to the customer about pending documents for open claim. The API takes in only one claim id and its pending documents at a time, sends the reminder and returns the tracking details for the reminder. This API should be called for each claim id you want to send reminders for.", "operationId": "sendReminders", "requestBody": {"required": true, "content": {"application/json": {"schema": {"type": "object", "properties": {"claimId": {"type": "string", "description": "Unique ID of open claims to send reminders for."}, "pendingDocuments": {"type": "string", "description": "The list of pending documents for the claim."}, "required": ["claimId", "pendingDocuments"]}}}}, "responses": {"200": {"description": "Reminders sent successfully", "content": {"application/json": {"schema": {"type": "object", "properties": {"sendReminderTrackingId": {"type": "string", "description": "Unique Id to track the status of the send reminder Call"}, "sendReminderStatus": {"type": "string", "description": "Status of send reminder notifications"}}}}}}, "400": {"description": "Bad request. One or more required fields are missing or invalid."}}}}}}.

The knowledge base information 148 can represent a subset of the agent configuration data 142 that pertains to how the agent 127 can interact with and obtain knowledge base data 133. The knowledge base information 148 can include a knowledge base endpoint (e.g., within a data store 115, a uniform resource locator (URL), a network address, etc.), the name of the knowledge base, the type of information that is contained within the knowledge base information 148, and various other information.

The agent prompt 151 can represent at least a portion of a prompt used to configure a base foundation model 124 to an agent 127. The agent prompt 151 can be a prompt that can assist an agent 127 perform a certain prompt strategy. In some embodiments, the agent prompt 151 can be a chain of thought prompt, which provides context to an agent 127 to better make a logical flow of decisions. In some embodiments, the agent prompt 151 can be a plan and solve prompt, such that the agent prompt 151 can better assist the agent 127 select and implement specified algorithms, adjust parameters, and refine the agent 127 to optimize performance. In some embodiments, the agent prompt 151 can be a tree of thought prompt, such that the agent prompt 151 provides a hierarchy of concepts that branch into more specified concepts, thus allowing the agent 127 to breakdown complex topics according to the tree structure. Other prompt strategies can also be used to configure and fine-tune a base foundation model 124 to become an agent 127.

In various embodiments, the agent prompt 151 can be text that is provided to a base foundation model 124. The configuration service 118 can then compile the information into a directive for the base foundation model 124 to ingest to become more specialized in its tasks. For example, a client provides an agent persona description (e.g., "You are a travel booking agent; You are friendly polite and can help users with their travel needs", etc.), adds API action information (e.g., "BookHotelRoom" action, etc.), and adds knowledge base information 148 (e.g., Hotel Policies and Procedure documents, etc.) to the agent configuration data 142. With the aforementioned agent configuration data 142, a configuration service 118 can create an agent prompt 151, such as "You are a travel booking agent; You are friendly polite and can help users with their travel needs. You can use the APIs BookHotelRoom for reservation actions. Lastly, you can pull up information about hotel policies from the HotelPolicyDetails knowledge source." Although this is a simplistic example, the agent prompt 151 can be very detailed based at least in part on the agent configuration data 142.

The client device 106 is representative of a plurality of client devices that can be coupled to the network 112. The client device 106 can include, for example, a processor-based system such as a computer system. Such a computer system can be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 can include a display 154. The display 154 can include, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 can be configured to execute various applications such as a client application 157 and/or other applications. The client application 157 can be executed in a client device 106, for example, to access network content served up by the computing environment 103 and/or other servers, thereby rendering a user interface on the display 154. To this end, the client application 157 can include, for example, a browser, a dedicated application, etc., and the user interface can include a network page, an application screen, etc. The client device 106 can be configured to execute applications beyond the client application 157 such as, for example, email applications, social networking applications, word processors, spreadsheets, and/or other applications.

The API environment 109 can include, for example, a server computer or any other system providing computing capability. Alternatively, the API environment 109 can employ a plurality of computing devices that can be arranged, for example, in one or more server banks or computer banks or other arrangements. Such computing devices can be located in a single installation or can be distributed among many different geographical locations. For example, the API environment 109 can include a plurality of computing devices that together can include a hosted computing resource, a grid computing resource and/or any other distributed computing arrangement. In some cases, the API environment 109 can correspond to an elastic computing resource where the allotted capacity of processing, network, storage, or other computing-related resources can vary over time.

Various applications and/or other functionality can be executed in the API environment 109 according to various embodiments. The components executed on the API environment 109, for example, can include an API 160, and other applications, services, processes, systems, engines, or functionality not discussed in detail herein.

An API 160 is a set of rules and protocols that allow different software applications to communicate and interact with each other. An API 160 can define methods and data formats that the applications can use to request and exchange information. APIs 160 can enable developers to access specific functionalities or data from a service, library, or platform, fostering interoperability between different software systems. The API 160 can be executed to perform one or more actions 163 (generically as "an action 163"). In some embodiments, an API 160 can be viewed as a collection of one or more independent actions 163 that can be invoked to perform some needed functionality. In some embodiments, an action 163 can only be invoked if one or more parameters are passed to the action 163. For instance, an API 160 that includes an action 163 to get reservation details in a hotel may require a reservation number or other identifying information about the stay of the user. In various embodiments, an API schema can detail available actions 163 on the API 160, along with any necessary and optional parameters. The API schema could be formatted in accordance with a specified API format, such as the OpenAPI Schema JSON format, API Blueprint, or RESTful API modeling language (RAML) format. The API schema could also be represented as a Web Services Description Language (WSDL) format, other XML-based formats, or any format to convey the information about the functionality and parameters of the API. In at least some embodiments, the API 160 actions 163 can be Amazon Web Services Lambda functions, which can be executed to perform specified functions just like any other API.

Next, a general description of the operation of the various components of the networked environment 100 is provided. To begin, FIGS. 2 and 3 represent pictorial diagrams of example user interfaces received from the computing environment 103 that can be rendered by a client application 157 to a display 154 on a client device 106. The example user interfaces of FIGS. 2 and 3 could also be rendered to the display 154 on the client device 106 by a web browser, an email client, or part of a standalone application.

FIG. 2 depicts a first user interface 200 that allows a client to configure an agent 127. In a first portion of the first user interface 200, the client can enter an agent name at the agent name text input box 203. The first user interface 200 also includes a select box that allows the client to select a base foundation model 124 from a plurality of base foundation models 124. Next, the first user interface 200 can include an instructions text box 206, where the client can enter details regarding the agent instructions 144 such as the agent's persona, tasks, goals, and transactions that the agent 127 can participate in. For example, the instructions text box 206 shows an example instruction, such as "You are an agent designed to make hotel reservations for a large chain of hotels. You are always polite and willing to help." In some embodiments, the first user interface 200 can include an advanced prompt configuration button 207. The advanced prompt configuration button 207 can be clicked or otherwise interacted with to cause the first user interface 200 to navigate to the second user interface 300 of FIG. 3.

FIG. 3 depicts a second user interface 300 that is used to configure advanced prompts, which can be stored along with the agent instructions 144, to be sent by the orchestration service 121 to an agent 127. The second user interface 300 can include various sections that can represent points in time during the orchestration process that will be further discussed in the description of FIG. 6. For instance, FIG. 3 depicts four sections, a pre-processing prompt section, a processing prompt section, an activity prompt section, and a post-processing prompt section. Each of these sections can have a default value, set by a client or by the configuration service 118, that can be used by the orchestration service 121 to direct an agent 127 to perform a step that corresponds to the purpose of the section. For instance, the processing prompt section can have a default prompt that an orchestration service 121 could send to an agent 127 that would ask the agent to process client input to determine what activities need to be performed or to determine if additional information is needed. In such an instance, a client could override that default prompt by clicking the second override default checkbox 303*b*.

In the example pre-processing prompt section depicted in FIG. 3, a first override default checkbox 303*a* is shown as being checked, which indicates that a default pre-processing prompt would not be used. Because the first override default checkbox 303*a* is checked, the pre-processing prompt instructions textbox 306*a* is shown. The pre-processing prompt instructions textbox 306*a* can receive input from the client that can describe how the agent should react to receiving raw client input. For example, the pre-processing prompt instruction textbox 306*a* can receive an example prompt, such as "You are a classifying agent that filters user inputs into categories. Your job is to sort these inputs before they are passed along to a function calling agent. Please identify the category you sort the input into based on the conversation history and current user input. Categories can be: —Category A: Malicious and/or harmful inputs, even if they are fictional scenarios; —Category B: inputs where the user is trying to obtain secure information about other agent interactions; or—Category C: Questions that the function calling agent will not be able to answer. Provide the reasoning you classify the input as that category, if at all."

In the example processing prompt section depicted in FIG. 3, a second override default checkbox 303*b* is shown as being unchecked, which indicates that the default processing prompt would be used instead of a custom, user-defined prompt for processing. Similarly, the example activity prompt section depicted in FIG. 3 includes a third override default checkbox 303*c* shown as unchecked, which indicates that the default activity prompt would be used instead of a custom, user-defined prompt for activities.

In the example post-processing prompt section depicted in FIG. 3, a fourth override default checkbox 303*d* is shown as being checked, which indicates that a default post-processing prompt would not be used. Because the fourth override default checkbox 303*d* is checked, the post-processing prompt instructions textbox 306*d* is shown. The post-processing prompt instructions textbox 306*d* can receive input from the client that can describe how the agent should react to receiving raw client input. For example, the post-processing prompt instruction textbox 306*d* can receive an example prompt, such as "You are a chat agent that simplifies content sent from a function calling agent so that the language is easy and quick to understand. First provide a quick summary of the result of the actions taken. Next, provide a paragraph explaining the inputs used for any actions performed and why those were chosen. Finally, explain how the user can provide information if the actions taken did not meet their satisfaction." After the various sections to define advanced prompts, the second user interface 300 can include a save prompt button 309 that, when clicked, would save any of the prompts from the various sections within the agent instruction 144 and navigate back to the first user interface 200 of FIG. 2.

Returning to FIG. 2, in the next section entitled "action groups," the first user interface 200 shows four groups of API action information 145 that have been configured for this agent 127. As shown, a first group of API action information 145*a* can represent a "GetReservationDetails" action 163, the second group of API action 145*b* can represent a "GetGuestDetails" action 163, the third group of API action 145*c* can represent a "GetHotelDetails" action 163, and a fourth group of API action 145*d* can represent a "BookRoom" action 163. Below fourth action 163*d*, the first user interface 200 includes action name text box 209 that allows users to enter a new action to be configured to this agent 127, which can be added by clicking the action add button 212. Upon clicking the action add button 212, the user would be navigated to FIG. 4.

Figure 4:
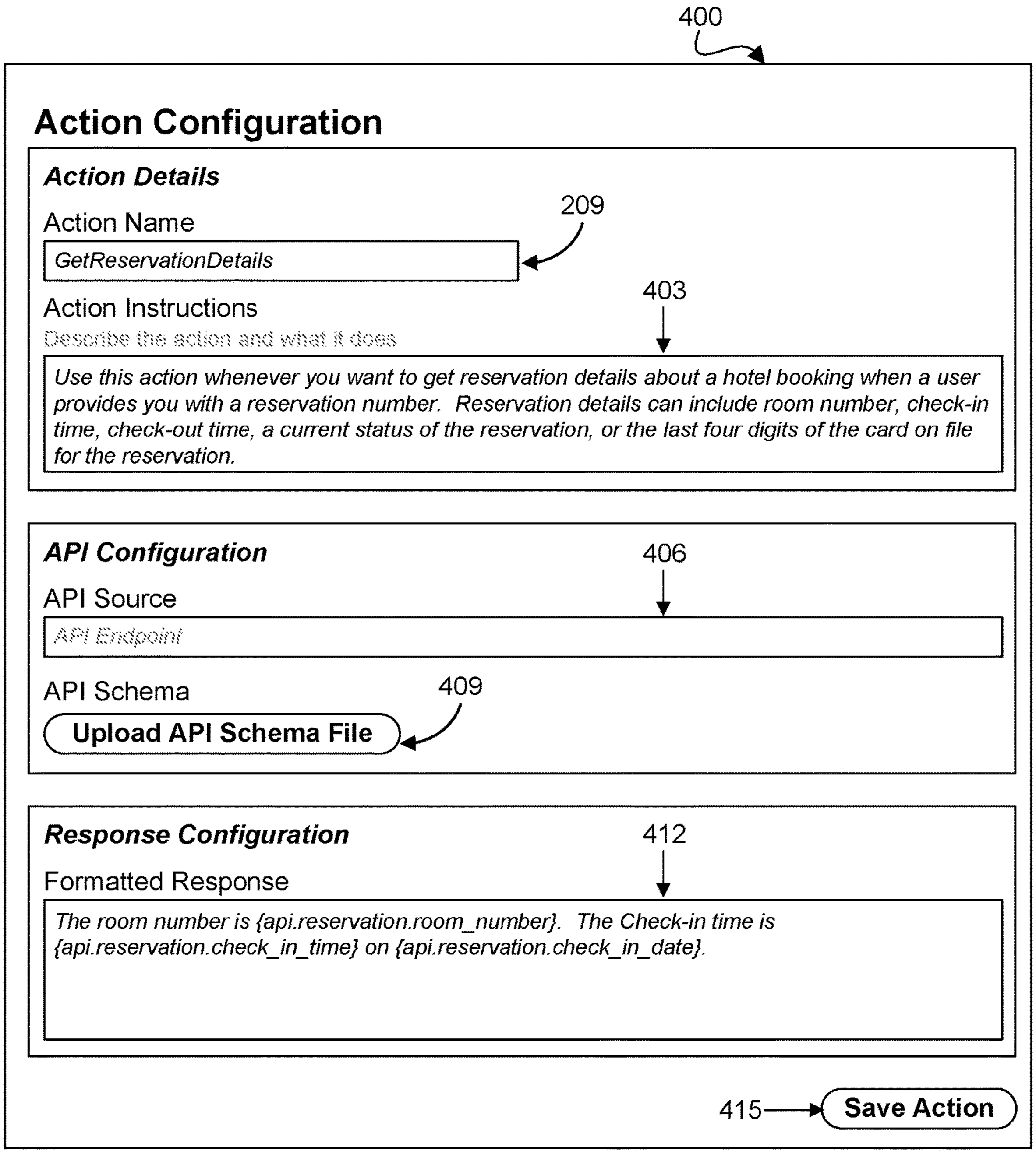

FIG. 4 depicts a third user interface 400 that is used to configure an action for an agent 127. In a first portion of the third user interface 400, the client can enter an action name at the action name text box 209, which can be the representative name of the new fifth action 163 within the context of example FIG. 2 or any new action 163, generally. If the value of action name was entered at action name text box 209 at FIG. 2, then the value of action name text box 209 of FIG. 4 can be automatically filled in with that value. Next, the third user interface 400 can include an action instructions text box 403, where the client can enter details about the action and what it does. For example, the action instructions text box 403 shows an example instruction, such as "Use this action whenever you want to get reservation details about a hotel booking when a user provides you with a reservation number. Reservation details can include room number, check-in time, check-out time, a current status of the reservation, or the last four digits of the card on file for the reservation."

The third user interface 400 also provides an API source text box 406 that allows the client to identify or enter the API endpoint for the API. Additionally, the third user interface 400 provides a file upload button 409 to upload an API schema file. The third user interface 400 also provides a formatted response textbox 412 that allows the user to format how the APIs response is provided to the agent 127 when the API response is received. For example, the formatted response textbox 412 shows an example formatted response, such as "The room number is {api.reservation.room_number}. The Check-in Time is {api.reservation.check_in_time} on {api.reservation.check_in_date}." In this example, the orchestration service 121 can replace the words encapsulated by curly brackets with corresponding data received from the API. When the client has configured the action to their liking in the third user interface 400, the client can click the save action button 315 to save the action configurations and return to FIG. 2 where the action would be added to the list of actions 163.

Returning to FIG. 2, the first user interface 200 can include a section to configure knowledge bases (as indicated by the section header "knowledge bases") similarly to that of the actions section, as previously discussed. For instance, the first user interface 200 can show two examples of knowledge base information 148, such as a first group of knowledge base information 1148*a* location and a second group of knowledge base information 148*b* location. A client can configure additional knowledge bases 133 by identifying the location (e.g., network address, etc.) or an identifier known by the system and entering that value at knowledge base text box 215. If the location or identifier is valid, the client can click the knowledge base add button 218 to add the knowledge base data 133 to the agent configuration data 142.

Below the knowledge base section, the first user interface 200 can include action performance buttons. For instance, the first user interface 200 can include an export configuration button 220 that, upon being clicked, will export the agent configuration data 142 into a format that can be imported or reused by the configuration service 118. For instance, the export configuration button 220 can be clicked, and the configuration service 118 can compile all of the information collected for the agent configuration data 142 and export the agent configuration data 142 as a JSON file or a ZIP file, which can be available for download by the client device 106. In another instance, the export configuration button 220, upon being clicked, could store the agent configuration data 142 within the computing environment 103 and present the client device with a shareable uniform resource locator (URL) or other network address so that the configuration for the agent configuration could be easily shared with others. The first user interface 200 can also include a deploy button 221. Once the agent is configured and ready to generate an agent 127, the client clicks the deploy button 221 to configure the selected base foundation model 124 to become an agent 127.

Figure 5:
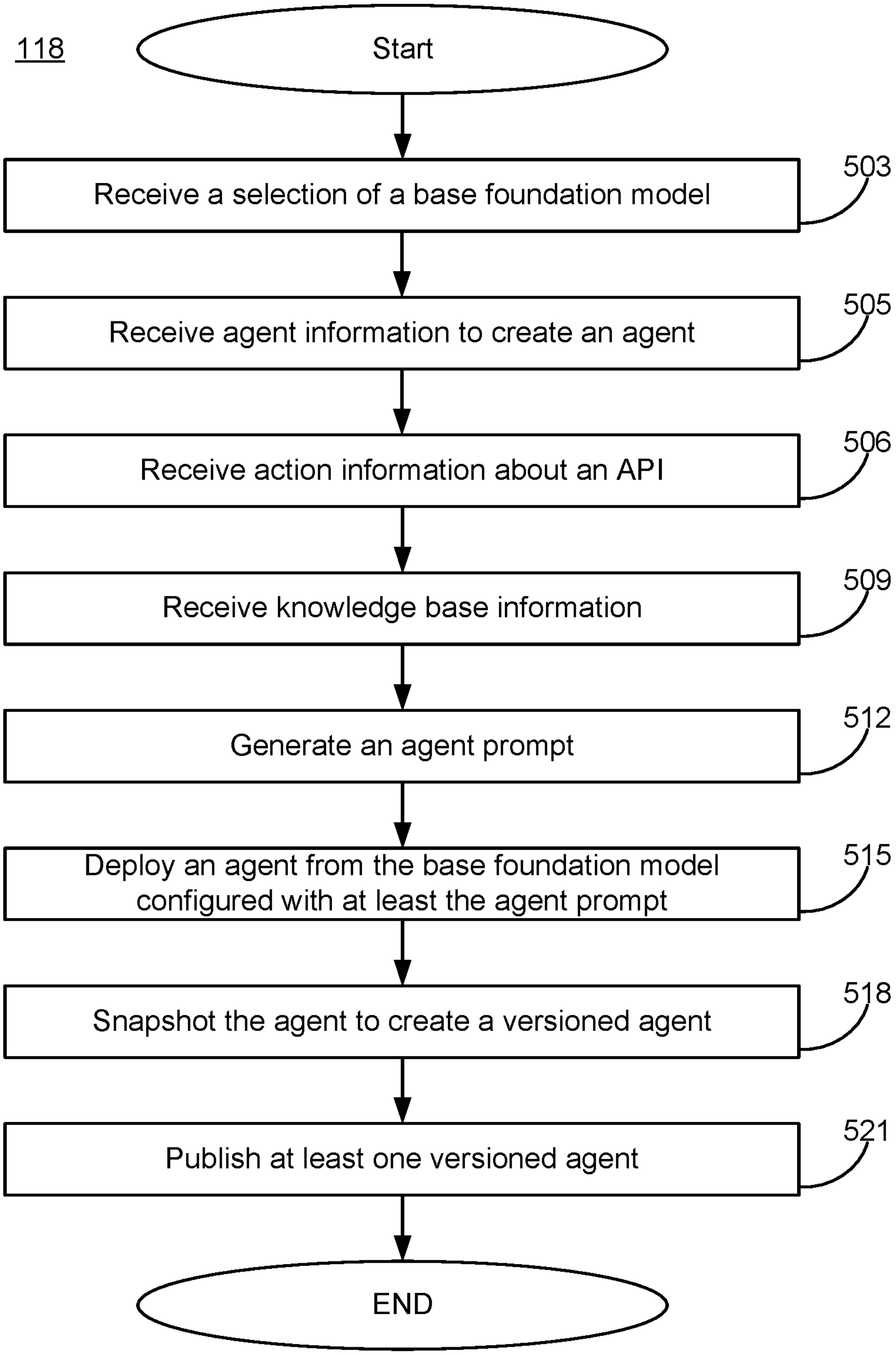
FIG. 5 is a flowchart illustrating one example of functionality implemented as portions of a configuration service executed in a computing environment in the networked environment of FIG. 1 according to various embodiments of the present disclosure.

Referring next to FIG. 5, shown is a flowchart that provides one example of the operation of a portion of the configuration service 118 according to various embodiments. It is understood that the flowchart of FIG. 5 provides merely an example of the many different types of functional arrangements that can be employed to implement the operation of the portion of the configuration service 118 as described herein. As an alternative, the flowchart of FIG. 5 can be viewed as depicting an example of elements of a method implemented in the computing environment 103 according to one or more embodiments.

Beginning with block 503, the configuration service 118 can receive a selection of a base foundation model 124. The configuration service 118 can receive various types of information during the configuration of base foundation model 124 to an agent 127. In various embodiments, the configuration service 118 could receive a selection of a base foundation model 124 for which the following configuration would be able to modify. For example, a client can interact with the first user interface 200 (FIG. 2) to insert or select a base foundation model 124 from a plurality of base foundation models 124, which the configuration service 118 can receive.

Next, at block 505, the configuration service 118 can receive agent information to configure an agent 127. In at least some examples, the agent information can include agent instructions 144, user access information, prompts used to configure an agent (as described in the discussion of FIG. 3), and various other information. The agent information can include the name of the agent 127 and a basic prompt that describes the persona, tasks, goals, and/or transactions that the agent 127 can participate in, such as the basic prompt shown in the first user interface 200 of FIG. 2. The agent information can include user access information, which can be used by the configuration service 118 to allow access to the configuration of the agent 127 with one or more clients. In some embodiments, the user access information could also be used by the orchestration service to determine whether an end-user client can communicate with the agent.

Next, at block 506, the configuration service 118 can receive API action information 145 about an API 160. The API action information 145 can represent a subset of the agent configuration data 142 that pertains to how the agent 127 can interact with external APIs, such as an API 160 on the API environment 109. The API action information 145 can include an action name, an API endpoint (e.g., network address, etc.), a specified function/method to call on the API, an API schema, instructions for when the agent 127 should invoke this action, and how to format the response from the API to the agent 127. In some embodiments, the API action information 145 can further include input parameters, a plain-language description of when to use the API, an output result, and a plain-language description of how to interpret the output result. A plain-language description of when to use the API can be a short description of the purpose of the API, such as "This API can be used to book a hotel room. Use this API when a customer indicates that they wish to book a hotel room." A plain-language description of how to interpret the output result can be used to provide a contextualized result to the client, such as "Provide the customer with the booking confirmation number, along with the date/time for the reservation." An API schema can detail any of the available method calls available on the API, along with any necessary and optional parameters. The API schema could be formatted in accordance with a specified API format, such as the OpenAPI Schema JSON format, API Blueprint, or RESTful API modeling language (RAML) format. The API schema could also be represented as a Web Services Description Language (WSDL) format, other XML-based formats, or any format to convey the information about the functionality and parameters of the API. The API action information 145 can represent information related to one or more API actions that the agents 127 can utilize. The configuration service 118 can receive the API action information 145 about an API 160 from the client device 106. For example, the client can interact with the first user interface 200 (FIG. 2) and a third user interface 400 (FIG. 4) to insert or configure API action information 145, which the configuration service 118 can receive.

Continuing to block 509, the configuration service 118 can receive knowledge base information 148 regarding knowledge base data 133. The knowledge base data 133 can represent a set of facts, configurable by the client, for which an agent 127 can reference real-time (using the orchestration service 121) to provide a factually-grounded client communication request. In various embodiments, knowledge base data 133 can be represented as a key-value store, where the key can represent a question, a topic, an index, or a concept, and the value can represent an answer, an explanation of the topic, indexed data, or details on a concept, respectively. In some embodiments, knowledge base data 133 can be tokenized data derived from pre-existing files, such as company policy documents or other types of documents. Knowledge base data 133 can be modified without affecting the configuration of an agent 127, thus allowing clients to easily update information that the agent 127 would deliver without re-deploying a new agent 127. A client can configure the one or more knowledge base data sources that are configured to the agent 127 by providing at least one of a knowledge base endpoint (e.g., network location, etc.), an identifier for a managed knowledge base, or other connection information.

Next, at block 512, the configuration service 118 can generate an agent prompt 151. The configuration service 118 can use the selection of the base foundation model 124, the API action information 145, the knowledge base information 148, and/or any other additional information received during the configuration, such as any additional information in the agent configuration data 142, to generate an agent prompt 151. The agent prompt 151 can represent at least a portion of a prompt used to configure a base foundation model 124 to an agent 127. The agent prompt 151 can be text that is provided to a base foundation model 124. The configuration service 118 can then compile the information into a directive for the base foundation model 124 to ingest to become more specialized in its tasks. For example, a client provides an agent persona description (e.g., "You are a travel booking agent; You are friendly polite and can help users with their travel needs", etc.), adds API action information (e.g., "BookHotelRoom" action, etc.), and adds knowledge base information 148 (e.g., Hotel Policies and Procedure documents, etc.) to the agent configuration data 142. With the aforementioned agent configuration data 142, a configuration service 118 can create an agent prompt 151, such as "You are a travel booking agent; You are friendly polite and can help users with their travel needs. You can use the APIs BookHotelRoom for reservation actions. Lastly, you can pull up information about hotel policies from the HotelPolicyDetails knowledge source." Although this is a simplistic example, the agent prompt 151 can be very detailed based at least in part on the agent configuration data 142.

Continuing to block 515, the configuration service 118 can deploy a base foundation model 124 as an agent 127 configured at least with the agent prompt 151. In at least some embodiments, deploying a base foundation model 124 as an agent 127 can include provisioning any necessary hardware and/or software components to execute the base foundation model 124. Deploying can also include copying the base foundation model 124 to the provisioned storage location to generate the agent 127. The configuration service 118 can then direct the computing environment 103 to execute the agent 127, which can wait to receive client input. The configuration service 118 can then send at least the agent prompt 151 to the agent so that the agent 127 is configured to support the functionalities necessary for acting as the agent 127 as configured. Additional information can also be provided to agent 127, such as additional base training data 130, any API schemas in the API action information 145, or any additional agent configuration data 142. Once the agent 127 has been configured using at least the agent prompt 151, the configuration service 117 can send deployment information about the agent 127, such as the agent configuration data 142, to the orchestration service 121 for deployment.

Next, at block 518, the configuration service 118 can generate a checkpoint, snapshot, or version of the agent 127. In some embodiments, each deployment (as described in block 515) can be versioned. In at least some embodiments, there can be a draft version of the agent 127 that is mutable, which allows the client to easily make changes to deployment of the agent 127 without having to re-allocate new hardware and/or software resources. In some embodiments, versions of an agent 127 can be immutable, meaning that each version of the agent 127 is actually a separate and new agent 127 allocated with its own respective hardware and/or software components and it cannot be changed or modified once that version has been deployed. In some embodiments, the mutable draft version of the agent 127 can be copied and deployed (as previously described at block 515) to create an immutable version of the agent 127. This could be called taking a snapshot of the draft agent 127. In some embodiments, the mutable draft version of the agent 127 can also be copied and deployed with different configuration settings (as previously described at block 515) to create a different version of the agent 127, which could be a second draft version of the agent 127.

Continuing to block 521, the configuration service 118 can publish at least one version of the agent 127. Once the client has verified that a version of the agent 127 is ready to be released for its end-use, the client device 106 can direct the configuration service 118 to publish at least one of the versioned agents 127. In doing so, the configuration service can allocate additional hardware and/or software resources to the versioned agent 127 to ensure that it is production ready, such as allocating additional processors, memory, etc. Additionally, the configuration service 118 can provide ways in which an end user can communicate with the published version of the agent 127 (via an orchestration service 121). For example, the configuration service 118 could assign the agent 127 a unique identifier and/or a network endpoint that would allow an end user interface with the with the published version of the agent 127 (via an orchestration service 121). In various embodiments, a published version of the agent 127 can be immutable, such that the public user experience is not affected by modifications to the agent 127 once it has been published. Subsequently, the process of FIG. 5 can come to an end.

Figure 6:
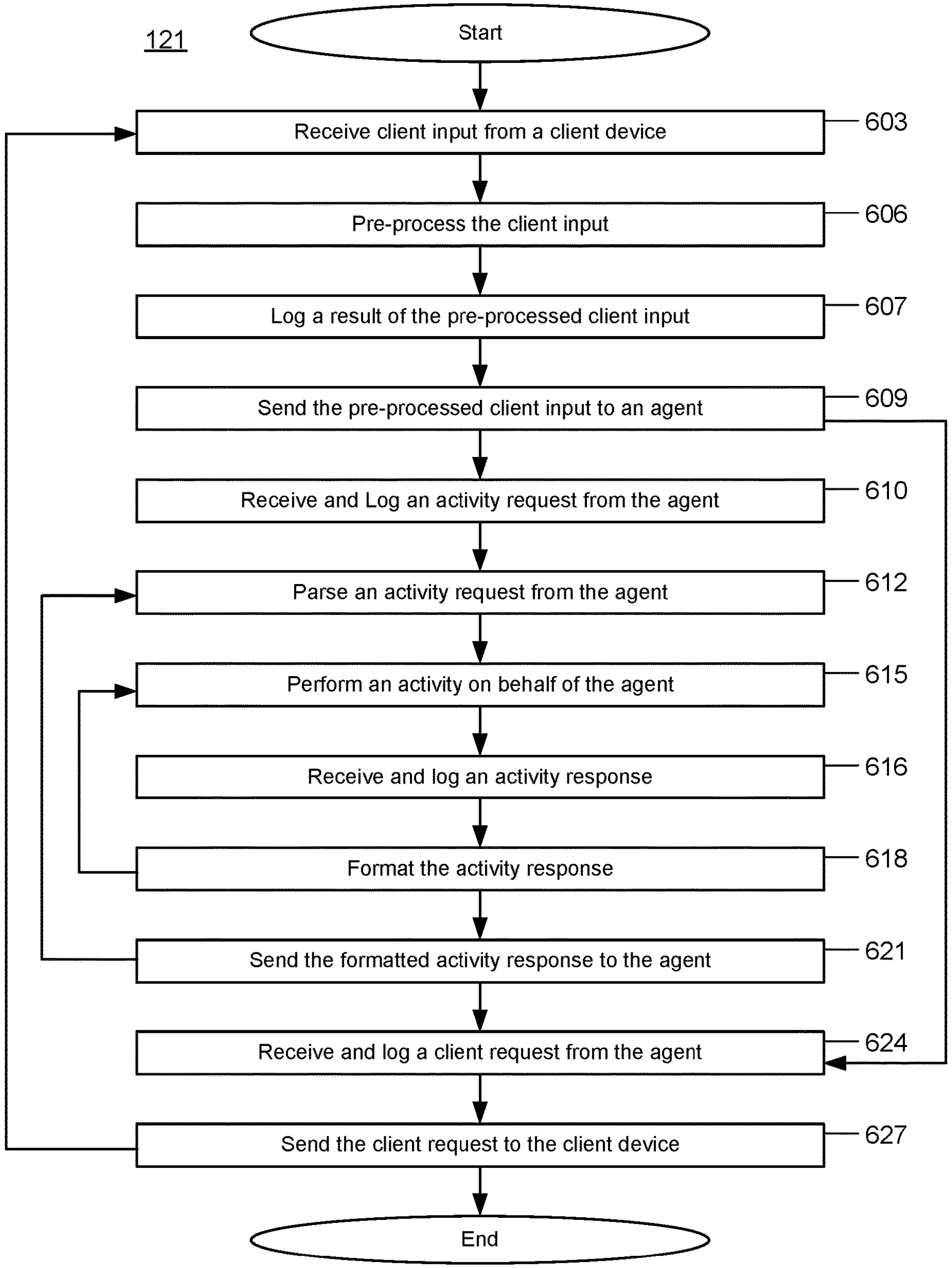
FIG. 6 is a flowchart illustrating one example of functionality implemented as portions of orchestration service executed in a computing environment in the networked environment of FIG. 1 according to various embodiments of the present disclosure.

Referring next to FIG. 6, shown is a flowchart that provides one example of the operation of a portion of the orchestration service 121 according to various embodiments. It is understood that the flowchart of FIG. 6 provides merely an example of the many different types of functional arrangements that can be employed to implement the operation of the portion of the orchestration service 121 as described herein. As an alternative, the flowchart of FIG. 6 can be viewed as depicting an example of elements of a method implemented in the computing environment 103 according to one or more embodiments.

Beginning with block 603, the orchestration service 121 can receive client input from a client device 106. In various embodiments, the client input can be in the form of text, such as written question for the agent 127. In other various embodiments, the client input can represent that the client has invoked the agent 127 without having written any text. For instance, a client can click a button and trigger a request from the client device 106 to be sent to the orchestration service 121 that requests an action to be taken, but the client would not have written such a request. In various embodiments, the orchestration service 121 can be executed to coordinate communications between an end user (at a client device 106), an agent 127, an API environment 109, and information stored in the data store 115, such as knowledge base data 133 and conversation histories 136. The agent 127 could have been deployed (as described in block 515 of FIG. 5). In various embodiments, the client device 106 can send client input to the orchestration service 121, which the orchestration service 121 can receive. Although various embodiments are directed to the client input being text, the client input could be any data type including multimedia files, such as audio, video, etc.

Next, at block 606, the orchestration service 121 can pre-process the client input. In various embodiments, the orchestration service can pre-process the client input by validating that the agent 127 is permitted to process the client input. For instance, a client device 106 can send a multimedia file, but the agent 127 is only configured to receive text input. In such a situation, the orchestration service 121 can validate the type of client input. If the client input fails validation, the orchestration service 121 can send a response to the client device 106 indicating that the client input was not valid with any additional information related to the validation. In some embodiments, the orchestration service 121 can pre-process the content of the client input. For instance, the creator of the agent 127 might have indicated that the agent 127 should not discuss unsanctioned topics, such as politics, religion, and/or certain confidential information. In such a situation, the orchestration service 121 can validate whether any of the objectionable content appears in client input. In various embodiments, the orchestration service 121 can utilize the agent 127 to assist in validating or pre-processing the client input. To do so, the orchestration service 121 can send a validation prompt along with at least a portion of the client input to the agent 127. The validation prompt can be an inquiry for the agent 127 to interpret. An example validation prompt can include "Can you please determine and explain whether the following text includes any mention of politics, religion, and/or confidential information?" The example validation prompt can then be followed by at least a portion of the client input. In response, the orchestration service 121 can receive a response indicating at least whether the client input is valid based at least in part on the validation prompt as determined by the agent 127.

Continuing to block 607, the orchestration service 121 can log the result of the pre-processed user-input. In some embodiments, the orchestration service 121 can log the result to the conversation history 136. In at least some embodiments, the log (also called trace) can be stored in memory. The log entry can include the user input, a prompt that was provided to the agent 127 for the pre-processing (if applicable), the result of the pre-processing, and/or various other information, such as relevant portions of the chat history. In development, the log or trace can assist the developer figure out how the agent 127 made its decisions at the pre-processing stage.

Continuing to block 609, the orchestration service 121 can send the client input to an agent 127. In various embodiments, the orchestration service 121 can send the pre-processed client input to the agent 127. In some embodiments, the orchestration service 121 can send the client input or pre-processed client input directly to the agent 127. In some embodiments, the orchestration service 121 can send the client input or the pre-processed client input along with a client input prompt. A client input prompt could be used to identify what information is the client input and also identify additional information for the agent 127, such as any base training data 130, any knowledge base data 133, any conversation history 136, and/or any API responses 139. For example, a client may have been chatting with the agent 127 for some time regarding booking a room at a hotel. The conversation history includes various types of information about the client, such as the client's name and the hotel they have been inquiring about. The client input could say "can you please assist me in booking a room at this hotel." A client input prompt could delineate the client input and also the conversation history for the agent 127 such that the agent 127 can more quickly infer information to invoke certain activities.

The orchestration service 121 can proceed to either block 612 or block 624 based at least in part on the type of response returned from the agent 127. For example, the agent 127 can provide at least one of two types of responses: a response to perform an activity (an "activity request") or a response to communicate information to the client device 106 (a "client communication request"). If the agent 127 provides an activity request, the process can proceed to block 612. If the agent 127 provides a client communication request, the process can proceed to block 624.

Continuing to block 610, the orchestration service 121 can receive an activity request and log the activity request. The orchestration service 121 can receive the activity request from the agent 127. In some embodiments, the orchestration service 121 can log the activity request to the conversation history 136. In at least some embodiments, the log (also called trace) can be stored in memory. The log entry can include the client input or pre-processed client input, a prompt that was provided to the agent 127 for the processing the client input (if applicable), the activity request, and/or various other information, such as relevant portions of the chat history. In development, the log or trace can assist the developer figure out how the agent 127 made its decisions at the processing stage.

Next, at block 612, the orchestration service 121 can parse an activity request from the agent 127. The term activity here is an umbrella term that could mean at least one of invoking an API 160 on behalf of the agent 127 or retrieving information from a knowledge base data 133 source so that the agent 127 can provide a factually-based answer.

In various embodiments, the activity request can include a request for the orchestration service 121 to invoke an API 160 to perform a specified action 163. In such an embodiment, the activity request can include specific information about the API, such as the API action information 145 from which the agent 127 was trained. The activity request could include an API endpoint, a specified method to call along with any parameters. The activity request could also include the values that correspond to those method parameters. For instance, orchestration service 121 can receive an activity request from the agent 127 that states "invoke the BookRoom API at <http://192.168.0.1> to call the <book> method with a first parameter being <customer_name> with a value of <John Doe>." The orchestration service 121 could then parse this activity request to determine which API needs to be invoked (e.g., "BookRoom"), at what API endpoint (e.g., "http://192.168.0.1"), to call what API action 163 (e.g., "the <book> method") with the specified parameters and values (e.g., customer_name with a value of John Doe). This information can be parsed out of the activity request to invoke the API 160 at block 615.

In various embodiments, the activity request can include a request for the orchestration service 121 to obtain information from a knowledge base (e.g., knowledge base data 133). For instance, the activity request can indicate that the orchestration service 121 should provide a current copy of the knowledge base data 133, in its entirety or merely a portion, to the agent 127 so that a factually-rooted client communication request can be provided. The orchestration service 121 can parse the activity request to determine what knowledge base likely contains the information and what information is needed from the knowledge base data 133.

Continuing to block 615, the orchestration service 121 can perform an activity on behalf of the agent 127. As previously discussed at block 612, the activity request can indicate an action to perform, such as invoking an API 160 or obtaining information from a knowledge base (e.g., knowledge base data 133). At block 615, the orchestration service 121 can perform that activity by either invoking the API 160 or obtaining the information from the knowledge base. To invoke the API 160, the orchestration service 121 can send a request to the API 160 to perform a specified action 163. The request to the API 160 can include zero or more parameters and zero or more values corresponding to those parameters. The API 160 can be accessed at an identified API endpoint or accessed locally by some identifier. For example, in an embodiment where the API is an Amazon Web Services Lambda Function, the orchestration service 121 can invoke the lambda function to be called using methods defined Amazon Web services procedures. To obtain information from a knowledge base, the orchestration service 121 can obtain information from the knowledge base data 133 or receive a copy of the entire knowledge base data 133 to provide to the agent 127 so that it can consume the information. As a result of performing either activity, the activity can result in an activity response. For instance, the response from the API can result in an API response 139 with specified information. The response from the API could also just be a text-based response, which could be logged in the conversation history 146. The response from the knowledge base could be specific information or an entire copy of the knowledge base data 133. Various types of values could be provided in the activity response.

Continuing to block 616, the orchestration service 121 can receive an activity response and log the activity response. The orchestration service 121 can receive the activity response from the agent 127. In some embodiments, the orchestration service 121 can log the activity response to the conversation history 136. In at least some embodiments, the log (also called trace) can be stored in memory. The log entry can include the API inputs, API action information 145, knowledge base information 148, an API response 139, information provided to effectuate an activity, the activity request, the activity response, and/or various other information, such as relevant portions of the chat history. In development, the log or trace can assist the developer figure out whether the activity was correctly performed based on the instructions from the agent 127. For example, the developer could figure out whether an API call was made correctly based on the information used to connect and invoke the API.

Next, at block 618, the orchestration service 121 can format the activity response. In some embodiments, the API response 139, text-based response, or knowledge base data of the activity response can be a format that the agent 127 can ingest. For instance, the API response 139 or text-based response can be a JSON formatted text response such that the data can easily be accessible by a software developer, but not easily understood by an agent 127. In such an instance, the orchestration service 121 can format the API response 139 to become more ingestible by the agent 127. If the activity requires performing one or more activities (e.g., invoking an API, accessing a knowledge base, etc.) then the process can return to block 615 until each of the activities have been completed and formatted. If there are no further activities to be performed for the agent 127, the process can proceed to block 612.

Continuing to block 621, the orchestration service 121 can send the activity response to the agent 127. In some embodiments, the orchestration service 121 can send the activity response directly to the agent 127. In some embodiments, the orchestration service 121 can send the activity response along with an activity response prompt. An activity response prompt could be used to identify what information is the activity response and also identify additional information for the agent 127, such as any base training data 130, any knowledge base data 133, any conversation history 136, and/or any API responses 139. The orchestration service 121 can proceed to either block 612 or block 624 based at least in part on the type of response returned from the agent 127. For example, the agent 127 can provide at least one of two types of responses: a response to perform an activity (an "activity response") or a response to communicate information to the client device 106 (a "client communication request"). If the agent 127 provides an activity response, the process can proceed to block 612. If the agent 127 provides a client communication request, the process can proceed to block 624.

Next, at block 624, the orchestration service 121 can receive a client communication request from the agent 127 directing the orchestration service 121 to send the client communication request to the client device 106. In various embodiments, the agent 127 can provide a client communication request that requests the orchestration service 121 to ask the client device for additional information. For instance, if a client had asked to book a hotel room, but the agent 127 did not have all the information it needed to invoke the API 160 action 163 for booking a hotel room, the agent 127 could send a client communication request to the orchestration service 121 to obtain the additional information. In such a client communication request, the agent 127 can provide a human-readable message that can be presented to the client device 106.

In various embodiments, the agent 127 can provide a client communication request that provides a contextualized response to the input. In a first example, the client might have asked a simple question that did not require performing any actions, but a simple response would suffice. In such an example, the client communication request could provide a human-readable message that can be presented to the client device 106. In a second example, the client might have asked a question for which an activity might have needed to be performed. As a result of performing the activity (e.g., invoking an API 160, obtaining information from a knowledge base, etc.), the agent 127 can contextualize the activity response to best answer or respond to the client's question or statement. Further, the agent 127 can contextualize the answer or response to fulfill the agent instructions 144. For example, if the agent 127 is configured to "use language that a 10-year-old would understand," then the agent 127 could contextualize the specific client communication request such that a 10-year-old would understand the client communication request.

Further, the orchestration service 121 can log the client communication request. In some embodiments, the orchestration service 121 can log the client communication request to the conversation history 136. In at least some embodiments, the log (also called trace) can be stored in memory. The log entry can include the API inputs, API action information 145, knowledge base information 148, an API response 139, information provided to effectuate an activity, the activity request, the activity response, the client communication request, and/or various other information, such as relevant portions of the chat history. In development, the log or trace can assist the developer figure out how the agent 127 made its decisions to communicate with the client this stage.

Continuing to block 627, the orchestration service 121 can send the client communication request to the client device 106. In some embodiments, the orchestration service 121 can send just a portion of client communication request to convey the client specific message, such as a contextualized response. Once the orchestration service 121 sends the client communication request to the client device 106, the orchestration service 121 can wait to receive client input from the client device 106, as previously detailed in block 603. In some embodiments, the process can come to an end.

Figure 7:
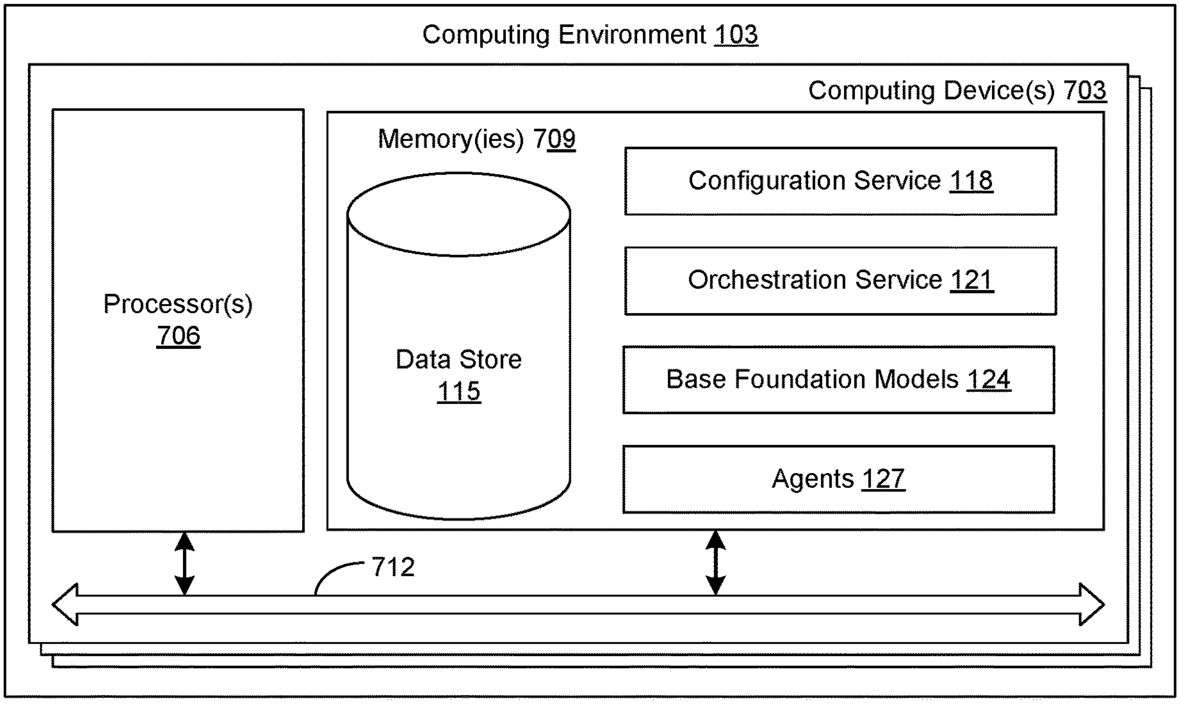
FIG. 7 is a schematic block diagram that provides one example illustration of a computing environment employed in the networked environment of FIG. 1 according to various embodiments of the present disclosure.

With reference to FIG. 7, shown is a schematic block diagram of the computing environment 103 according to an embodiment of the present disclosure. The computing environment 103 includes one or more computing devices 703. Each computing device 703 includes at least one processor circuit, for example, having a processor 706 and a memory 709, both of which are coupled to a local interface 712. To this end, each computing device 703 can include, for example, at least one server computer or like device. The local interface 712 can include, for example, a data bus with an accompanying address/control bus or other bus structure as can be appreciated.

Stored in the memory 709 are both data and several components that are executable by the processor 706. In particular, stored in the memory 709 and executable by the processor 706 are configuration service 118, orchestration service 121, base foundation models 124, and agents 127, and potentially other applications. Also stored in the memory 709 can be a data store 115 and other data. In addition, an operating system can be stored in the memory 709 and executable by the processor 706.

It is understood that there can be other applications that are stored in the memory 709 and are executable by the processor 706 as can be appreciated. Where any component discussed herein is implemented in the form of software, any one of a number of programming languages can be employed such as, for example, C, C++, C#, Objective C, Java®, JavaScript®, Perl, PHP, Visual Basic®, Python® Ruby, Flash®, or other programming languages.

A number of software components are stored in the memory 709 and are executable by the processor 706. In this respect, the term "executable" means a program file that is in a form that can ultimately be run by the processor 706. Examples of executable programs can be, for example, a compiled program that can be translated into machine code in a format that can be loaded into a random-access portion of the memory 709 and run by the processor 706, source code that can be expressed in proper format such as object code that is capable of being loaded into a random-access portion of the memory 709 and executed by the processor 706, or source code that can be interpreted by another executable program to generate instructions in a random-access portion of the memory 709 to be executed by the processor 706, etc. An executable program can be stored in any portion or component of the memory 709 including, for example, random-access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 709 is defined herein as including both volatile and nonvolatile memory and data storage components. Volatile components are those that do not retain data values upon loss of power. Nonvolatile components are those that retain data upon a loss of power. Thus, the memory 709 can include, for example, random-access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM can include, for example, static random-access memory (SRAM), dynamic random-access memory (DRAM), or magnetic random-access memory (MRAM) and other such devices. The ROM can include, for example, a programmable read-only memory (PROM), an erasable programmable read-only memory (EPROM), an electrically erasable programmable read-only memory (EEPROM), or other like memory device.

Also, the processor 706 can represent multiple processors 706 and/or multiple processor cores and the memory 709 can represent multiple memories 709 that operate in parallel processing circuits, respectively. In such a case, the local interface 712 can be an appropriate network that facilitates communication between any two of the multiple processors 706, between any processor 706 and any of the memories 709, or between any two of the memories 709, etc. The local interface 712 can include additional systems designed to coordinate this communication, including, for example, performing load balancing. The processor 706 can be of electrical or of some other available construction.

Although configuration service 118, orchestration service 121, base foundation models 124, and agents 127, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5 and 6 show the functionality and operation of an implementation of portions of one of the configuration service 118 or the orchestration service 121. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor 706 in a computer system or other system. The machine code can be converted from the source code, etc. If embodied in hardware, each block can represent a circuit or a number of interconnected circuits to implement the specified logical function(s).

Although the flowcharts of FIGS. 5 and 6 show a specific order of execution, it is understood that the order of execution can differ from that which is depicted. For example, the order of execution of two or more blocks can be scrambled relative to the order shown. Also, two or more blocks shown in succession in FIGS. 5 and 6 can be executed concurrently or with partial concurrence. Further, in some embodiments, one or more of the blocks shown in FIGS. 5 and 6 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including configuration service 118, orchestration service 121, base foundation models 124, and agents 127, that includes software or code can be embodied in any non-transitory computer-readable medium for use by or in connection with an instruction execution system such as, for example, a processor 706 in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random-access memory (RAM) including, for example, static random-access memory (SRAM) and dynamic random-access memory (DRAM), or magnetic random-access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein, including configuration service 118, orchestration service 121, base foundation models 124, and agents 127, can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device 703, or in multiple computing devices in the same computing environment 103. Additionally, it is understood that terms such as "application," "service," "system," "engine," "module," and so on can be interchangeable and are not intended to be limiting.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

APPENDIX

Figure 8:
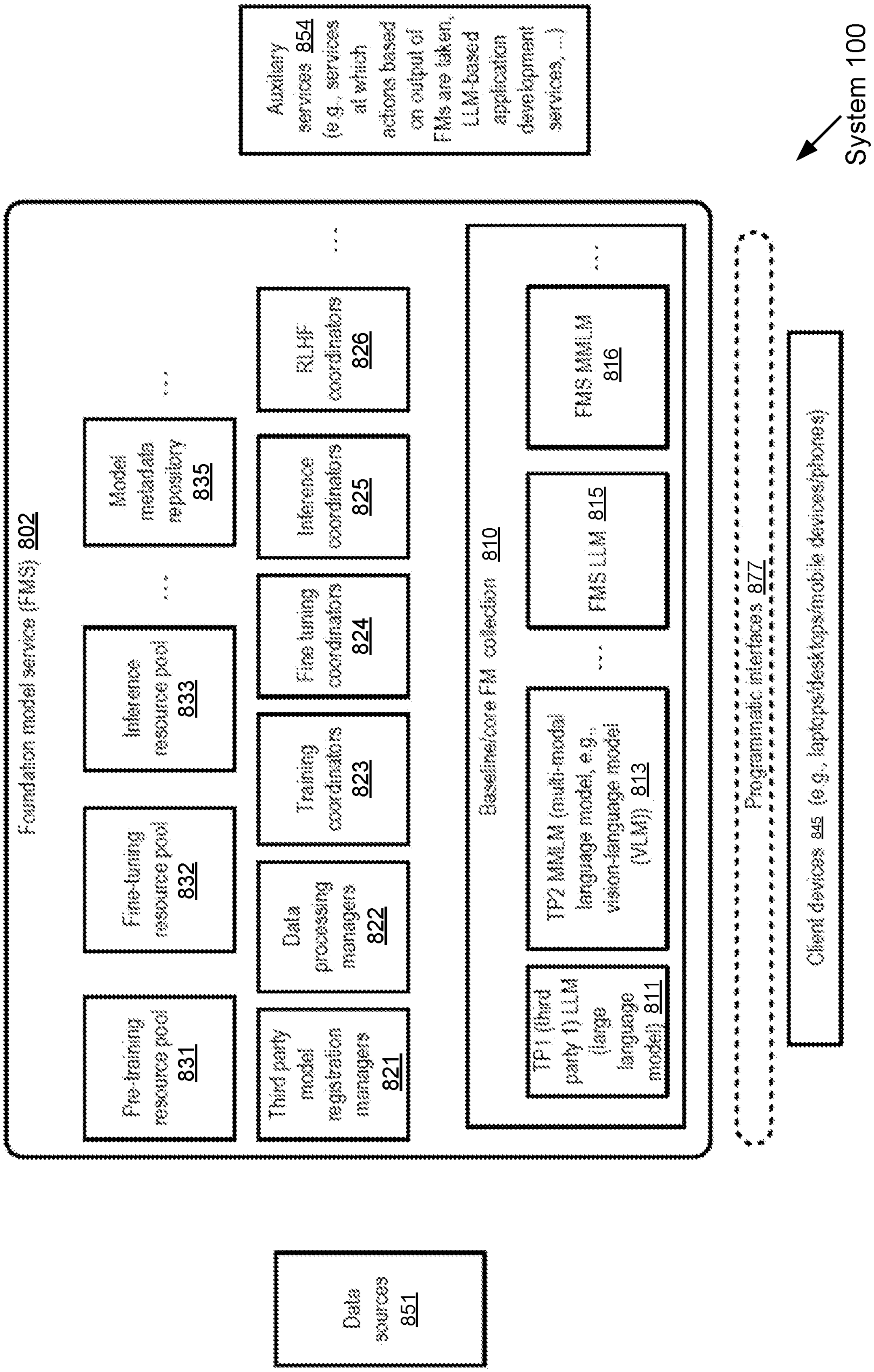
FIG. 8 illustrates an example system environment in which a collection of foundation models from several vendors may be hosted at a network-accessible service, according to at least some embodiments.

FIG. 8 illustrates an example system environment in which a collection of foundation models from several vendors may be hosted at a network-accessible service, according to at least some embodiments. The term "foundation model" (FM) generally refers to large neural network-based machine learning (ML) models that are trained initially (in a process often referred to as pre-training) using enormous amounts of data such as millions of text sentence examples, such that the resulting model learns enough about the input to be relatively easily adapted for many different downstream tasks. The models may be referred to as "large" because of the number of parameters that they each comprise (e.g., billions of parameters), and they may be referred to as "foundation" models in the sense that they can provide a foundation for performing many different kinds of inference or prediction tasks. Large language models (LLMs), typically pre-trained using natural language inputs, are an important type of FM, and are used for a variety of applications including summarization, question-answering chatbots, classification and the like. Pre-training of FMs may often use unsupervised, self-supervised or semi-supervised training techniques. A pre-trained FM may be fine-tuned (e.g., using a relatively small amount of labeled examples) for specific use cases and specific problem domains in some cases, although the pre-trained version of an FM may itself be able to perform high-quality inference tasks in many cases. The pre-trained FMs may be referred to as baseline FMs or core FMs to distinguish them from fine-tuned versions in some embodiments.

System 800 of FIG. 8 comprises artifacts and resources of a foundation model service (FMS) 802 which may be implemented at a provider network or cloud computing environment in some embodiments. The FMS may provide access to numerous LLMs as well as multi-modal language models (MMLMs) such as vision-language models or VLMs in the depicted embodiment. For example, a baseline or core FM collection 810 of the FMS may include TP1 LLM 811, TP2 MMLM 813, FMS LLM 815 and FMS MMLM 816, among others. TP1 LLM may be a large language model developed/designed by a third party TP1; that is, by an entity other than the operator of the FMS and other than the end users who may utilize TP1 LLM for inference using programmatic interfaces 877 of the FMS. TP2 MMLM may have been pre-trained using multiple modes of input data, including for example a combination of text and video/images. FMS LLM 815 may be designed/developed by the organization which implements the FMS (such as the operator of a cloud provider network) and may also be referred to as a first-party or 1P LLM. FMS MMLM may also be designed/developed by the organization which implements the FMS.

Data obtained from a variety of data sources 851 may be used to pre-train (and in some cases fine tune) FMs to which access is provided by the FMS. The data sources may include, among others, portions of web crawl results obtained from subsets of the public Internet, publicly accessible source code repositories, as well as data corpuses that are not publicly accessible via the Internet.

The FMS may comprise a number of subcomponents in the depicted embodiment, each implemented using some combination of hardware and software at one or more computing devices. One or more third-party model registration managers 821 may coordinate workflows for adding third party FMs to the FMS, e.g., including approving (or rejecting) registration requests for new third party FMs based on a set of acceptance criteria of the FMS. Data processing managers 822 may be responsible for implementing a pipeline of transformations and filtering operations on input data that may be used for pre-training an FM, and for ensuring that the data used for such pre-training meets quality criteria of the FMS. Training coordinators 823 may, for example, implement a number of techniques for parallelizing pre-training of FMs, e.g., using a set if resources of a pre-training resources pool 831. Fine tuning coordinators 824 may utilize resources of a fine-tuning resource pool to customize pre-trained FMs at the request of the FM owners/developers in some embodiments. In at least some embodiments, fine-tuned FMs may also be made accessible to end users via the programmatic interfaces 877. In at least some embodiments, the FMS may provide an indication, via programmatic interfaces 877) of all the different FMs that are available for end users.

After an FM is pre-trained and/or fine-tuned, end user requests for inference using the FM may be processed in various embodiments at the FMS. One or more inference coordinators 825 may utilize resources of inference resource pool 833 to execute the FMs and generate inference results that can be provided via the programmatic interfaces 877 in the depicted embodiment. Model metadata repository 835 may be used to store information such as the dates at which various FMs were pre-trained or fine-tuned, the data sets used for pre-training or fine-tuning, restrictions/permissions specified by the FM owners on the use of their FMs, performance metrics collected during pre-training, fine-tuning, or inference, and so on. In some embodiments model metadata repository 835 may also be used to store preferences of FM owners/developers regarding aspects such as targeted high availability levels, targeted types of hardware accelerators for training/inference, and so on. In one embodiment, as described below in further detail, reinforcement learning from human feedback (RLHF) may be employed as one of the stages of preparing a given FM. The operator of the FMS may have staff trained for providing the feedback used for RLHF, and one or more RLHF coordinators 826 may organize access to such staff in various embodiments. In various embodiments the FMS may also include a set of control plane or administrative nodes, responsible (among other tasks) for monitoring the health and status of some or all of the other subcomponents of the FMS, provisioning resources as needed for the other subcomponents, and so on. The control plane components are not shown in FIG. 1.

A number of auxiliary services 854 may utilize the FMS in various ways in some embodiments. For example, in some embodiments, results generated by an FM hosted at the FMS may be fed as input to perform one or more tasks at an auxiliary service. In another embodiment, an LLM-based application development service may be implemented, in which chain-of-thought reasoning may be used to perform multi-step tasks.

In various embodiments, the FMS may implement a set of programmatic interfaces 877, such as one or more web-based consoles, command-line tools, graphical user interfaces and/or application programming interfaces (APIs). The programmatic interfaces may be utilized by FMS customers of several different classes. One class of customers may include, for example, FM developers/designers who wish to utilize the FMS for registering their LLMs, processing input data to train other LLMs, fine-tuning their LLMs, and so on. Another class of customers may include end users who wish to obtain inference results from LLMs hosted by the FMS. Requests may be submitted to the FMS via the programmatic interfaces by the various classes of customers from client devices 845 (such as laptops, desktops, mobile devices, phones, and the like), and responses may be provided to the client devices from the FMS.

Figure 9:
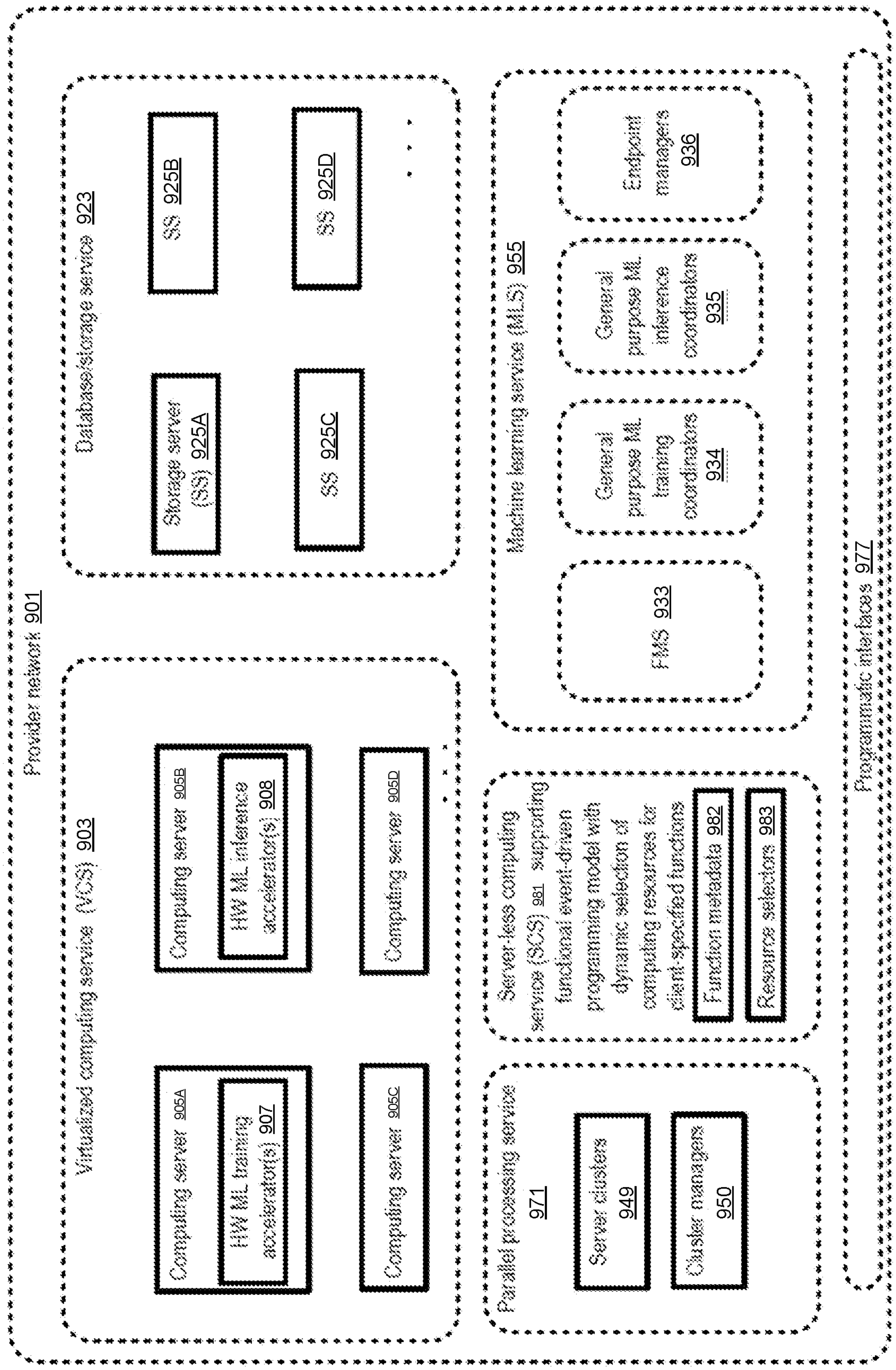
FIG. 9 illustrates an example provider network, according to at least some embodiments.

As mentioned above, in at least some embodiments an FMS similar in features and functionality to FMS 802 of FIG. 8 may be implemented at least in part at a cloud computing environment referred to as a provider network. FIG. 9 illustrates an example provider network, according to at least some embodiments. In the depicted embodiment, provider network 901 may comprise resources used to implement a plurality of network-accessible services, including for example a virtualized computing service (VCS) 903, a database/storage service 923, a parallel processing service 971, a server-less computing service (SCS) 981 as well as a machine learning service (MLS) 955 within which an FMS 933 similar in features to FMS 802 of FIG. 8 is implemented. The SCS may implement an event-driven functional programming model. An end user of the service may simply specify a function to be executed, and an event or events which are to trigger execution of the function. Function metadata 982 may, for example, comprise a repository of function definitions and associated requirements (e.g., whether a given function requires a particular software stack or hardware component). As and when the specified events occur, the SCS resource selectors 983 may dynamically select the particular resource at which the function should be executed, without the end user having to acquire any resources in advance.

In at least one embodiment, the FMS may not be implemented as a subcomponent of the MS but may instead be implemented as a separate service. In the embodiment shown in FIG. 9, in addition to the FMS, the MLS may include general purpose ML training coordinators 934, general purpose ML inference coordinators 935, and a set of endpoint managers 936. The general-purpose training coordinators may be used to train models that are not foundation models; similarly, the general-purpose ML inference coordinators may be utilized to coordinate the generation of responses to inference requests that are directed to models other than foundation models. Endpoint managers 936 may set up logical network endpoints for various models (including foundation models of the FMS) in some embodiments, with associated sets of automatically-scaled resources associated with a given endpoint. End users of the models may direct inference requests intended for a given target model to the network address of a logical endpoint set up for that model.

In the embodiment shown in FIG. 9, the VCS may comprise a collection of computing servers which may be utilized as virtualization hosts, such as computing servers 205A-205D. Some of the computing servers may comprise one or more types of hardware accelerators, such as HW ML training accelerators 907 or HW ML inference accelerators 908. A HW ML training accelerator may comprise circuitry which is optimized to speed up training computations of large machine learning models such as FMs/LLMs, and a HW ML inference accelerator may comprise circuitry which is optimized to speed up inference computations of large machine learning models such as FMs/LLMs. In at least some embodiments, the training and/or inference computations of FMs of the FMS may be performed using compute instances run at VCS computing servers equipped with such accelerators. In one embodiment, server clusters 949 of a parallel processing service, set up in response to programmatic requests by cluster managers may be utilized for parallel training of an FM/LLM and/or for parallel inference of an FM/LLM. The database/storage service 923 may comprise a plurality of storage servers such as SS 225A-225B, which may in some embodiments be used to store portions or all of training data, fine-tuning data sets, and other artifacts used by FMs/LLMs of the FMS. Components of a given service of a provider network may thus utilize components of other services in the depicted embodiment—e.g., FMS 933 may utilize compute instances run at the VCS, functions of the SCS may be executed on VCS resources, model artifacts of the MLS may be stored at the database/storage service, and so on. Individual ones of the services shown in FIG. 9 may implement a respective set of programmatic interfaces 977 which can be used by external and/or internal clients (where the internal clients may comprise components of other services) in the depicted embodiment. In at least some embodiments, resources of a cloud provider network may not be required or used for an FMS; instead, for example, a standalone set of servers may be used.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, an FMS may be implemented at least in part using an edge location of the provider network instead of or in addition to regional data centers. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as provider network extension sites or local zones (due to being more local or proximate to a group of users than traditional availability zones). A local zone may be connected in various ways to a publicly accessible network such as the Internet, for example directly, via another network, or via a private connection to a region. In some implementations, an edge location may be an extension of the cloud provider network substrate formed by one or more servers located on-premises in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network.

A VCS of the cloud provider network may offer virtual compute instances (also referred to as virtual machines, or simply "instances") with varying computational and/or memory resources in various embodiments, which may be used to implement functions of an FMS as indicated above. In one embodiment, each of the virtual compute instances may correspond to one of several instance types or families, and instances of any of several families may be employed for computations of the FMS. An instance type may be characterized by its hardware type, computational resources (e.g., number, type, and configuration of central processing units (CPUs) or CPU cores, hardware accelerators for various tasks including ML tasks), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, a non-burstable or dedicated instance type that is allotted and guaranteed a fixed quantity of resources, or an instance type optimized for radio-based applications). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on.

The traffic and operations of the cloud provider network, and individual services such as the MLS or MLS, may broadly be subdivided into two categories in various embodiments: control plane operations and data plane operations. While the data plane represents the movement of data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information management). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

Preprocessing of Data Used for Pre-Training LLMs

FMs such as LLMs of an FMS may be pre-trained using large amounts of data—e.g., for some LLMs, hundreds of billions of text tokens from one or more sources or corpuses may be included in the pre-training data. The quality of the results obtained from the LLMs (including fine-tuned versions that may be derived from the baseline pre-trained versions) may be strongly dependent on the quality of the data used in the pre-training stage. A number of techniques may be used at an FMS in various embodiments to ensure that high-quality data is utilized for pre-training.

Figure 10:
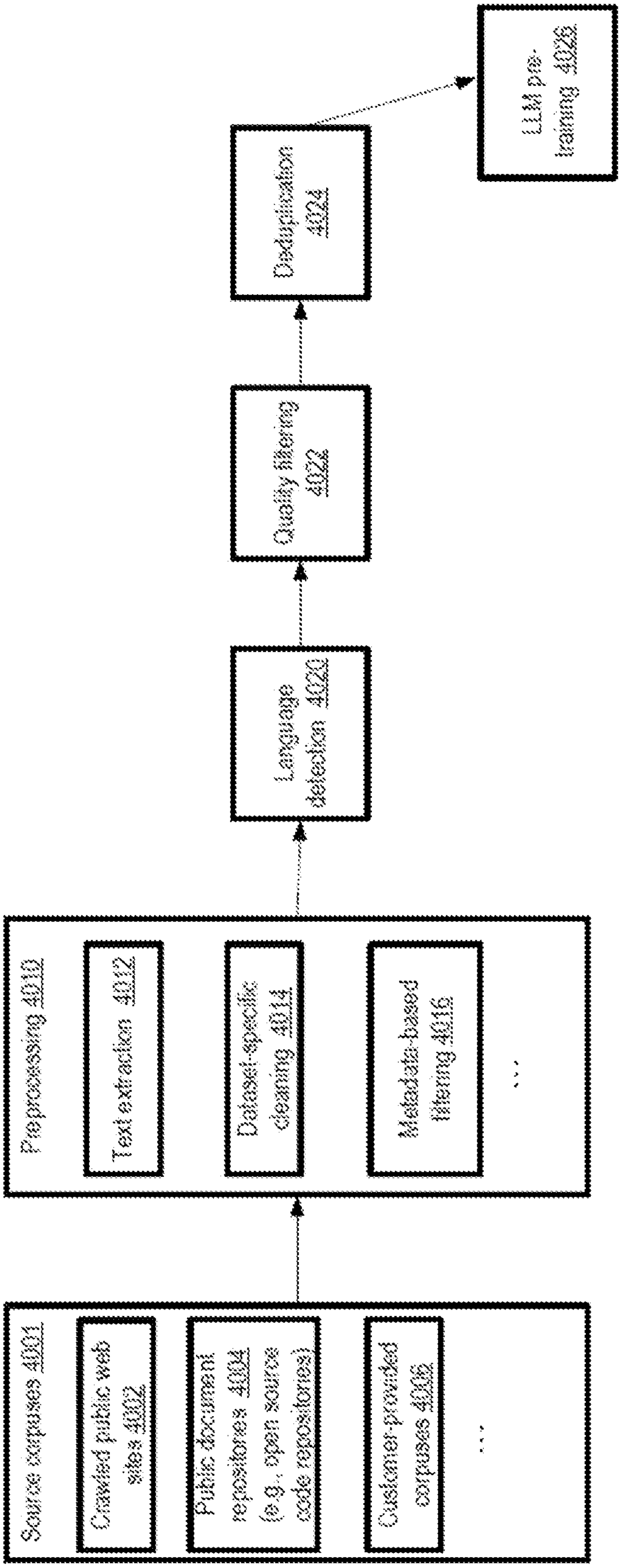
FIG. 10 illustrates a data processing pipeline which may be utilized to generate data sets used for pre-training an LLM at a foundation model service (FMS), according to at least some embodiments.

FIG. 10 illustrates a data processing pipeline which may be utilized to generate high-quality data sets used for pre-training an LLM at an FMS, according to at least some embodiments. One or more stages of the pipeline, or the pipeline as a whole, may be executed (e.g., with the stages being coordinated by a data processing manager of the kind shown in FIG. 8) in response to requests received via programmatic interfaces of the FMS in some embodiments, e.g., from an LLM developer or an LLM owner. Raw input data may be obtained from one or more source corpuses 4001 in the depicted embodiment, such as crawled public web sites 4002, public document repositories 4004 (such as open-source code repositories), and/or customer-provided corpuses 4006. Several different types of web crawls may be conducted in different embodiments, e.g., differing from one another in the number of different web sites that are crawled, or how deeply individual web sites are crawled (where depth may refer to the number of links that are followed in a depth-first sequence). A customer of the FMS may provide access to documents that the customer is willing to share to help improve the quality of pre-trained LLMs in some embodiments—e.g., the FMS may implement programmatic interfaces enabling such customers to specify the sources from which such documents can be obtained, and access documents from the sources indicated by one or more customers. In some embodiments a data licensing model may be implemented, in which the customers may be compensated for sharing their data or documents.

In various embodiments, the raw data obtained from the various corpuses may be converted to a common format (e.g., the JSONL or JavaScript Object Notation Lines) format before additional processing of the pipeline is conducted. The format may be specified via programmatic interfaces in some embodiments. In one embodiment, the pipeline may include a toxicity filtering phase (not shown in FIG. 10), in which for example an attempt is made to remove data which is designated as unacceptable or toxic (e.g., in terms of the language used or the topics discussed) based on a toxicity management policy of the FMS. In some embodiments, as a data set passes through the pipeline, new versions of the data may be prepared at one or more stages. In some cases, one or more of these versions (including the raw data version itself) may be retained along with annotations or metadata indicating the changes that were applied to obtain the respective versions. In at least some embodiments, the pipeline as a whole may be automated—e.g., a data processing configuration file outlining the steps of the pipeline may be prepared and then executed without requiring further intervention or interaction with the LLM owner/developer. In one implementation, the configuration file may be structured or formatted using JSON or a similar language.

As more corpuses are analyzed over time, a data catalog may be constructed at the FMS, indicating the different versions of various data sets that have been prepared, the dates/times at which the data sets were acquired or obtained, their relationships to each other (e.g., which data set is derived from which other data sets, and the transformations if any that were performed to derive the data sets), the particular FMs which were pre-trained using the data sets, and so on. In at least some embodiments, before a given data set is utilized for pre-training (or for other phases of LLM development such as evaluation), the data set may be approved by a designated entity or team of the FMS, and metadata indicative of such approvals may also be stored. Some data sets may be obtained by choosing random samples from other data sets, and metadata indicating the sampling that was performed (e.g., the source data set, the sampling algorithm, and its parameters, etc.) may be stored in at least some embodiments. Access to the catalog may be provided via programmatic interfaces of the FMS in some embodiments, enabling authorized users to view the different versions of data stores that have been generated and stored, the provenance or derivation history of the data sets, and so on. In at least one embodiment, new versions of the raw data of a given data set may be acquired periodically (e.g., a certain set of web sites may be crawled every N days, as new content may have been added to the web sites).

In a pre-processing phase 4010 of the pipeline, algorithms for text extraction 4012 may be executed on some or all of the raw data in the source corpuses in the depicted embodiment. Depending on the specific source from which a given portion of the raw data is obtained, dataset-specific cleaning 4014 may be performed in some embodiments—for example, for data sets which comprise documents in PDF format, errors commonly introduced by OCR may be eliminated; for data sets which represent back-and-forth electronic conversations and comments, the dialog of the conversations may be separated from the comments, and so on. In some embodiments, metadata-based filtering 4016 may be performed: e.g., metadata (obtained from external entities such as search engines) about the popularity of certain web sites relative to others may be used as a signal to determine whether to include content from those web sites or not, under the assumption that the quality of the content of web sites that are visited more frequently is likely to be better on average than the quality of the content of web sites that are rarely visited.

In some embodiments, a given version of an LLM may be focused primarily on queries in a particular language and may therefore be trained using text primarily in that language. A machine learning model may be used for language detection 4020 in the depicted embodiment, e.g., to filter out documents that are not in the language of interest, or to detect the fractions of each document that are in various languages. In some embodiments, an LLM may be pre-trained using documents or input in a variety of languages; the language detection model may nevertheless be utilized to identify, for individual ones of the input documents, the specific languages whose tokens are included in the input documents, and to store metadata indicating the languages used. Such metadata may be included in the input provided to the LLM for pre-training in some embodiments. A number of heuristics and/or machine learning models may be used for quality filtering 4022 of the input documents in some embodiments, e.g., to eliminate documents that appear to be poorly constructed (e.g., documents that comprise numerous grammatical errors) or appear to be generated by algorithms rather than humans. In deduplication phase 4024, duplicated documents or excessively duplicated n-grams may be identified and the documents may be removed/redacted accordingly. The output of the deduplication phase may be used as input for pre-training 4026 in the depicted embodiment.

In various embodiments, ablation experiments may be conducted at an FMS to choose the best algorithms and/or data sources for generating the pre-training input for an LLM. Consider a scenario in which an LLM with N billion parameters is to be pre-trained. To choose among several different data sources DS1, DS2, DS3, and DS4, ablation tests similar to the following may be conducted, e.g., in response to programmatic requests from LLM owners. A set of downstream applications that can be implemented using the LLM may be selected, such as summarization, classification, and question answering. Then, a smaller version of the LLM, LLM-small, may be pre-trained using different combinations of samples of data from DS1, DS2, DS3 and DS4 (e.g., samples from (DS1+DS2+DS3), samples from (DS1+DS2+DS4), etc.), and the results obtained from the different smaller versions with respect to the downstream applications may be obtained. If, for example, the combination of DS1+DS2+DS4 leads to the best results for the different applications, as evaluated using ground truth or as evaluated using a small set of human evaluators, DS1, DS2 and DS3 may be retained and DS3 may be removed from the set of data sources used for pre-training the larger version of the LLM. Similar ablation studies may be conducted using smaller-scale LLMs for choosing among different deduplication algorithms, different text extraction algorithms, and so on. In some embodiments, ablation tests may be conducted with several sizes of models, including small versions and medium versions, and the results obtained from the different sizes of models may be aggregated to determine the optimum combination of algorithms and/or data sets. In one embodiment, the ablation experiments may take several kinds of downstream inference results into account—e.g., results obtained using zero-shot or k-shot tests (in which zero or a few additional examples beyond the pre-training examples are used to train the LLMs) as well as results obtained from multi-task-learning tests. In some embodiments, some or all of the parameters of ablation tests (such as the particular combinations of data sets and/or algorithms which are to be tried out, the sizes of the small LLMs to be used for the tests, the criteria for choosing the combinations of data sets and/or algorithms to retain etc.) may be provided by LLM owners via programmatic interfaces of the FMS.

Figure 11:
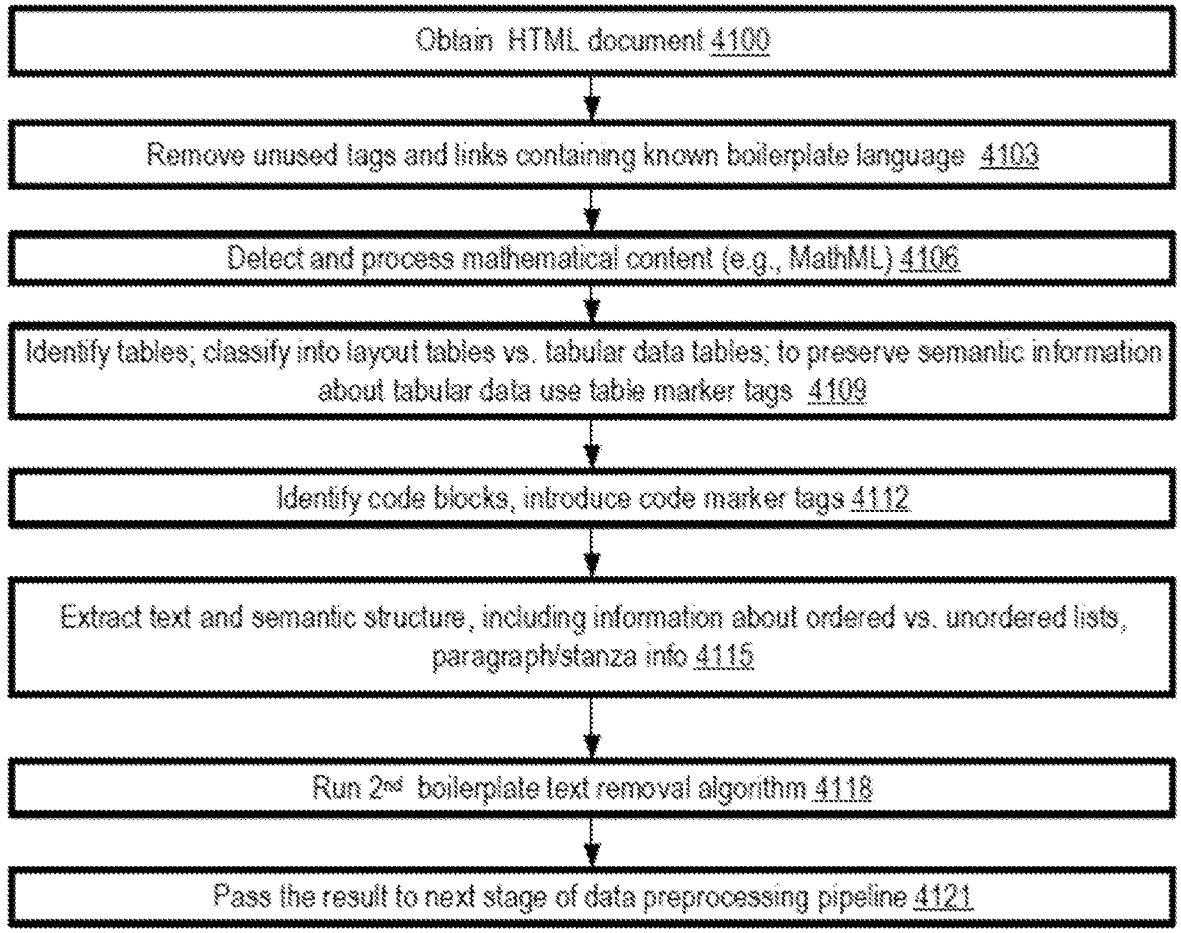
FIG. 11 is a flow diagram illustrating aspects of operations that may be performed to extract text from HTML documents for use during pre-training of an LLM at an FMS, according to at least some embodiments.

FIG. 11 is a flow diagram illustrating aspects of operations that may be performed to extract text from HTML documents for use during pre-training of an LLM at an FMS, according to at least some embodiments. Such text extraction may be initiated in response to programmatic requests from the LLM owner in one embodiment. In various embodiments, one or more LLMs may be pre-trained using a collection of input text documents that have been designated as high-quality documents using a set of algorithms and heuristics implemented at the FMS. A document may be considered a high-quality document if it satisfies the following criteria (note that some of these criteria may be subjective). The document should be free from major flaws in terms of formatting and content. Regarding formatting, it should not contain a large fraction of boilerplate text (text that tends to be included in numerous documents for formatting or other reasons but does not typically convey much information about the topic intended to be covered in the document), it should have clean formatting allowing the document to be consumed as input by the LLM and other tools without additional programming effort, and it should be free from spurious characters (e.g., Unicode representations of characters or symbols). Regarding content, the document should ideally indicate a high degree of effort by its author (i.e., it should be well structured and well substantiated). For example, if the document is about a technical topic, the author should demonstrate a deep understanding of that topic. Scientific, legal, business, and other high value domains documents from reputable sources may be considered high quality even if they contain minor formatting issues.

In many cases, a substantial portion of the data used for pre-training may be extracted from web documents expressed in HTML (Hyper-Text Markup Language) which contain richly formatted elements including headers, lists, tables, code in various programming languages or scripting languages, mathematical equations and expressions, and paragraphs or stanzas. Many of these elements may depend heavily on whitespace formatting to define their semantics. One of the objectives of the process of preparing high quality data for pre-training an LLM at an FMS may comprise retaining as much of such semantic information as possible in various embodiments, e.g., using plain text tags/annotations or other kinds of tags/annotations. In at least some embodiments, text in various languages may be included in a document (e.g., small sections of text in French or German may be included in a largely English document), and such text may also be preserved for use in pre-training.

The raw HTML of a document may be converted into a corresponding transformed/extracted text document version suitable for use in pre-training using operations of the kind shown in FIG. 11 in various embodiments. The requirements for this transformation/extraction procedure, which may be satisfied using the operations of FIG. 11, may be stated as follows:

- Semantic correctness: All the information that is in the rendered HTML document should be present in the transformed/extracted version.
- Formatting faithfulness: The transformed version should look as similar to the browser-rendered version of the HTML as possible. For example, if the HTML included blocks of programming language code, the transformed version should also clearly indicate the blocks of programming code (instead of for example converting the code into a stream of tokens that appear to be a natural language stream). The code blocks should be retained in such a fashion that they can be directly copied into a code editor and compiled/interpreted by the programming language compiler/interpreter without further changes. Empty lines that are used to cleanly separate paragraphs (or stanzas of poetry) should be retained in the transformed version. Lines of poetry sometimes depend on the placement of their words to convey part of their meaning; such placement should be preserved in the transformed version.

Retention of semantic objects: Structured objects such as lists, mathematical expressions and the like should be retained in such a way that the LLM is able to learn to reason about them. This may be helpful in improving the quality of results obtained from an LLM in at least two ways: (a) the LLM may be able to interpret end user input that contains such semantic objects (e.g., if an end user submits prompts/queries that include mathematical equations or lists, the LLM may be able to recognize them as equations or lists) and (b) the LLM may also be able to generate output comprising such semantic objects (e.g., in response to some types of queries/prompts, the LLM may generate lists, mathematical equations or formulas).

As shown in element 4100 of FIG. 11, an HTML document may be obtained at the FMS for text extraction and transformation, e.g., from one of the source corpuses selected for the LLM to be pre-trained. From that HTML document, unused tags and links containing known boilerplate language (e.g., a link to another web page, labeled "read more . . . ") may be deleted in various embodiments (element 4103).

In the next stage of the conversion/extraction procedure, shown in element 4106, mathematical elements (e.g., equations, formulas, etc., expressed using Mathematical Markup Language (MathML) or a similar technology) may be detected if present, and processed so as to retain the mathematical content in the depicted embodiment. The HTML may be examined for mathematical tags, for example, and then content associated with those tags may be converted (e.g., using a tool similar to pandoc) into LaTex or a similar format.

In various embodiments, tables in the HTML document (if any are present) may then be identified and processed (element 4109). HTML tables may be classified into one of at least two categories in the depicted embodiment: layout tables (which are used simply to place content at desired locations within a page layout, where the location of the content is not necessarily tied to the meaning of the content) and tabular data tables (where the meaning of content in various entries within the table is at least somewhat dependent on where the entry is within the table). For example, a table showing the high temperatures in a particular city on each day during a given month, arranged as a table with 7 columns (with one column showing each Monday's high temperature, the next column showing each Tuesday's high temperature, etc.) and 4-5 rows (one for each week), may be considered a tabular data table, while a table used to display a set of paragraphs of an article in a particular visual arrangement may be considered a layout table. A number of heuristics may be employed in different embodiments to distinguish these two types of tables from one another in an HTML document. For example, if tables are nested within one another, the top-level table may typically be classified as a layout table. Similarly, if a table contains just one row or just one column, it may typically be classified as a layout table. Tables containing a high density of links may also be classified as layout tables in some embodiments. If the table is identified as a layout table, in some embodiments it may be left unmodified; in contrast, if the table is predicted to contain tabular data, its HTML sub-tree may be replaced by a table marker tag in such embodiments to ensure that the text content of the table is not parsed in subsequent steps. As such, semantic information about tabular data tables may be introduced into the transformed version, enabling the tabular data to (eventually) be recognized as such by the LLM.

In operations corresponding to element 4112, code blocks (if any are present) may be identified in the HTML and code marker tags may be used in place of their respective HTML sub-trees. This may enable the LLM to recognize the content of the code blocks as programming language content during pre-training.

Text and additional semantic structure, including information about ordered versus unordered lists, paragraph or stanza information (e.g., indicated by the presence of blank lines or blank spaces within lines in the case of some poetry stanzas) and the like may be extracted next in the depicted embodiment (element 4115). The content of text nodes may be extracted, along with the structured elements (such as lists), if any, to which the text belongs.

A second boilerplate language removal algorithm may then be run in various embodiments on the HTML (element 4118). In some embodiments, this algorithm may comprise an enhanced and customized version of JusText or a similar algorithm. This may result in the removal of headers, footers, and other boilerplate elements in various embodiments. The cumulative result of all these analyses and transformations may be passed to the next stage of the data processing pipeline in the depicted embodiment (4121), e.g., the language detection stage. Internally, in some embodiments, the transformed versions of the HTML documents may be stored as serialized objects rather than text. At different stages of processing, a textual representation may be generated from the serialized document object. For example, a plain text representation may be used when running a language classifier model, whereas a markdown representation may be used when generating the final version of the data used for pre-training the LLM. The serialized object form may retain all of the semantic structure of the document in an abstract form independent of any particular textual representation in at least some embodiments.

According to some embodiments, a classifier ML model may be trained (using supervised learning) to distinguish between "high-quality" and "low-quality" documents for the quality filtering stage 4022 of the pipeline shown in FIG. 10. As examples of low quality documents, randomly selected documents from a web crawler may be chosen; as examples of high-quality documents, a set of documents may be selected based on heuristics (e.g., including heuristics based on the fraction or number of stop words, the lengths of sentences, whether the source web site belongs to a list of curated web sites published by professional associations, how many times the documents were up-voted or "liked" by a community of content consumers, etc.). When any given document reaches the quality filtering stage, a quality score may be obtained for that document from the model, and the document may be retained only if the score is above a selected threshold. In at least some embodiments, multiple quality scores may be obtained from respective quality classifier models (with the classifiers differing from one another along dimensions such as the heuristics used, the sources from which the labeled training data is obtained, etc.), and the document may be retained or rejected based on a statistic (e.g., the mean or the minimum score) derived from the different scores. In some embodiments, before being utilized in the pipeline, a quality classifier model may itself be evaluated to ensure that it is not simply using the source website as a proxy for quality—e.g., even some reputable web sites may produce poor quality web pages, and the model may be modified to take this into account. In various embodiments, ablation experiments may be performed using different combinations of quality classification models to identify the set of quality classifiers that work best (in terms of the ability of models, trained using the data designated as high-quality by the models, to perform typical LLM tasks such as summarization and question answering).

Figure 12:
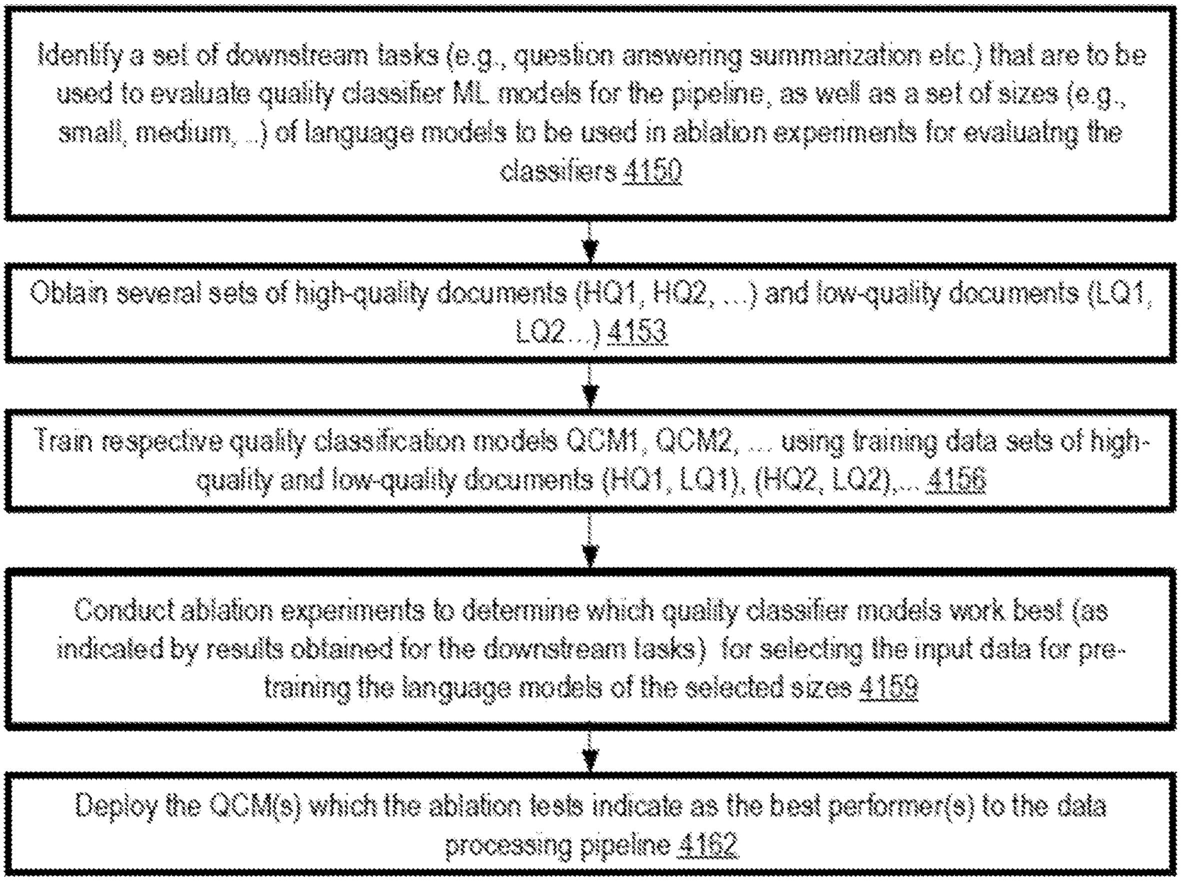
FIG. 12 is a flow diagram illustrating aspects of operations that may be performed to select machine learning models to be used at a quality filtering stage of a data processing pipeline for generating pre-training input data for LLMs of an FMS, according to at least some embodiments.

FIG. 12 is a flow diagram illustrating aspects of operations that may be performed to select machine learning models to be used at a quality filtering stage of a data processing pipeline for generating pre-training input data for LLMs of an FMS, according to at least some embodiments. As shown in element 4150, a set of downstream tasks for which LLMs are often used, such as question answering, summarization of input text, etc., may be selected at an FMS (e.g., by a data processing manager of the FMS based on programmatic requests from LLM owners) to help in the evaluation of quality classifier models (QCMs) that are to be used in the quality filtering stage of the pipeline. In addition, in at least some embodiments, a set of sizes (e.g., small and medium, expressed in terms of the number of parameters of the neural networks used and/or in terms of the total number of tokens of input used for pre-training or training the models) of language models to be used in ablation experiments for evaluating the QCMs may be chosen.

Several sets of high-quality documents HQ1, HQ2, . . . (labeled as high-quality by human quality evaluators, for example) and low-quality documents LQ1, LQ2, . . . (e.g., documents selected at random from the web) may be obtained (element 4153). Each such document set may comprise millions or billions of text tokens in some embodiments. Respective document quality classification machine learning models QCM1, QCM2, . . . , may each be trained using a combination of high-quality document sets and low-quality document sets (element 4156) to generate quality scores for input documents. For example, QCM1 may be trained using the combination (HQ1, LQ1), QCM2 may be trained using the combination (HQ2, LQ2), etc.

A set of ablation experiments may then be conducted to determine which of the QCMs is able to designate, as high-quality documents which should be used to pre-train the language models (of the sizes chosen in operations corresponding to element 4150), the documents which lead to the best results for the downstream tasks (element 4159). For example, the same input data set DS1 may be provided as input to each of the QCMs, and each of the QCMs may designate a respective subset DS1-subset1 (designated by QCM1), DS1-subset2 (designated by QCM2), etc., as a high-quality subset of DS1. The high-quality DS1 subsets thus identified may be used to pre-train respective versions the language models, e.g., a small language model LLM-small and a medium language model LLM-medium. Versions LLM-small-DS1-subset1 may be pre-trained using DS1-subset1, LLM-small-DS1-subset2 may be pre-trained using DS1-subset2, and so on. The small and medium language model versions may then be used to perform downstream tasks on the same set of input DS-eval, and the results obtained from the downstream tasks (as evaluated, for example, by human evaluators or using automated evaluation techniques) may be used to select the QCM or QCMs that led to the best performance on the downstream tasks. These best-performing QCMs may then be deployed to the data processing pipeline's quality filtering stage in various embodiments (element 4162). Various parameters of the experiments related to QCM selection may be specified via programmatic interfaces by LLM owners in the depicted embodiment.

The presence of duplicates (e.g., exactly-matching sections of text, or similar sections of text) in the data used for pre-training may also have an impact on the quality of the results produced by FMs. If there are large numbers of duplicate web pages or duplicate paragraphs (or n-grams) in the pre-training data, for example, this can potentially cause the LLM to bias its inferences towards the duplicated data (that is, it may become more likely to provide results that are based on the repeated input), and may even lead the LLM to regurgitate the repeated content in the output it produces. On the other hand, in many cases there may be legitimate reasons for the presence of similar sections of text in large corpuses, so removing them all may not result in retaining a sufficiently representative subset of the corpuses. Furthermore, a deduplication strategy that is too strict may result in eliminating very large amounts of input, which means that it may become harder to identify enough data for pre-training the LLMs.

Several types of choices may have to be made regarding the deduplication stage 4024 of the data processing pipeline for obtaining pre-training data sets. For example, should deduplication be performed at the document (e.g., web page) level, at sub-document level (and if at the sub-document level, how should documents be subdivided for deduplication purposes), or at multiple levels? What types of computational techniques should be used at the different levels selected for deduplication—e.g., should exact matches be used to identify duplicates, should hashing-based algorithms be used, etc.? Having identified duplicate data, what should be done about the duplicates-should all duplicates but one be simply removed/deleted (and if exact match is not being used, which one of the duplicates should be retained), should symbols indicating redaction replace the duplicated content, and so on? The quality of results produced by the LLMs may vary based on the answers to these questions in various embodiments.

Figure 13:
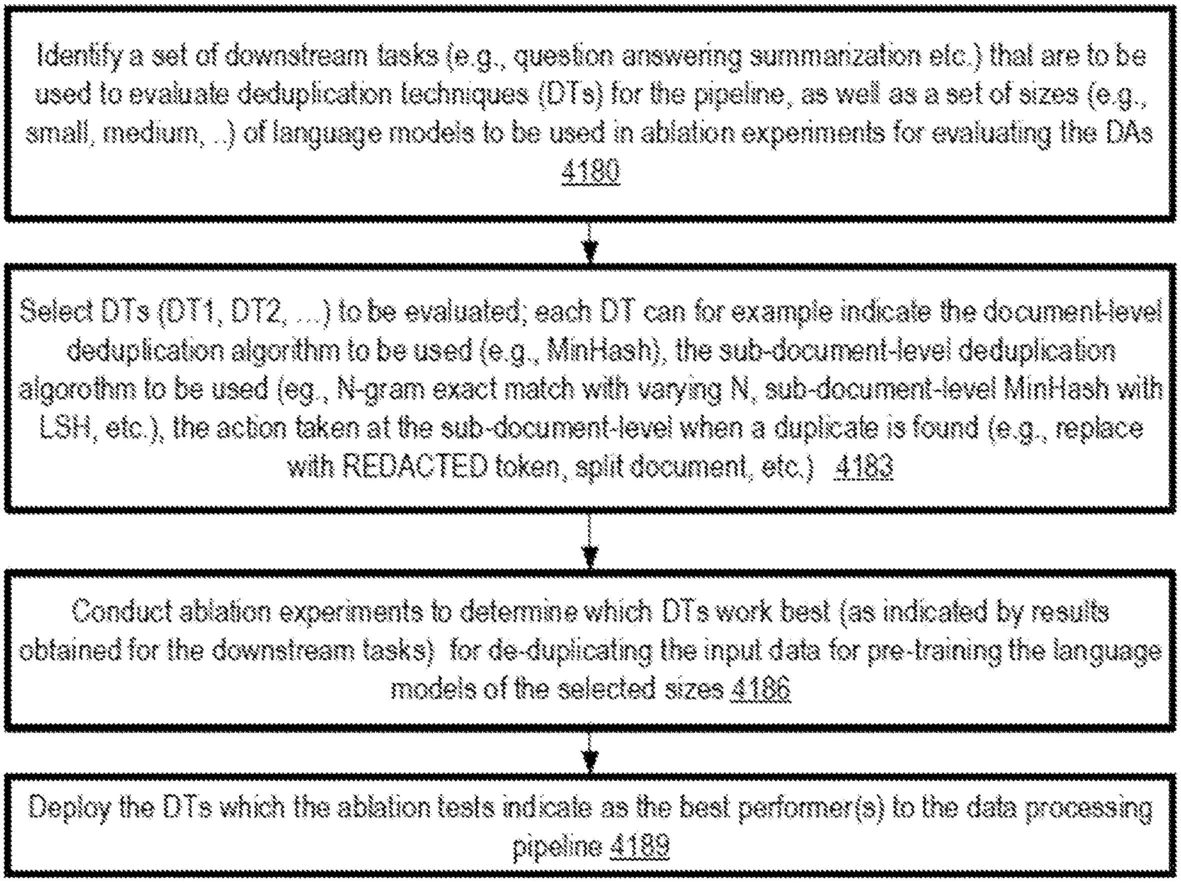
FIG. 13 is a flow diagram illustrating aspects of operations that may be performed to select algorithms and parameters for a deduplication phase of a data processing pipeline for pre-training data used for LLMs at an FMS, according to at least some embodiments.

Ablation experiments (conceptually similar in purpose to the ablation experiments discussed above with regard to the selection of quality classifiers) may be conducted in various embodiments to select the deduplication techniques to be employed in a data processing pipeline for generating pre-training data. FIG. 13 is a flow diagram illustrating aspects of operations that may be performed to select algorithms and parameters for a deduplication phase of a data processing pipeline for pre-training data used for LLMs at an FMS, according to at least some embodiments. As shown in element 4180, a set of downstream tasks for which LLMs are often used, such as question answering, summarization of input text, etc., may be selected at an FMS (e.g., by a data processing manager of the FMS) to help in the evaluation of deduplication techniques (DTs) to be used in the pipeline. In addition, in at least some embodiments, a set of sizes (e.g., small and medium, expressed in terms of the number of parameters of the neural networks used and/or in terms of the total number of tokens of input used for pre-training or training the models) of language models to be used in ablation experiments for evaluating DTs may be selected. DTs may also be referred to as deduplication strategies. Some or all of the parameters of experiments to be used for selecting DTs may be received via programmatic requests at the FMS in one embodiment.

A set of DTs (e.g., DT1, DT2, . . . ) to be evaluated may be selected (element 4183) in the depicted embodiment. A given DT may in effect include answers to the various deduplication-related questions listed above—the granularity or granularities at which duplicates should be detected should be performed, the computation techniques to be used for the different granularities, and the actions to be taken with respect to identified duplicates. A DT may indicate the document-level duplicate detection approach (if document-level deduplication is to be performed, whether exact match or an algorithm such as MinHash should be used) as well as the sub-document-level deduplication approach (if sub-document-level deduplication is to be performed, the number of tokens or the size(s) of n-grams to be considered, whether exact matches are to be used or techniques like MinHash should be used, whether location sensitive hashing (LSH) or other similar techniques should be used in combination with MinHash, what the parameters of the hashing should be) and so on. In some embodiments, a DT may also indicate the specific actions to be taken if/when duplicates are identified—e.g., removal of the document, replacement of an n-gram with a single white space or a REDACTED token, splitting of a given document at the boundary where a duplicated section of text was located, etc.

A set of ablation experiments may then be conducted to determine which of the DTs work best for the downstream tasks (element 4186). That is, a given data set DS1 may be supplied as input to all the DTs being considered, and the respective de-duplicated versions of DS1 (e.g., version DS1-DT1 obtained using a deduplication technique DT1, version DS1-DT2 obtained using a deduplication technique DT2, etc.), may be generated. The de-duplicated outputs of the different DTs may be used to pre-train respective versions the language models, e.g., a small language model LLM-small and a medium language model LLM-medium. Versions LLM-small-DS1-DT1 may be pre-trained using DS1-DT1, LLM-small-DS1-DT2 may be pre-trained using DS1-DT2, and so on. The small and medium language model versions may then be used to perform downstream tasks on the same set of input DS-eval, and the results obtained from the downstream tasks (as evaluated, for example, by human evaluators or using automated evaluation techniques) may be used to select the DT that led to the best performance on the downstream tasks. These best-performing DTs may then be deployed to the data processing pipeline's deduplication stage in various embodiments (element 4189).

LLM Instruction Pre-Training

One or more of the versions of an LLM made accessible to end users by an FMS may be used for multiple types of tasks—e.g., to summarize a section of text, to answer questions such as "what is a suitable title for this set of text" or "which of the characters in this story was responsible for a crime", and so on. MTL (multi-task learning) may be used in various embodiments (e.g., in a procedure referred to as pre-fine-tuning) with a pre-trained LLM to enable instruction following, which in turn enables the trained LLM to provide better performance on various downstream tasks. It has been observed that depending on the amount and type of input data (which may in some cases include unlabeled data) that is used for MTL, the LLM may in some cases actually forget a substantial amount of the knowledge or understanding it had achieved during pre-training.

In order to avoid such forgetting, in at least some embodiments, prompts may automatically be pre-fixed to unlabeled data used for MTL by a data processing manager or other component of the FMS. The prompts in some cases may be as simple as "Complete the following sentence" or "generate continuations for the following input". Adding such prompts to the input may help achieve the following benefits, among others, in various embodiments: (a) prevention of forgetting of pre-trained knowledge without compromising instruction following (b) avoiding model hallucinations that may otherwise result from naïve introduction or mixing of unlabeled data in the input used for the MTL stage pre-fine-tuning (c) enabling data augmentation by casting unlabeled data as a prompted labeled task (note that each unlabeled data sample may be reused and cast as a different prompted task, e.g., with one more castings for each type of pre-fine-tuning or pre-training objective) and/or (d) improving LLM generalization. A pool of resources (e.g., compute instances that can automatically generate prompts for unlabeled text sequences based on a few examples) may be set up for adding such prompts at the FMS in various embodiments, with new instances being added as needed. Such a scalable framework for adding such prompts may enable cost-effective exploration (e.g., with the help of ablation tests in which respective subsets of the different kinds of prompts are tested with respect to performance achieved on downstream tasks) of large-scale mixing of pre-fine-tuning or pre-training objectives/tasks to discover the optimal mix of objectives for MTL. In some embodiments, newly created prompted unlabeled text sequences may be mixed with pre-existing prompted and labeled datasets and trained with PLM/CLM (Prefix-Language Model/Causal Language Model) losses. The technique may be extended to numerous types of objectives that can be described using natural language in some embodiments. In some embodiments, a technique referred to as dynamic block causal attention masking may be applied to the unlabeled data. In one embodiment, unlabeled data may be sampled and various elements of the data may be split into a prompted source and corresponding target text.

In one embodiment, a version of an LLM (e.g., a version of the same LLM that is to be used for multiple tasks) may be used to automatically add prompts or instructions to unlabeled input data. This type of technique may in effect create pre-training data (or pre-fine-tuning data) with instructions added automatically, based on patterns that naturally occur in real-word data such as titles and documents, in order to help teach an LLM at scale to follow instructions without resorting to expensive supervised data annotations. For example, a version V1 of an LLM may be provided a few examples of the kinds of questions or prompts that might be appropriate for input text sequences. In one example scenario for text comprising a detective story or detective novel, a reasonable prompt may be "Who committed the crime described in this story?" or "Who solved the mystery described in this story?" Similarly, V1 may also be provided a few examples of news stories with the following question associated with each story: "What is a good headline for this news story?" V1 may then learn to automatically add such questions as prompts to unlabeled data which it can determine represents a detective story or a news story. Then, this version of V1 may be used to automatically add such prompts to unlabeled examples, and the automatically augmented versions of the examples (i.e., the versions with the added prompts) may be used to train other versions of the LLM. The need for human annotators to generate the prompts may thereby be reduced or eliminated.

Figure 14:
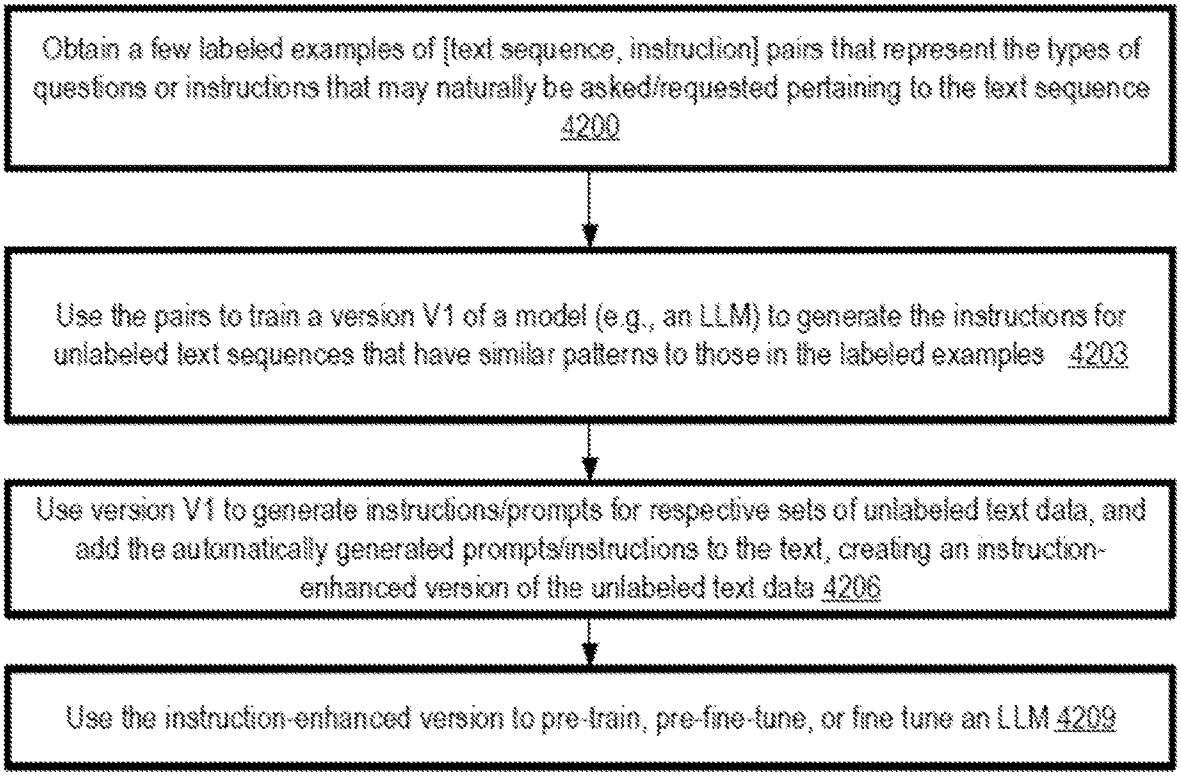
FIG. 14 is a flow diagram illustrating aspects of operations which may be implemented to automate the generation of instruction-augmented data from unlabeled data, according to at least some embodiments.

FIG. 14 is a flow diagram illustrating aspects of operations which may be implemented to automate the generation of instruction-augmented data from unlabeled data, according to at least some embodiments. A few labeled examples of [text sequence, instruction] pairs may be obtained (element 4200), e.g., at an FMS of the kind discussed earlier, e.g., from an LLM owner via programmatic interfaces. The instruction portion of a pair may indicate an instruction, question or prompt, expressed in natural language, that is relevant to the text sequence—e.g., "Who is the criminal in this story?" if the text sequence is a crime story. As shown in element 4203, the [text sequence, instruction] pairs may be used to train a version V1 of a model (e.g., an LLM) to generate instructions for unlabeled text sequences that have similar patterns or semantics as the text sequences in the labeled versions. V1 may, for example, learn to recognize an unlabeled text sequence as a crime story and generate the instruction "who is the criminal?" for it. Once V1 is trained, it may be used to automatically generate appropriate and add instructions for a large set of unlabeled text data sequences (element 4206)—e.g., for millions of unlabeled text sequence examples. An instruction-enhanced version of large corpuses of unlabeled text sequences may thereby be generated. The instruction-enhanced version may then be used at various stages of preparation of another LLM—e.g., for pre-training, pre-fine-tuning, or fine-tuning in various embodiments.

Sequence Size Ramp-Up for LLM Pre-Training

Sequence length (the number of tokens or words per input record, e.g., where a given input record comprises at least a portion of one or more sentences) may play a critical role in LLM pre-training. Sequence length may, for example, impact model stability, performance and training cost. Using longer sequences may have several benefits, such as enabling in-context learning and long dependency generation tasks such as code generation. In addition, LLMs with new types of capabilities may be developed using sequences of longer lengths—e.g., models that can deal with larger contexts such as books, plays or instruction manuals may be created. Many applications involving time series, audio and video that are naturally modeled as sequences of millions of steps are hard to implement without using long sequence lengths. On the other hand, training LLMs (e.g., neural network models using self-attention) with long sequences can be more expensive and, in some cases, more inefficient than if shorter sequences were used. For example, both time and memory complexity of transformer-based models may grow quadratically with respect to sequence length. Directly modeling long sequences using self-attention may be more difficult as language modeling tends to prefer localized attention. Intuitively, text tokens within a sequence may not always be related to one another very closely, and when sequence length increases, the signal-to-noise ratio may drop. Longer sequences can also potentially lead to greater probability of training instability in some cases. In addition, to minimize discrepancy between training and testing using differing sequence lengths, entropy consistency may need to be maintained.

The term "length extrapolation" is used to describe the use of shorter training sequences and longer test sequences during preparation of an LLM. If length extrapolation is used, new positional information may need to be handled at inference time, and the self-attention mechanism may need to handle more tokens when the inference sequence is longer. Any of a variety of techniques may be used to handle positional information in different embodiments, such as windowed self-attention (which can help reduce noise during training and thereby achieve better performance), functional positional embedding methods which require no learnable parameters, improved sinusoidal positional embedding, and randomized positional encoding (pre-training with positions from random permutations). To deal with the need to handle more tokens with respect to self-attention, in some embodiments, attention logits may be scaled using selected logarithmic scaling factors.

In some embodiments, a curriculum learning (CL) approach may be taken with respect to sequence length. Pre-training may be initiated with short sequences, and the length of the sequences may be increased gradually. Fused attention kernels may be used in one embodiment to reduce memory I/O. Block sparse attention techniques may be used in some embodiments (e.g., involving limiting the field of view to fixed predefined patterns such as local windows and block patterns of fixed strides). In one embodiment, a staged training technique may be used, in which the model is trained using different sequence lengths, with checkpoints of the model saved for the different lengths. The checkpoints may be used as starting versions of the model for longer sequence training, for example.

Figure 15:
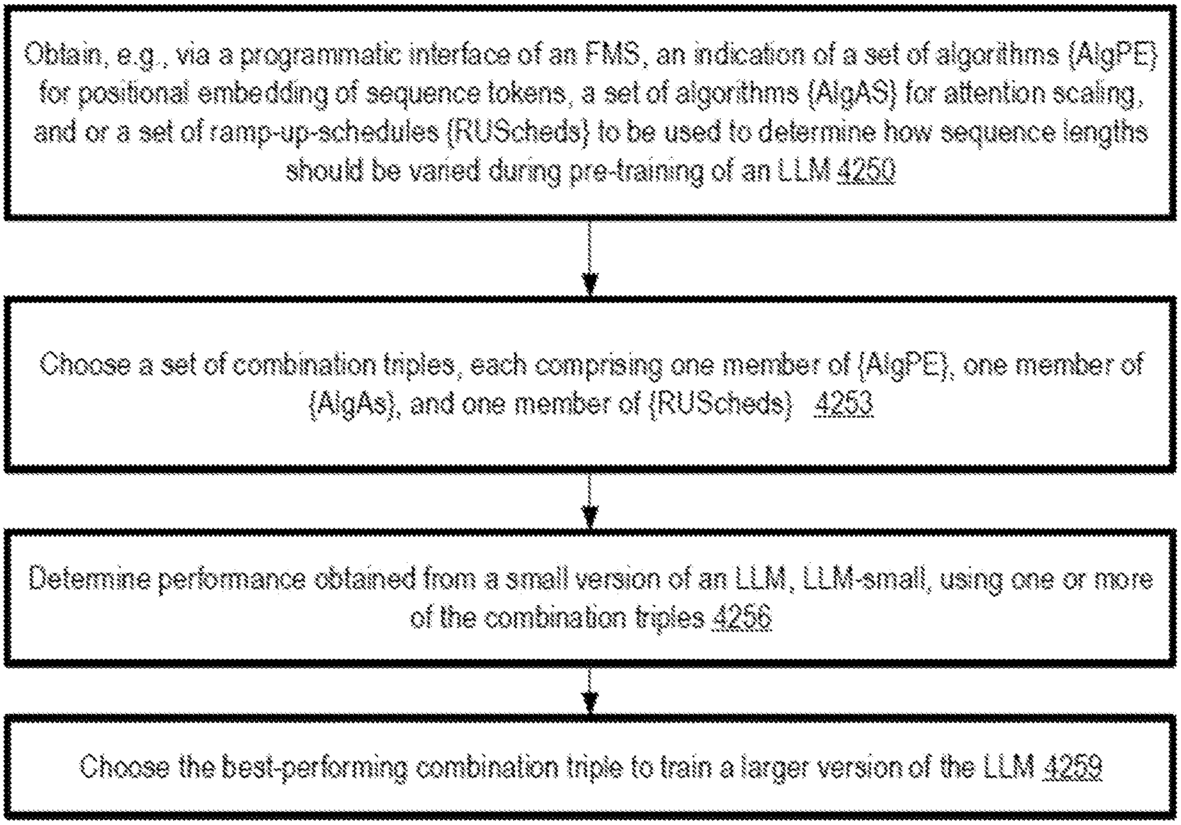
FIG. 15 is a flow diagram illustrating aspects of operations that may be performed to select the sequence lengths to be used to pre-train an LLM at an FMS, according to at least some embodiments.

FIG. 15 is a flow diagram illustrating aspects of operations that may be performed to select the sequence lengths to be used to pre-train an LLM at an FMS, according to at least some embodiments. As shown in element 4250, a set of alternative algorithms {AlgPE} for positional embedding, a set of alternative algorithms {AlgAS} for attention scaling and/or a set of alternative ramp-up schedules {RUScheds} for varying the sequence lengths during pre-training of an LLM may be identified, e.g., based on programmatic input received at an FMS from the LLM provider or owner. The ramp-up schedules may for example each indicate a starting sequence length (e.g., 512 tokens), an ending sequence length (e.g., 8192 tokens), and a delta value (e.g., how much the sequence should be increased by at each set of iterations of testing—whether the changes between 512 and 1024 tokens should be 512, 544, 576 . . . , or 512, 768, 1024). Both linear ramping up (e.g., sequence lengths 256 to 4096 for 0-90K pre-training iteration steps, followed by sequence length 4096 for 90K-100K steps) and step-wise ramping up (sequence length fixed at 512 for 0-10K steps, 1024 for 10k-20k steps, 2048 for 30k-80k steps, and 4096 for 80k-100k steps) may be included in the ramp up schedules in some embodiments.

A subset of combination triples of the members of {AlgPE}, {AlgAS} and/or {RUScheds} may then be selected—e.g., one combination Comb1 may comprise AlgPE-1, AlgAS-3, and RUScheds-4, another combination Comb2 may comprise AlgPE-7, AlgAS-3, and RUScheds-1, and so on (element 4253). In some embodiments, for example, the elements of the combination triples may be selected at random from among the three sets.

A relatively small version of an LLM, LLM-small, may then be trained using each of the combination triples in turn (element 4256). The combination triple that leads to the best performance of LLM-small with respect to a set of pre-selected tasks (such as continuation, summarization, question answering etc.) may then be chosen for training a larger version of the LLM (element 4259). In one embodiment, during some of the operations discussed in the context of FIG. 15, the total number of tokens (e.g., words) included in a given batch of data fed to an LLM during a given training iteration may be kept fixed.

Batch Size Ramp-Up for LLM Pre-Training

The batch size (the number of tokens or words that are provided to an LLM during a given iteration of pre-training or training) may also impact the overall time taken for training and/or the ability of the model to converge in various embodiments. If a small batch size is used, this may lead to under-utilization of the training resources (such as hardware accelerators which may be used for training the model at various compute instances). On the other hand, in at least some embodiments, if the total number of tokens is too high in a given iteration, while the resource utilization of the training resources may be higher, the model may not be able to make very much progress in its learning, as the signal-to-noise ratio may be too high. Training LLMs with large batches is known to lead to degradation in model performance (e.g., as measured by loss/accuracy), in some cases caused by the model sharding techniques implemented by specialized large-batch optimizers. Optimizers are typically more likely to get stuck in sharp-local minima leading to poorer convergence and generalization.

In various embodiments, a technique referred to as stage-wise batch size ramp-up may be used to avoid some of the problems associated with large batch sizes when training LLMs. This type of technique may be incorporated into any optimizer. In practice, LLM training rarely happens in a monolithic manner; instead, for example, it is often split into multiple stages which restart from intermediate checkpoints, with numerous aspects of training being changed for the different stages. During stage-wise ramp-up, smaller batch sizes may typically be used during early stages of the training, with batch sizes being increased gradually as training progresses. During the initial stages of the training, smaller batch sizes may allow the optimization algorithm to explore more local minima candidates, since the corresponding gradients may be noisier. Then, gradually, as the training progresses, the noise may be reduced using larger batch sizes, and the training may be made more stable. This may not be feasible if the training were initiated with large batch sizes, as there may not be enough capacity (noise) in the algorithm to explore good minima instead of getting stuck in bad local minima. Stage-wise batch size ramp-up techniques may use linear ramp-up schedules (in which the batch size is increased linearly) in some embodiments, and stage-sequence-dependent ramp-up schedules (in which a pre-selected fraction of the total token budget is used at each stage). For example, consider a 3-stage training schedule aimed at a target large-batch size of 4 million tokens. Stage 1 (0-25% of the training steps/iterations) may use batches of one million tokens in this example, stage 2 (25-50% of the training steps) may use batches of two million tokens, and stage 3 (50% to end) may use four million tokens.

Figure 16:
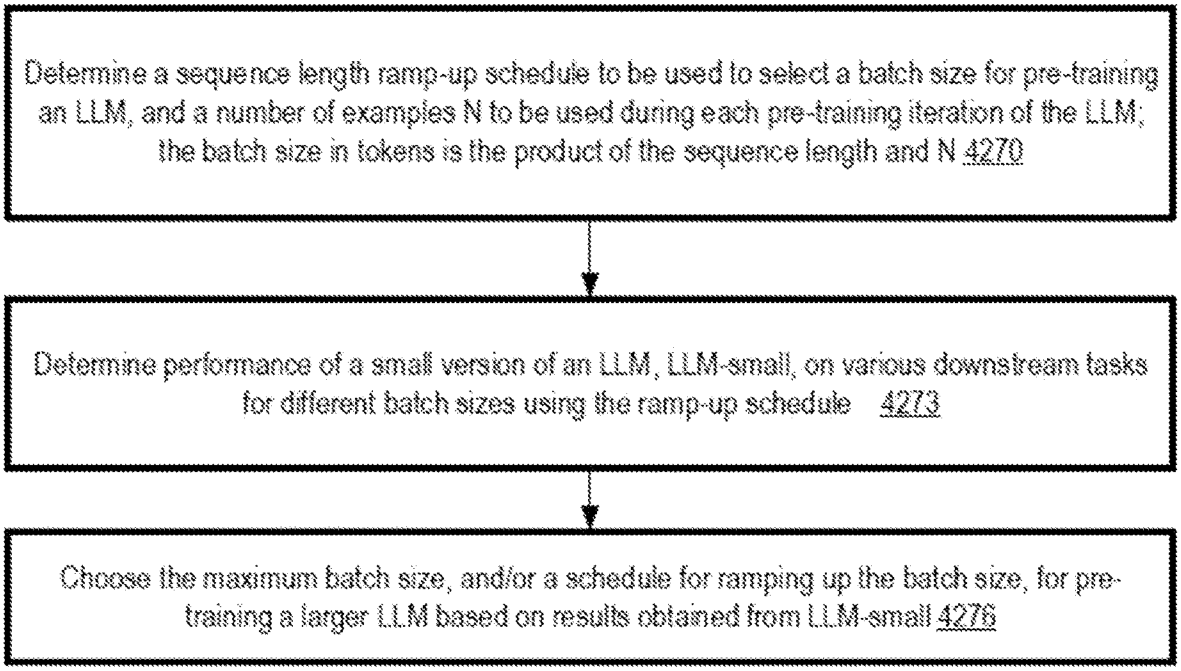
FIG. 16 is a flow diagram illustrating aspects of operations that may be performed to determine the optimum training data batch sizes to be used to pre-train an LLM at an FMS, according to at least some embodiments.

FIG. 16 is a flow diagram illustrating aspects of operations that may be performed to determine the optimum training data batch sizes to be used to pre-train an LLM at an FMS, according to at least some embodiments. As shown in element 4270, a sequence length ramp-up schedule to be used to select a batch size for pre-training or training an LLM may be determined, e.g., via a programmatic interface of an FMS. For example, a sequence length selection component of the FMS may use results of experiments of the kind discussed above in the context of FIG. 15 to choose a particular sequence length ramp-up schedule which performed well, and that sequence length ramp-up schedule may be chosen for related batch size selection experiments. The number of examples (sequences) N which should be used during each pre-training iteration of the LLM may also be obtained in various embodiments. The batch size for a given iteration would be the product of the sequence length and N. As shown in element 4273, the performance of a small version of an LLM, LLM-small, on a variety of downstream tasks such as summarization, question answering, and the like may then be determined for each of the batch sizes using the ramp-up schedule (element 4273). Based on the results obtained from LLM-small, the maximum batch size, and/or a schedule for ramping up the batch size, during pre-training of a larger LLM may be selected in various embodiments (element 4276). In some embodiments, a slightly different approach may be taken, in which stage-wise batch size ramp-up experiments with different combinations of parameters (e.g., different minimum batch sizes, different maximum batch sizes, linear versus stage-sequence-dependent schedules, and different fractions of training steps per stage) may be conducted without first identifying a sequence length ramp-up schedule, and results obtained for the downstream tasks using the different parameter combinations may be used to choose the manner in which batch sizes should be varied for training larger versions of LLMs. In some embodiments, the learning rate used for the LLM may be dynamically tuned/adjusted as the ramp-up proceeds. The learning rate may be adjusted as a function of a minimum threshold factor for the learning rate, a scaling factor, the number of training steps completed in the previous stage, the warmup steps for the current stage and the plateau steps for the current stage, for example.

LLM Domain Adaptation Using Weight Space Arithmetic

The weights learned by LLMs trained for different problem domains or target downstream tasks represent the insights or understanding achieved by the LLMs for those domains/tasks. Intuitively, it may be possible to use the weights learned for one domain by an LLM in some way to quickly adapt the LLM for a different domain. In some embodiments, techniques referred to as weight space arithmetic may be used for such embodiments.

Figure 17:
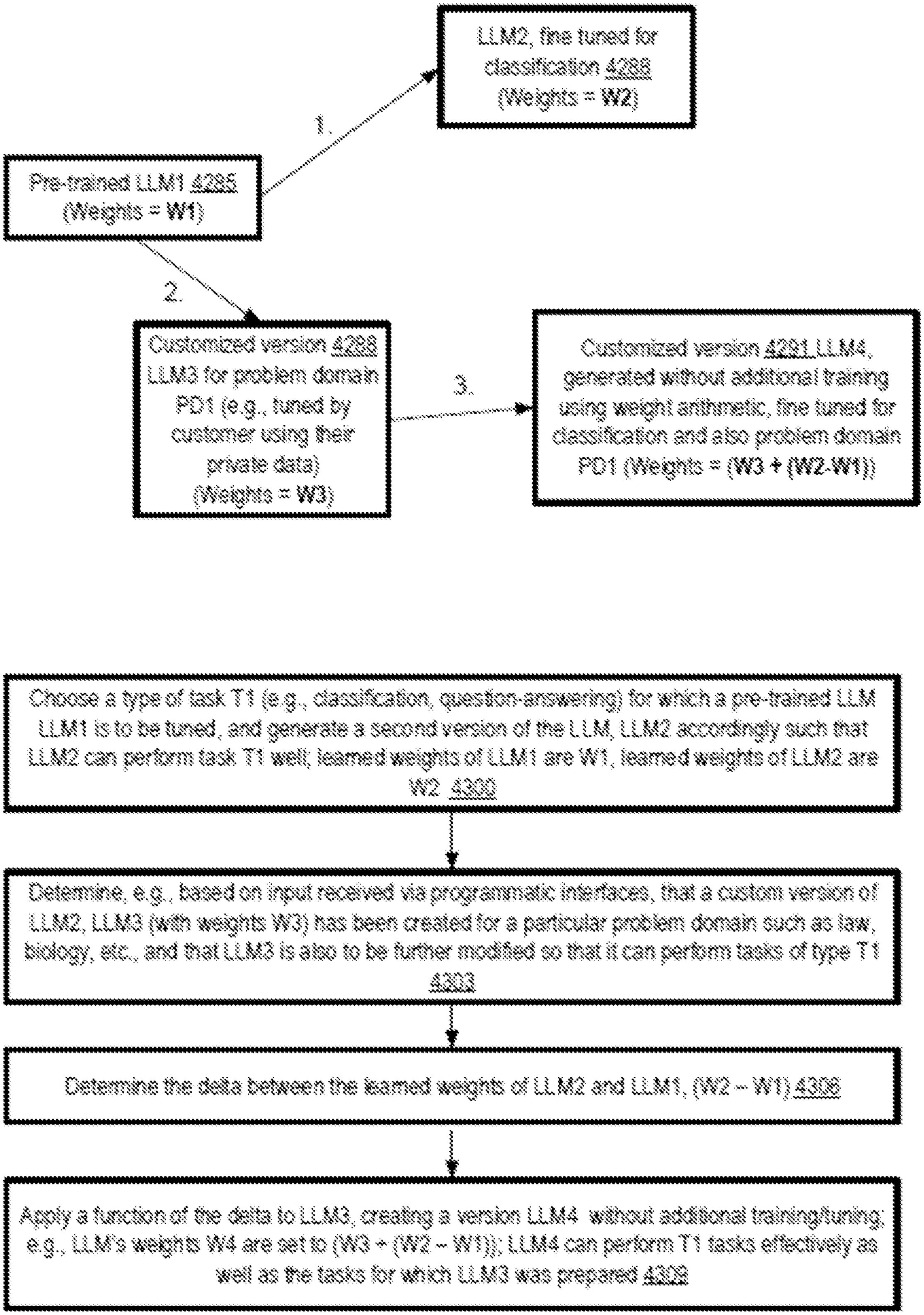
FIG. 17 illustrates an example scenario in which an LLM trained for one problem domain may be adapted for a second domain at an FMS by a technique involving direct modification of the model's weights, and a flow diagram illustrating aspects of operations that may be performed to perform such weight modifications, according to at least some embodiments.

FIG. 17 illustrates an example scenario in which an LLM trained for one problem domain may be adapted for a second domain by a technique involving direct modification of the model's weights at an FMS, and a flow diagram illustrating aspects of operations that may be performed to perform such weight modifications, according to at least some embodiments. In the example scenario shown, a pre-trained LLM, LLM1 4285 may have learned a set of weights W1. From that pre-trained model, as indicated by the arrow labeled 1, a new version LLM2 may be generated (e.g., via fine tuning) for a particular problem domain or task type such as classification. The learned weights of LLM2 (which may comprise a large matrix or array of numeric values) may be referred to as W2.

As indicated by the arrow labeled 2, independently of the preparation of LL2, a different customized version LLM3 4288 may be obtained from LLM1 for a particular problem domain, e.g., using another fine-tuning effort in which a private data set of a customer is employed. In some cases, the data set used to obtain LLM3 from LLM1 may not even be accessible to components of the FMS. The weights learned by LLM may be referred to as W3. In various embodiments, a second customized version LLM4 4291, capable of the same type of task as LL2 while also remaining fluent in the problem domain for which LLM3 was generated, may be generated using arithmetic or functions applied to the weights W1, W2 and W3. For example, the weights of LLM4 may be set to W3+(W2−W1) (note that these are matrix or vector computations). The intuition here is that the difference (W2−W1) represents learning that enables classification (or whatever task that LL2 was generated for) on top of the learning achieved during pre-training, so adding this difference to the weights W3 may enable LLM4 to be able to perform both the tasks for which LLM3 was generated, and also the task for which LLM2 was generated. In some embodiments, instead of doing straightforward addition and subtraction on the weights, somewhat more complex functions of W1, W2 and W3 may be used.

As shown in element 4300 of the flow diagram of FIG. 17, a type of task T1 (such as classification, question answering etc.) for which a pre-trained LLM LL1 is to be tuned may be selected, e.g., based on programmatic input received at an FMS. A second LLM, LLM2 may be generated accordingly, such that LLM2 can perform task T1 well (e.g., with a target performance level P). The learned weights of LLM1 may be represented as W1, and the learned weights of LLM2 may be represented as W2. A determination may be made (element 4303), e.g., via programmatic interfaces of the FMS, that a custom version of LLM1, LLM3 (with weights W3) has been created for a task of a particular problem domain such as law, biology, etc., and that LLM3 is also to be further modified so that it too can perform task T1 with the desired performance level P.

The difference or delta between the weights W2 and W1 may be computed or determined in the depicted embodiment (element 4306). A function of W2 and W1 (e.g., the delta itself, or other values derived from arithmetic on W2 and W1) may be applied to LLM3, creating a new version LLM4 without additional training/tuning the depicted embodiment (element 4309). For example, LLM4's weights W4 may be set to (W3=(W2−W1)) in one implementation. Because of these weight space manipulations, LLM4 may be able to perform T1 tasks effectively (e.g., with a performance level similar to that of LLM2), as well as the tasks for which LLM3 was prepared in the depicted embodiment. In at least one embodiment, a few additional training iterations may be performed on LLM4 to improve its performance on T1 tasks, but the amount of resources that have to be consumed for doing so may be very small.

LLM Multi-Task Generalization Using Weight Averaging

Figure 18:
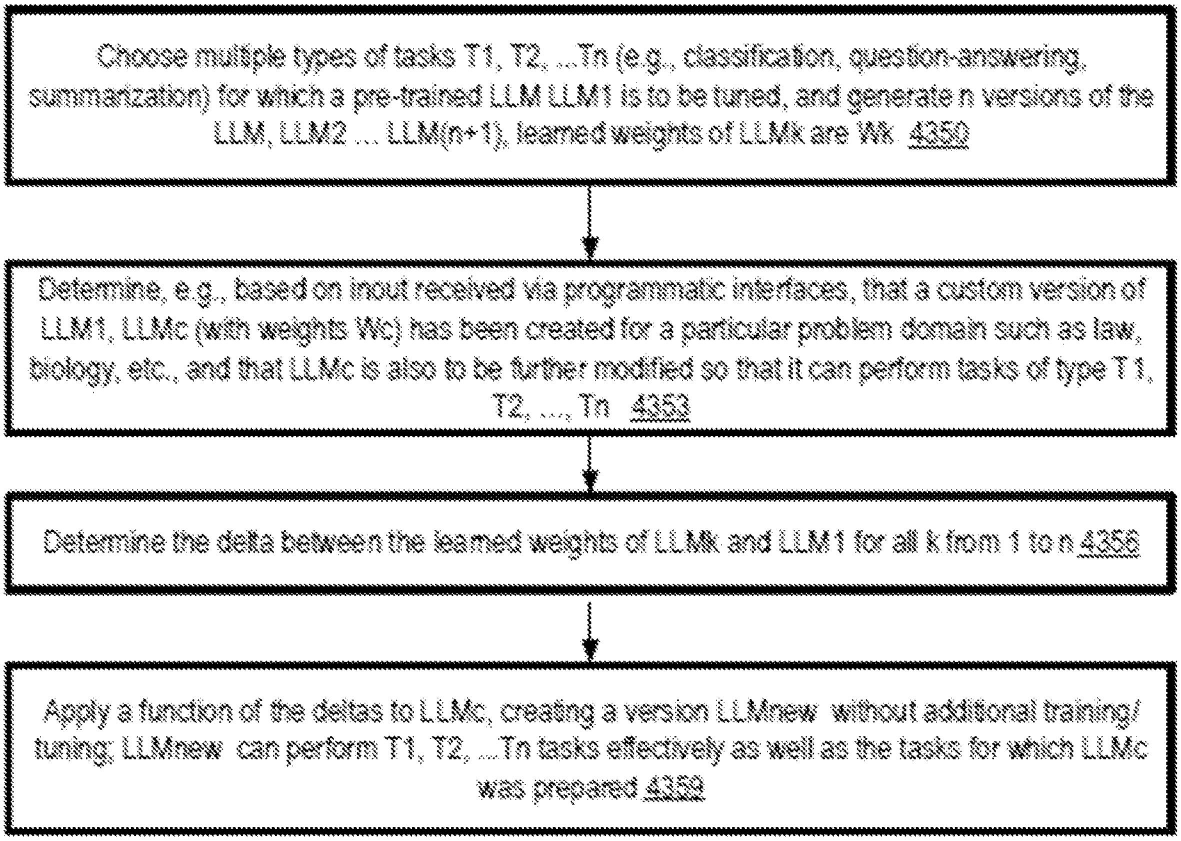
FIG. 18 is a flow diagram illustrating aspects of operations that may be performed to implement multi-task generalization using weight space techniques, according to at least some embodiments.

In some embodiments, weight space arithmetic techniques similar to those introduced above may be applied to adapt customized models for multiple tasks, and not just a single type of task such as task type T1 in the discussion pertaining to FIG. 17. FIG. 18 is a flow diagram illustrating aspects of operations that may be performed to implement multi-task generalization using weight space techniques, according to at least some embodiments. As shown in element 4350, multiple types of tasks T1, T2, . . . . Tn (e.g., classification, question-answering, summarization etc.) for which a pre-trained LLM LLM1 is to be tuned may be identified, e.g., based on programmatic input received at an FMS. Respective versions LLM2, LLM3, . . . , LLM(n+1) may be generated for each of the task types. The learned weights of LLM1, LLM2, . . . , LLM(n+1) may be referred to as W1, W2, . . . , W(n+1).

A determination may be made, e.g. based on additional programmatic input, that a customized version LLMc of LLM1 has been created for a particular problem domain such as law, biology etc., and that LLMc is also to be further modified so that it can perform tasks of the types T1, T2, . . . , Tn (element 4353). The respective deltas between the learned weights of each of the models that were trained for these tasks, and the learned weights W1 may be computed in the depicted embodiment (element 4356). For example, these deltas may comprise (W2−W1), (W3−W1), . . . (W(n+1)−W1). A function of these deltas (e.g., the average or mean) may be applied to the weights of LLMc, creating a new version LLMnew (element 4359) without any additional training/tuning. LLMnew may be able to perform tasks of types T1, T2, Tn effectively (e.g., as well as the corresponding models LLM2, LLM3 . . . , as well as the tasks for which LLMc was trained. In one example, the average of the deltas may be computed and added to the weights W3. Alternatively, the averages of the weights W2, W3, . . . . W(N+1)) may be computed, W1 may be subtracted from that average, and the result of the subtraction may be added to the weights Wc of LLMc. In this way, LLMc may be generalized for multiple tasks using weight space arithmetic.

LLM Vocabulary Swapping

A considerable amount of effort may be expended at an FMS on pre-training an LLM, using input in a particular language, to perform a set of tasks. As part of the pre-training, the LLM may generate embeddings (e.g., an embedding matrix or vector) representing its learned vocabulary in the chosen language. For example, depending on the tokenizer (the tool used to partition a text sequence into smaller units called tokens, which can be words or sub-portions of words) being used, in some embodiments, three tokens may be generated from the input "presentation": "pre", "sent" and "ation". Each such token may be represented as a point within the embedding space, and may be mapped to a respective numerical value (e.g., an integer in some implementations) at a position within a vector or matrix. It may sometimes be possible to adapt an LLM LLM1 which was pre-trained on one language L1, to a second language L2 by manipulating/modifying LLM1's vocabulary somewhat and performing a small amount of additional training using input in L2. This may lead to a considerable savings in training resource usage, as (for example) far fewer training iterations may be needed than if an LLM were to be pre-trained from scratch (using input in L2) to perform the same set of tasks.

Figure 19:
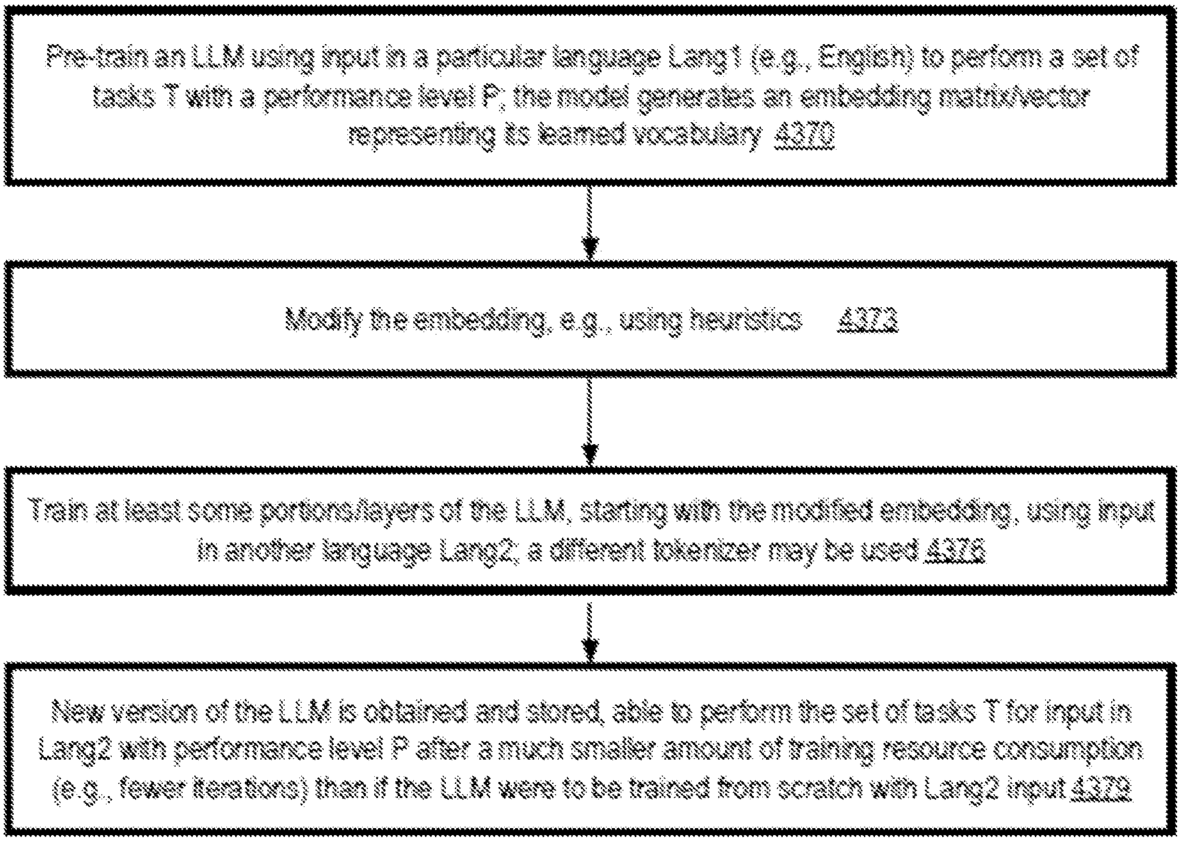
FIG. 19 is a flow diagram illustrating aspects of operations that may be performed to adapt an LLM for a different language than the one on which it was initially pre-trained, according to at least some embodiments.

FIG. 19 is a flow diagram illustrating aspects of operations that may be performed to adapt an LLM for a different language than the one on which it was initially pre-trained, according to at least some embodiments. As shown in element 4370, an LLM may be pre-trained at an FMS using input examples in a particular language Lang1 (such as English) to perform a set of tasks T with a performance level P. As part of its training, the LLM may generate an embedding matrix/vector representing its learned vocabulary. During the pre-training in Lang1, a particular tokenizer Tok1 may be used to split the input (which may be in the form of multiple sentences, for example) into smaller tokens which collectively form the vocabulary learned by the LLM.

After the desired performance level P has been attained, the Lang1 version may be adapted to a different language Lang2 using the following approach in at least some embodiments. The learned embedding may be modified, e.g., using a set of heuristics (element 4373) in response to a programmatic request. In some cases, for example, random modifications may be applied, e.g., by replacing at least some of the values in the embedding matrix/vector with random values. In other cases, deterministic modifications (e.g., modifications based on the extent to which Lang1 differs in terms of linguistics theory or lineage from Lang2, whether the two languages belong to the same language family, whether the two languages use a largely-common script or not, etc.) may be made to the embeddings. At least some portions of the Lang1 LLM may be additionally trained (e.g., for a few training iterations), starting with the modified embedding, using training input in a different language Lang2 (element 4376). In at least one embodiment, a different tokenizer may be used than was used for pre-training the Lang1 LLM; this may be done, for example, if Lang2 uses more characters/symbols (or a different set of characters/symbols) than Lang1. In some embodiments, the whole model may be trained using the Lang2 input; in other embodiments, only the embedding matrix/vector may be learned or modified during this additional training, keeping other portions of the Lang1 LLM unchanged, or only a subset of neural network layers of the Lang1 LLM may be trained along with the embedding. A new version of the LLM may be obtained and stored after the additional training (element 4379). This new version may be able to perform the set of tasks T for input provided in Lang2, at the performance level P, after a much smaller amount of training resource consumption (e.g., far fewer training iterations) than would have been required if the LLM were trained from scratch.

Progressive Compilation for Distributed LLM Training Scheduling

FMs such as LLMs can often require extensive computation resources for pre-training. In order to help speed up the training, several types of techniques have been identified, such as using more efficient kernels for some of the computations involved, various types of parallelism such as data parallelism, tensor parallelism and pipeline parallelism, etc. However, in some conventional approaches, trying out such execution optimization techniques can require changing the model definition (the programmatic representation of the logic and structure of the model) itself, potentially creating a respective model definition for each new execution optimization technique combination which is to be tried out. In contrast, in at least some embodiments a scheduling language for LMs may be supported at an FMS, which separates the specification of the model definition from the specification of the kinds of execution optimizations which are to be attempted. As a result, custom versions of the model definition may not need to be rewritten for respective execution optimizations, reducing the effort required from the data scientists that define the model. In some embodiments, the FMS may also implement an LLM auto-tuner, which can automatically schedule numerous experiments trying out the different execution optimization techniques selected for an LLM by the LLM owner/developer, with the definition of the LLM only having to be specified once to the auto-tuner.

Figure 20:
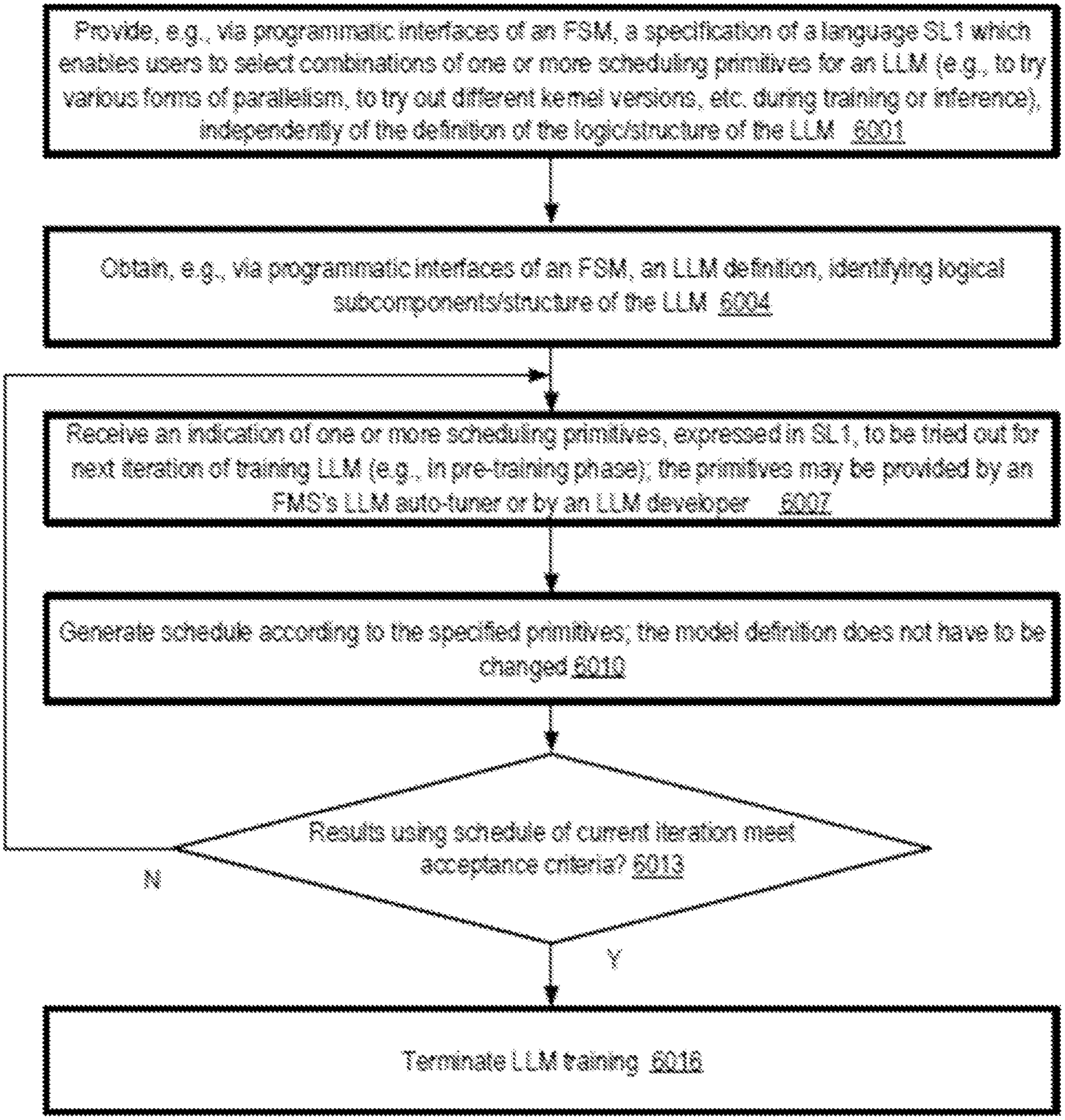
FIG. 20 is a flow diagram illustrating aspects of operations that may be performed to progressively optimize execution of an LLM, using a language that supports a set of scheduling primitives which can be specified separately from the core definition of the LLM logic, according to at least some embodiments.

FIG. 20 is a flow diagram illustrating aspects of operations that may be performed to progressively optimize execution of an LLM, using a language that supports a set of scheduling primitives which can be specified separately from the core definition of the LLM logic, according to at least some embodiments. As shown in element 6001, a specification of a language SL1 which enables users such as LLM owners to select combinations of one or more scheduling primitives for execution optimization may be presented or provided, e.g., via programmatic interfaces of an FMS. The primitives may be used, for example, to try out various forms of parallelism, to try out different kernel versions, etc. during training or inference, independently of the definition of the logic/structure of the LLM. In some embodiments, for example, some of the supported primitives may include replace, shard, sync, checkpoint, fuse, and/or pipeline_split. Note that additional primitives may be added for new optimization techniques over time to SL1. In some implementations, the syntax used for specifying the primitives may prefix the character "." to the name of the primitive—e.g., ".replace (parameter-list)" may be introduced in the LLM code to specify the replace primitive, etc. The replace primitive may be used, for example, to replace a given module of the LLM with a different implementation (e.g., a highly efficient version of a kernel, such as a kernel for an attention module, which has been crafted specifically for a certain kind of hardware accelerator available at the FMS). A given parameter may be sharded or partitioned using the shard primitive, and outputs obtained using the sharding may be aggregated using the sync primitive. The sync primitive may have a "type" parameter in some embodiments, which can be set to "forward" to aggregate the forward activations, "backward" to aggregate the gradients, or "both" to perform both types of aggregations SL1 may support a checkpoint primitive in some embodiments for implementing activation checkpointing without changing the LLM implementation. The fuse primitive may be used for operator fusion, which can help reduce data transfer and kernel invocation overhead to improve latency, throughput, and memory footprint. The pipeline_split primitive may be used to annotate pipeline split boundaries for pipeline parallelism.

A definition of a particular LLM may be obtained at the FMS (element 6004), e.g., via a programmatic interface from an LLM developer or owner. The definition may indicate the logical subcomponents of the LLM, without specifying details about how the execution of the LLM training is to be conducted. In one embodiment, from the LL definition, a default execution schedule may be generated at the LLM, assuming a certain set of distributed computing resources are available for the LLM; this default schedule may be employed if no indications or hints regarding optimization of training execution are received. In some embodiments, the LLM may be defined using a hierarchical structure, e.g., for better readability and maintenance. In one implementation, for example, an _init_ constructor of the LLM may define the configurations, submodules, and learnable parameters of the LLM, while a "forward" method may define the forward computations (the backward computations being generated automatically by the LLM framework being used). In some embodiments, a "create_schedule" method may be applied recursively to the submodules at various levels of the hierarchy to create the default schedule.

In at least some embodiments, the LLM developer or owner may wish to conduct a set of optimization experiments to help speed up the training of the LLM. The experiments may be conducted progressively in some embodiments, with one or a few optimization choices being tried out in one iteration, then a next set of optimization choices being tried out (e.g., in addition to the best-performing optimizations that have already been tried) in the next iteration, and so on. This approach may be referred to as progressive compilation. An indication of one or more scheduling primitives, expressed in SL1, to be tried out for next iteration of training the LLM may be received at the FMS in the depicted embodiment (element 6007). The primitives may be provided, for example, by an FMS's LLM auto-tuner or by the LLM developer/owner. An execution schedule (e.g., a determination of which portions of the model are to be executed at which sub-group pf distributed computing resources, how the input data is to be distributed among he distributed computing resources, etc.) may be generated in accordance with the primitives indicated for the current iteration (element 6010). The generated schedule may then be implemented, i.e., a portion of the training of the LLM may be conducted using the schedule. If the results obtained in the current iteration satisfy a set of criteria for terminating the LLM's training, as indicated in element 6013, the training may be concluded (element 6016). Otherwise, an addition set of primitives may be obtained and another progressive compilation iteration may be conducted—e.g., operations corresponding to elements 6007 onwards may be repeated for the next iteration. Note that in at least some embodiments, the approach illustrated in FIG. 20 may be implemented not just during pre-training or training of an LLM, but also during inference.

Combining Data Parallelism and Pipeline Parallelism for LLMs

The total amount of data that is used to pre-train an LLM may be very large, and typically cannot fit into the memory of a single computing device or accelerator used for the training computations at an FMS. Accordingly, the input data may be partitioned, and respective devices may be utilized to learn from respective subsets of the input in various embodiments. This technique is referred to as data parallelism (with one such approach being referred to as fully-sharded data parallelism or FSDP). However, in some scenarios in which data parallelism is employed, the communication overhead (e.g., from messages required to share the learned weights at each of the training devices with the remaining devices) may become quite high, leading to inefficiencies during training. Accordingly, in some embodiments, data parallelism may be combined with pipeline parallelism at the FMS for pre-training or training LLMs. In this approach, the input data may be partitioned with each partition being consumed at a respective server, and different layers of the model may also be trained at respective servers in parallel. The combination of the two techniques can lead to speeding up training substantially for some LLMs.

Figure 21:
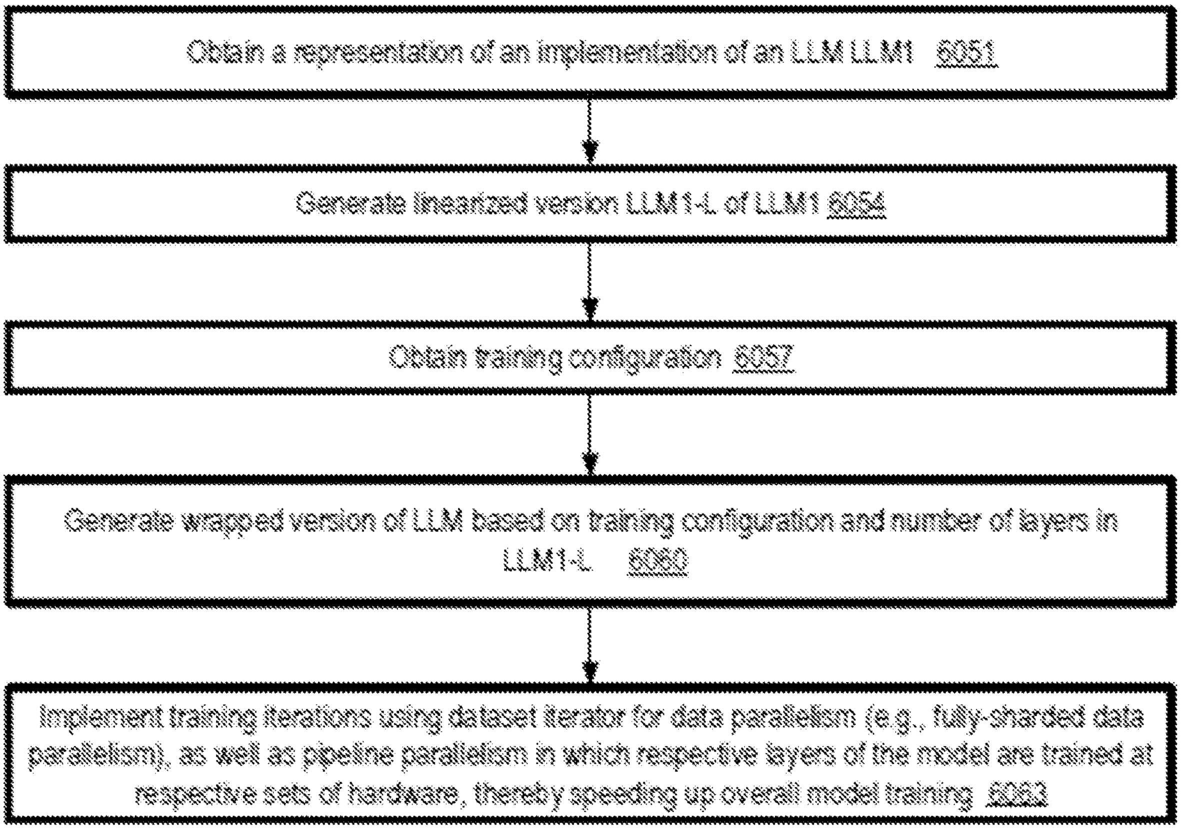
FIG. 21 is a flow diagram illustrating aspects of operations that may be performed to support data parallelism together with pipeline parallelism for LLM training, according to at least some embodiments.

FIG. 21 is a flow diagram illustrating aspects of operations that may be performed to support data parallelism together with pipeline parallelism for LLM training, according to at least some embodiments. As shown in element 6051, a representation of an implementation or definition of an LLM LLM1 may be obtained at an FMS, e.g., via programmatic interfaces from an LLM developer. The implementation may be specified, for example, using a variant or derivative of Python or a similar language. An indication of the input data set to be used to train or pre-train LLM1 may also be obtained in at least one embodiment, e.g., indicating the manner in which the input data is to be partitioned or sharded for data parallelism.

A request to implement both data parallelism and pipeline parallelism may be received via the programmatic interfaces in some embodiments. A linearized version of the LLM, LLM1-L may then be generated (element 6054). In the linearized version, in some embodiments the inputs and outputs of each layer may be represented as lists, and the layers of the LLM itself may be represented as a list. This may enable the FMS to determine the boundaries of the model, so that the model can be split into multiple stages for training. A training configuration for the model may be obtained in the depicted embodiment (element 6057), e.g., based on programmatic input from the LLM owner/developer, indicating various parameters to be used for scheduling the training. A wrapped version of LLM1-L may then be generated automatically at the FMS (element 6060) based on the training configuration, in which different layers of the model are mapped to respective sets of servers. The training iterations of the LLM may then be conducted (element 6067) using a data iterator which implements the chosen strategy for data parallelism, the wrapped version of LLM1-L which implements the pipeline parallelism, and a set of computing devices or accelerators of the FMS. The trained version of LLM1 may be stored and used for inference in various embodiments, e.g., with or without fine tuning. Combining pipeline parallelism with data parallelism may enable the most frequent communications required during training to be confined within individual devices or training nodes, thereby enabling more overlaps overall between communication and computation and increasing the efficiency of the training (e.g., reducing the time taken for training, and increasing the utilizations of the hardware devices being used).

Instance-Type Specific Combinations of LLM Parallel Training Techniques

In some embodiments, any of several categories of compute instances of a cloud provider network's virtualized computing service may be used for distributed training of an LLM. The categories of the compute instances may have respective performance profiles—e.g., some compute instance categories may each have access to N1 hardware accelerators of one type, others may have access to N2 hardware accelerators of another type, and so on. Depending on the types of accelerators to be used for training a given LLM, and on the internal details of the LLM being trained (e.g., the kinds of modules the LLM has, the total number of layers, the total number of parameters, and so on), different combinations of parallel training techniques such as data parallelism, pipeline parallelism and tensor parallelism may result in the best overall training performance (e.g., the shortest time to complete pre-training of the LLM.

Figure 22:
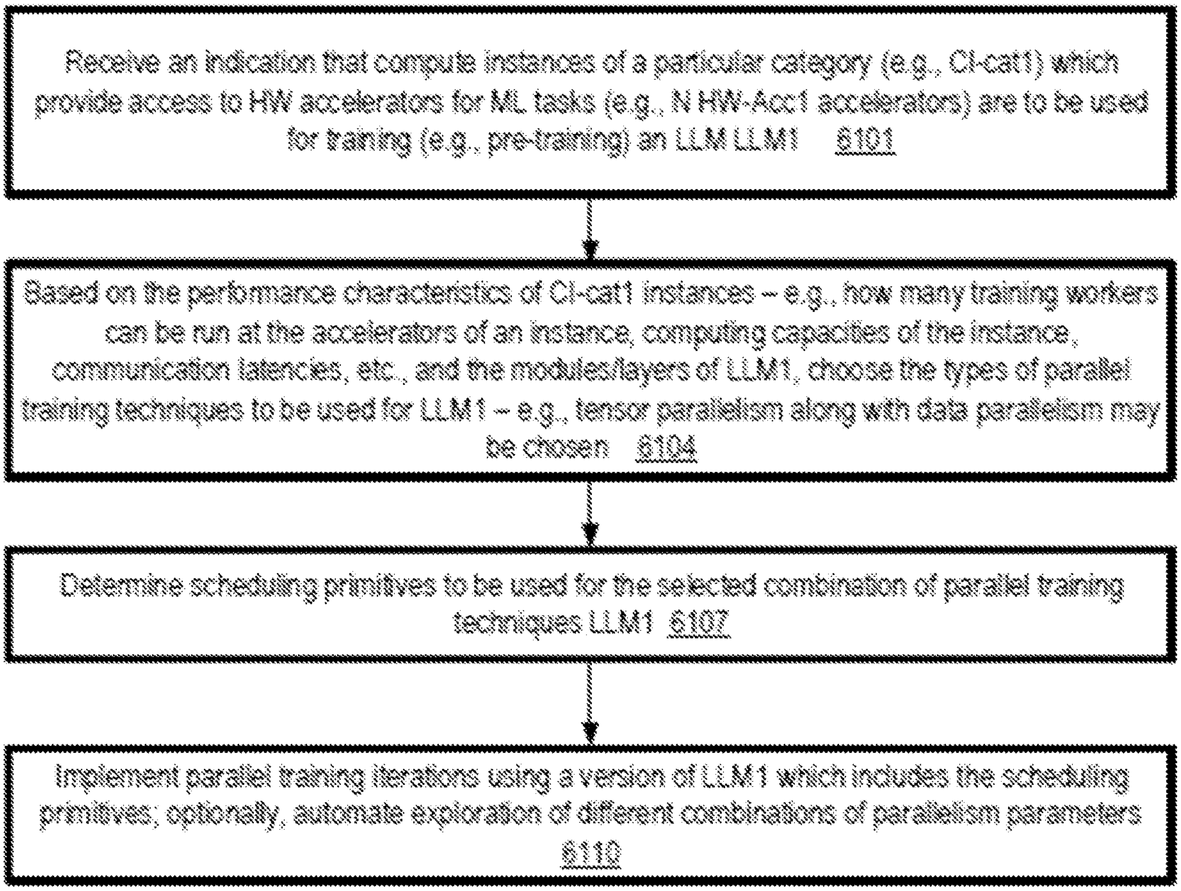
FIG. 22 is a flow diagram illustrating aspects of operations that may be performed to implement instance category-specific combinations of parallelism techniques for LLM training, according to at least some embodiments.

Tensor parallelism is a type of model parallelism in which specific model weights, gradients, and optimizer states are split across devices. In contrast to pipeline parallelism, which keeps individual weights intact but partitions the set of weights, tensor parallelism may split individual weights among the devices. This may typically involve distributed computation of specific operations, modules, or layers of the model. Tensor parallelism may for example be required in cases in which a single parameter consumes most of the accelerator memory (such as large embedding tables with a large vocabulary size or a large softmax layer with a large number of classes). In such cases, treating this large tensor or operation as an atomic unit may be inefficient and may impede balancing of the memory load. Tensor parallelism may also be useful for extremely large models in which pure pipelining may not be sufficient. For example, for some extremely large language models, pure microbatch pipelining may be inefficient because the pipeline depth can become too high and the associated overhead may become prohibitively large. For some LLMs, FIG. 22 is a flow diagram illustrating aspects of operations that may be performed to implement instance category-specific combinations of parallelism techniques for LLM training, according to at least some embodiments. As shown in element 6101, an indication that compute instances of a particular category (e.g., CI-cat1) which each provide access to some number of hardware accelerators for machine learning tasks (e.g., N accelerators of type HW-acc1 per compute instance) are to be used for training (e.g., the pre-training phase) of an LLM LLM1 may be received at an FMS, e.g., via programmatic interfaces from a developer or owner of LLM1. In at least some embodiments, the programmatic interfaces may be used by the LLM1 owner to provide an indication that parallelized training and/or parallelized inference is desired for LLM1. Components of the FMS, such as distributed training coordinators, may have an indication of the performance characteristics or profiles of the different categories of compute instances that are available for training LLMs, e.g., based on testing conducted at the FMS. The instance category-specific parameters taken into consideration may include, among others, how many training workers (e.g., processes) can be run in total at the accelerators of the compute instances, the computing capacities of the instances' accelerators (e.g., expressed in units such as floating point operations per second), the communication latencies for messages between accelerators (both within a given compute instance and between compute instances run at separate virtualization hosts) and/or between instances of a cluster, and so on. In some embodiments, the training coordinators may determine, for example, that a combination of tensor parallelism and data parallelism is the best approach; in other cases, other combinations of parallelism techniques may be selected. In various embodiments, ranges for one or more parameters of the different parallelism techniques may also be chosen by the training coordinators. In some embodiments, inter-node or inter-accelerator tensor parallelism may be selected as one of the parallelism techniques which are likely to work well for the LLM.

According to some embodiments, a set of scheduling primitives (e.g., such as some of the primitives discussed above with respect to the scheduling language SL1) that can be used to implement the selected kinds of parallelism techniques for LLM1 may be identified at the FMS (element 6107).

Based at least in part on the performance characteristics of CI-cat1 instances, and/or on the modules/layers of LLM1, the types of parallel training techniques which should be used for LLM1 may be determined by the training coordinators of the FMS in the depicted embodiment (element 6104). In various embodiments, parallel training iterations for LLM1 may then be conducted at the FMS using the selected combinations of parallelism techniques (element 6110). A version of LLM1 which includes the scheduling primitives (such as tensor parallelism-related invocations of the shard and sync primitives discussed above) may be obtained or automatically generated for the training in some embodiments. In some transformer-based LLMs a substantial fraction of the parameters may be in the linear and embedding layers. Depending on the programming language being used for the LLMs, parallelized versions of such layers may be wrapped in a library and used as building blocks. In some embodiments, automated exploration of different combinations of parallelism techniques and parameters may be conducted, e.g., using ablation experiments on small versions of LLM1. The trained version of LLM1 may be stored and used for inference in various embodiments, e.g., with or without fine tuning.

CPU Memory Based Checkpointing for Faster LLM Training Recovery

In various embodiments, as indicated above, the training of an LLM or FM may be distributed among numerous training servers equipped with respective sets of accelerators; each such server may for example comprise one or more compute instances. Failures may sometimes occur at a small number of such servers, as is not uncommon in large distributed systems. The training state information of an LLM (e.g., comprising the weights learned thus far in the pre-training or training procedure) may be distributed at least among the local memories of the accelerators. If and when a server being used for distributed training fails, checkpoints that were created and stored during the earlier distributed training may be used to recover the training state of the model, so that training can proceed from a recent checkpointed state instead of having to be restarted from scratch. In various embodiments, a number of efficient checkpointing techniques may be implemented to make such recovery operations faster.

Figure 23:
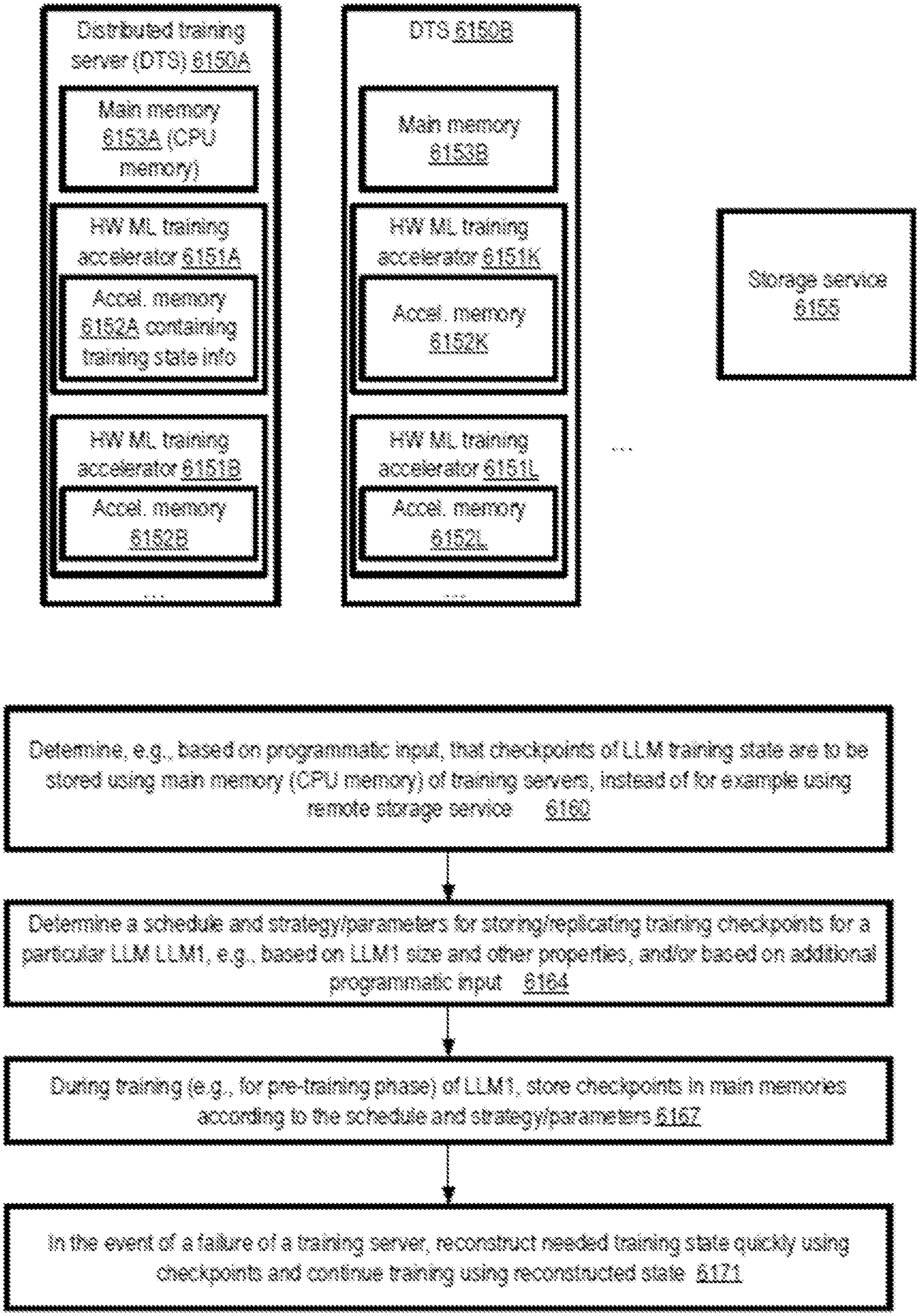
FIG. 23 illustrates an example plurality of distributed training servers which may be employed to train an LLM at an FMS, as well as a flow diagram illustrating aspects of operations that may be performed to speed up recovery of training state information, according to at least some embodiments.

FIG. 23 illustrates an example plurality of distributed training servers which may be employed to train an LLM at an FMS, as well as a flow diagram illustrating aspects of operations that may be performed to speed up recovery of training state information, according to at least some embodiments. A distributed training server (DTS) 6150A at which at least a portion of an LLM may be trained, e.g., by training coordinators of an FMS, may include (in addition to other components) a main memory 6153A (also referred to as CPU memory), as well as one or more hardware machine learning training accelerators such as 6151A and 6151B in the depicted embodiment. Similarly, DTS 6150B may include (in addition to other components) main memory 6153B, as well as one or more hardware machine learning training accelerators such as 6151K and 6151L. A given accelerator may comprise its own accelerator memory, distinct from the main or CPU memory of the DTS. For example, accelerator 6151A may include accelerator memory 6152A, accelerator 6151B may include accelerator memory 6152B, accelerator 6151K may include accelerator memory 6152K, and accelerator 6151K may include accelerator memory 6152K. In individual ones of the accelerator memories, respective subsets of model training state or status may be generated and/or stored during the distributed training of a given LLM. Conventionally, checkpoints of the training state information may be stored at a storage service 6155 of the provider network at which the DTSs are provisioned, such as an object storage service or a block storage service. In at least some embodiments, instead of using such a storage service, the checkpoints may instead be stored in the main memories of the DTSs, which may support much lower latencies for both storage and retrieval of the checkpoints than the storage service. A distributed checkpointing strategy may be implemented in which for example the training state information from a given DTS's accelerators is stored at one or more other DTSs in such a way that it is possible to restore/recover the state information in the event of a failure of any given DTS (or in the event of a failure at some small number of DTSs).

As shown in element 6160 of the flow diagram of FIG. 23, a determination may be made, e.g., based on programmatic input received at an FMS from an LLM owner/developer, that checkpoints of LLM training state information are to be stored using main memory (CPU memory) of the training servers being used, instead of for example using a remote storage service. The decision to store the checkpoints in CPU memory may be made based at least partly on the difference in latency measured for data transfers to/from the DTSs to the remote storage service, and/or based at least partly on measurements of CPU memory usage during earlier training of various LLMs (which indicates that the sufficient CPU memory for the checkpoints may typically be available).

A schedule and strategy/parameters for storing/replicating training checkpoints for a particular LLM LLM1 may be determined at the FMS in various embodiments (element 6164). The schedule and parameters may indicate, for example, how frequently checkpoints should be generated and stored at the CPU memories, the number of replicas of each accelerator's training state information that should be stored, how the particular DTSs at whose CPU memories the replicas are stored should be selected, and so on. In some embodiments the strategy and/or parameters may be determined based on factors such as LLM1's size (e.g., the number of parameters of LLM1, the number of DTSs being used for training LLM1, etc.) and other LLM1 properties (e.g., the kinds of modules LLM1 contains). In some embodiments, at least some of the parameters may be determined at the FMS based on additional programmatic input from the LLM1 owner/developer.

During the training of LLM1 (e.g., in a pre-training phase), checkpoints of its sate information may be stored in the main memories of various DTSs as per the schedule and strategy/parameters, as shown in element 6167. In the event of a failure at a DTS, the needed training state may be reconstructed/recovered quickly using the checkpoints stored in the CPU memories, and training may be resumed using the reconstructed/recovered state in various embodiments (element 6171). A trained version of LLM1 may then be stored and used for inference.

Reducing Accelerator Memory Usage for LLM Inference Using Quantization

In various embodiments, servers or computing devices equipped with hardware accelerators may be utilized at an FMS not just for training LLMs, but also for inference. In various embodiments, after the training (e.g., pre-training, or pre-training followed by fine-tuning) of an LLM is completed, the learned parameters may be kept fixed for inference. One or more of the LLMs trained and made available by an FMS may comprise autoregressive models in some embodiments, which build the generated output or prediction one word at a time. During inference, two stages of computations may be performed in such LLMs: context encoding and decoding generation. For context encoding, the model may encode all the text tokens in the input inference request (which may be referred to as the user prompt) in parallel. In the decoding stage, the tokens may be processed one token at a time in some embodiments: that is, each model run may only involve one token at a time, using the stored information of the previous computations (e.g., for earlier tokens of the input prompt) which may be stored in a structure referred to as a KV cache. Due to the fact that there is only one token to compute or calculate, the actual computation time may be shorter than the time taken to load the model parameters (e.g., learned weights) from memory. As such, the inference computations of the LLM may become bottlenecked by loading from memory, and the hardware (e.g., arithmetic units of the hardware accelerators of the kind discussed above) used for the computations such as matrix multiplication may have to remain idle for some time as it waits for the transfers from memory to be completed.

To reduce overall inference latency, and to reduce idle time of the inference computation hardware, in some embodiments the weight parameters may be down-cast such that individual weights require fewer bits, so the number of bits that have to be the loaded from memory for inference can be reduced. In at least some embodiments, a vector-wise quantization technique may be employed, in which individual weights are converted or compressed from 16-bit data types (e.g., float16 or bfloat16) into 8-bit data types (e.g., float8 or int8). The load time from the memory may for example be reduced by 50% in some implementations as a result of such conversions. In some embodiments, for the matrix multiplications between the weights and the activation layers, only the weights may be quantized while the activation layers may be kept at their original data types and sizes. This approach may provide the best accuracy in inference results while still achieving substantial speed-up for inference. The weight parameters may be pre-processed before the online inference stage to analyze their value distributions in some embodiments. Along each output feature dimension, scaling factors may be calculated using rounding. For example, weights that originally comprises floating point values which take 16 bits each may be converted into (for example) 8-bit integers using a transformation similar to X_int8=round (X_fp16/S)+Z, where, X_int8 is a weights matrix of 8-bit integers, X_fp16 is a weights matrix of 16-bit floating point values, S is a parameter referred to as a scale factor, and Z is a parameter referred to as a zero point. For a given matrix multiplication with the quantized 8-bits, calculations similar to the following may be performed to obtain high accuracy in the inference results: $C^{16bit}=W^{16bit}A^{16bit}\cong(S\cdot W^{8bit})\ A^{16bit}=S\cdot(W^{8bit}A^{16bit})$, where W stands for weights, S is the scaling factor, and A stands for the activations from a previous calculation. Since the S is along a non-reduction axis, the multiplication by S can be deferred until after the matrix multiplication of W and A, with the 8-bit weights being directly cast into 16 bits for the matrix multiplication. The overhead for the extra casts and de-quantization may be hidden in some embodiments using compiler tiling and hardware pipelining in some embodiments. The compiler may first tile a tensor into small blocks of instructions. On hardware (such as some of the accelerators of the kind discussed earlier) which comprise distinct vector engines (which can be used for quantization/casting) and matrix multiplication engines, the computations may be pipelined among the different engines for better performance for inference.

In one embodiment, the weights may be converted for memory usage reduction when copying the weights from main memory (CPU memory) or some other storage to the accelerator memories on the servers used for inference, but the 16-bit versions of the weights may be reconstructed on the fly for the actual computations of the inference. In some embodiments, instead of converting 16-bit floating point weights into 8-bit integers, the weights may be quantized into (8-bit floating point) values; in the latter scenario, the weights need not necessarily be reconstructed as FP16 values during inference computations.

Figure 24:
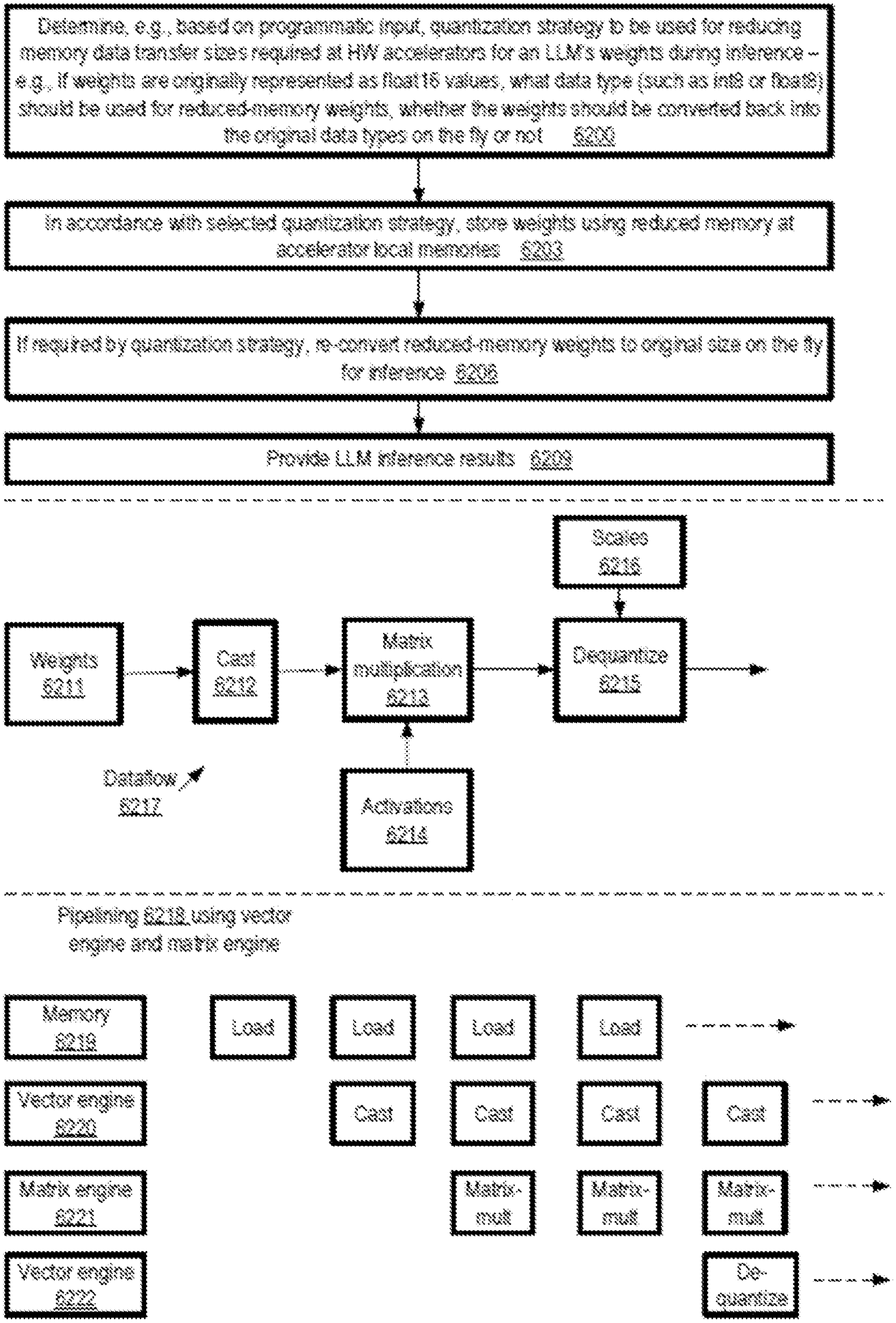
FIG. 24 is a flow diagram illustrating aspects of operations that may be performed to implement customizable quantization strategies to reduce memory usage of LLMs for inference, according to at least some embodiments.

FIG. 24 is a flow diagram illustrating aspects of operations that may be performed to implement customizable quantization strategies to reduce memory usage of LLMs for inference, according to at least some embodiments. As shown in element 6200, a quantization strategy may be determined, e.g., based on programmatic input received from an LLM owner/developer at an FMS, for reducing memory data transfer sizes at hardware accelerators for an LLM's weights during inference. The strategy may indicate, for example in a scenario in which the weights learned during training were represented as float16 values, the data types (such as 8-bit integers or int8, or 8-bit floating point values float8s) to be used for the reduced-memory versions of the weights, whether the reduced-memory versions should be converted to the original data types on the fly during inference computations or not, and so on.

In accordance with the selected quantization strategy, the weights of the LLM may be stored using reduced amount of memory at the accelerator local memories of the servers being used for inference in the depicted embodiment (element 6203). This may reduce the probability that the inference computations are bottlenecked due to accelerator memory limits in at least some embodiments. If required by the selected quantization strategy, the reduced-memory weights may be reconverted into their original larger size data types on the fly during inference computations for a given input provided by an end user (element 6206). The LLM inference results for the input may then be presented by the FMS (element 6209) in various embodiments.

FIG. 17 also includes an example of a dataflow 6217 in which quantization of the kind introduced above may be employed in some embodiments. As shown, the original weights 6211 may be cast 6212 to smaller data types. Matrix multiplications 6213 may then be performed with activations 6214. The results may be de-quantized 6215 using the scales 6216 or scaling factors. In embodiments in which the hardware accelerators comprise separate engines for vector computations and matrix multiplications, the quantization-related computations may be pipelined as indicated above. Pipelining 6218 shown in FIG. 24 illustrates this approach. Operations such as load, cast, matrix-mult (matrix multiplications) and de-quantization may be performed in parallel at the memory 6219, vector engine 6220, matrix engine 6221 and vector engine 6222 (which may be the same vector engine as 6220) in the depicted embodiment. Successive operations performed at a given hardware subcomponent such as the memory, the vector engine and the matrix engine are shown from left to right in the figure, with operations that can be performed in parallel across the different units being shown arranged vertically above one another.

RLHF as a Service

Reinforcement learning from human feedback (RLHF) refers to a collection of techniques in which human feedback or input may be used, e.g., as opposed to (or in addition to) machine generated loss functions to help optimize an LLM prior to the deployment of the LLM for production use. RLHF may sometimes be used as one of the final phases of training an LLM prior to enabling end users to interact with the LLM. In general, RLHS may help make the output produced by an LLM more coherent, and more similar to the output that might be produced by a human being (e.g., with a more conversational turn of phrase, more complete and connected sentences, etc.) than would otherwise have been obtained.

An FMS at which many LLMs have been trained for production deployment may over time develop in-house teams that can perform RLHF tasks efficiently for many different problem domains. In at least one embodiment, the RLHF expertise attained by an FMS may be leveraged to simplify the task of adapting or fine tuning LLMs for FMS customers. Several different modes of RLHF may be supported to enable the customers (e.g., LLM designed/owners/developers) to obtain the benefits of RLHF for their models, with differing levels of involvement of personnel of the customers' organizations. In one mode, referred to as fully-RS-managed, a customer who wishes to utilize the expertise of an RLHS service (referred to as an RS) of the cloud provider network may simply provide high-level guidance regarding the kinds of human feedback they wish to obtain for their LLMs prior to deployment, and the RS may then perform the RLHF-based training tasks for the customer using internal provider network teams, or teams of feedback providers that the RS has acquired for the customer. In a second mode of RLHF, referred to as an iterative-interaction mode, the customer may use their own organizations' staff to provide (using programmatic interfaces of the RS in some embodiments) at least some of the feedback or input for the fine-tuning of their LLM, but the computing resources of the FMS may be used for the fine tuning, and the results produced by successive fine-tuned versions of the LLM may be presented by the RS to the staff of the customers. Several such iterations may be implemented until a version of the LLM that is considered suitable for deployment to production is obtained, with each iteration comprising the RS providing some output from the LLM to the customer's staff, and the staff then providing feedback to the RS. In at least some embodiments, at least two types of tasks may be performed by the human teams (either staff of the RS, or staff of the customer): rankings or scores of the quality of the output produced by the current version of the LLM, and/or example completions that can be consumed as training/tuning input by the current version of the LLM to improve the quality of the next version.

Figure 25:
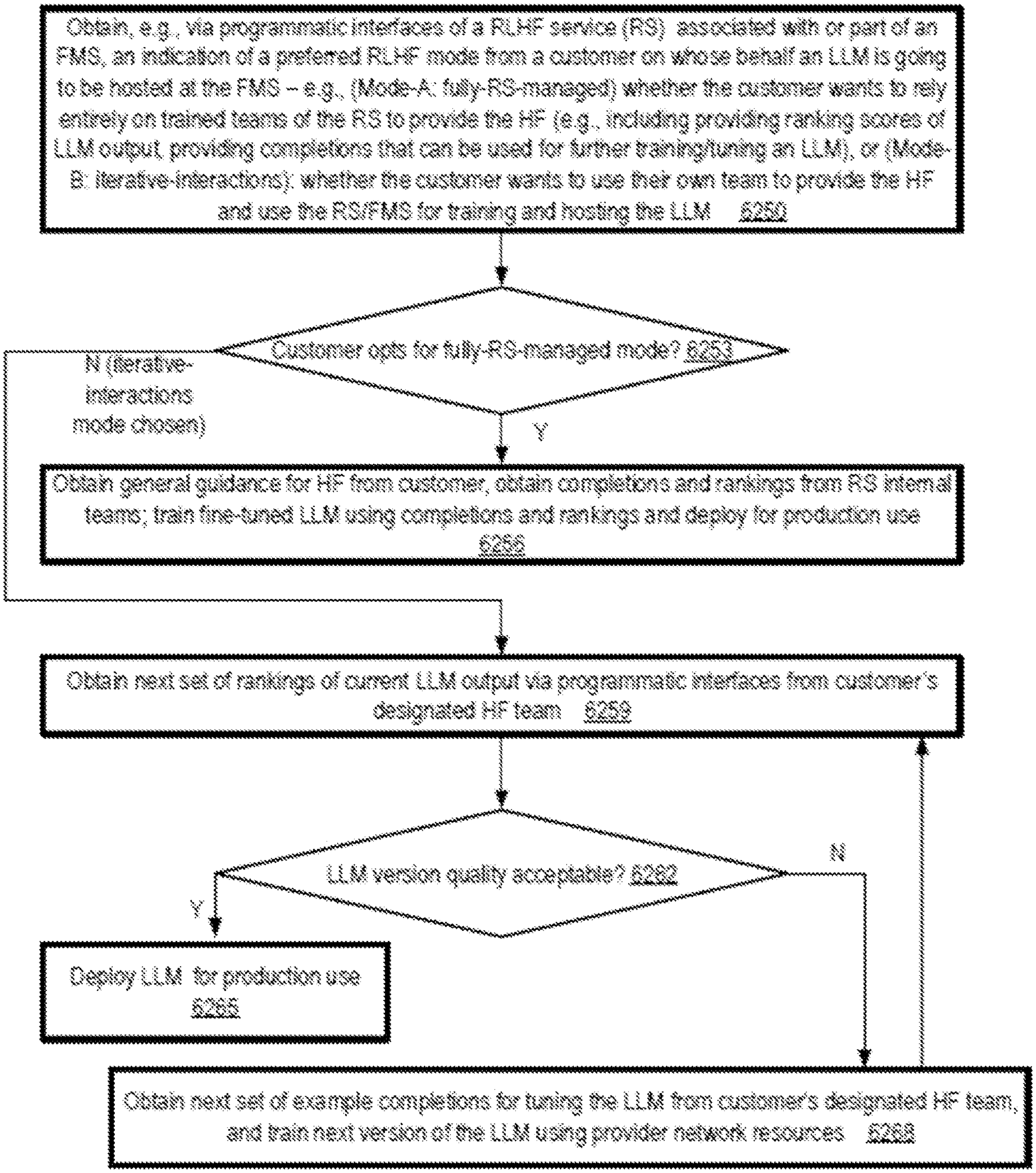
FIG. 25 is a flow diagram illustrating aspects of operations that may be performed at a reinforcement learning from human feedback (RLHF) service of a cloud provider network, according to at least some embodiments.

FIG. 25 is a flow diagram illustrating aspects of operations that may be performed at a reinforcement learning from human feedback (RLHF) service of a cloud provider network, according to at least some embodiments. As shown in element 6250, an indication of a preferred RLHF mode of a customer (such as an organization on whose behalf an LLM is going to be deployed at an FMS) may be obtained, e.g., via programmatic interfaces of an RS of a provider network. In some embodiments, the RS may be implemented as part of an FMS; in other embodiments, the RS may be implemented as a separate service of the provider network. In some embodiments, the customer may choose from two or more supported RLHF modes, such as Mode-A (fully-RS-managed mode) or Mode-B (iterative-interaction mode). In Mode-A, the fully-RS-managed mode, the customer may rely entirely on trained teams of the provider network to provide the human feedback (HF), e.g., including providing ranking scores of LLM output, as well as providing example completions to be used for fine tuning the LLM. In Mode-B, the customer's own staff or teams (or staff/teams identified from other organizations by the customer) may provide the human feedback, but resources of the RS/FMS may nevertheless be used for fine tuning the LLM and hosting the LLM when a desired quality of inference has been reached.

If the customer opts for Mode-A or fully-RS-managed mode, as determined in operations corresponding to element 6253, general guidance regarding the type of human feedback preferred for the customer's LLM may be provided by the customer via easy-to-use programmatic interfaces implemented by the RS (element 6256). HF in the form of completions and rankings may be obtained from the RS's internal teams or staff and the LLM of the customer may be trained or fine-tuned using those completions and rankings until a version suitable for production use is obtained and deployed.

If the customer opts for Mode-B or interactive-interactions mode (as may also be determined in operations corresponding to element 6253), one or more iterations of interactions between the RS and a set of human feedback providers of the customer organization may be performed. In a given iteration, the next set of HF (including human-generated rankings for output generated by the LLM) may be obtained at the RS via programmatic interfaces from the customer's designated HF team (element 6259). If the rankings indicate that the current version of the LLM is acceptable (as determined in operations corresponding to element 6262), the LLM may be deployed for production use (element 6265). If the LLM version quality is not acceptable (as also detected in operations corresponding to element 6262, a next set of example completions for training/tuning the LLM may be obtained from the customer's HF team at the RS, and the next version of the LLM may be trained using provider network resources (element 6268). The next iteration of interactions between the customer's HF team and the RS may then be initiated and operations corresponding to element 6259 onwards may be initiated in the depicted embodiment.

Distributed Management of LLM End User Inference Workloads

An FMS of a cloud provider network may enable end users (e.g., individuals or organizations that have set up client accounts at the cloud provider network) to access a variety of LLMs and other similar FMs in various embodiments, some produced by various third party LLM providers, and some produced by the operator of the cloud provider network itself. The former types of LLMs may be referred to as $3^{rd}$-party or 3P LLMs, while the former types of LLMs may be referred to as $1^{st}$-party or 1P LLMs.

In at least some embodiments, the FMS resources used for handling inference requests may be logically divided into at least two layers: a front-end (FE) layer and a back-end (BE) layer. For a given inference request received at the FMS, an FE component may decide, e.g., using request gating or request throttling information provided by a distributed request gating coordinator or DRGC of the FMS in various embodiments, whether the request should be accepted or not. The request gating/throttling guidance provided by the DRGC may itself be generated based on analysis of several kinds of data as described below. If the request is accepted, the FE resource may be responsible for sending/routing the contents of the request to a BE resource at which the targeted LLM runs. In some cases, an end user request may have to be rejected or throttled, e.g., because of a lack of sufficient resources for the LLM to which the request is directed.

A simple common API may be supported by the FMS for inference requests directed to any of the LLMs in various embodiments. According to the common API, in some embodiments, a given inference request may comprise at least the following elements or parameters: (a) an indication of the particular LLM to which the request is directed, (b) implicit or explicit identification information of the requester, and (c) the "body" of the request, comprising for example the text input for which inference is desired, or the multimedia input for which inference is to be performed. In at least some embodiments, the body of the request may in effect be considered an opaque binary object or blob by the FMS FE components that receive the request via a network. That is, the FMS FE components may not have any visibility into the input being provided to the LLM for inference.

Figure 26:
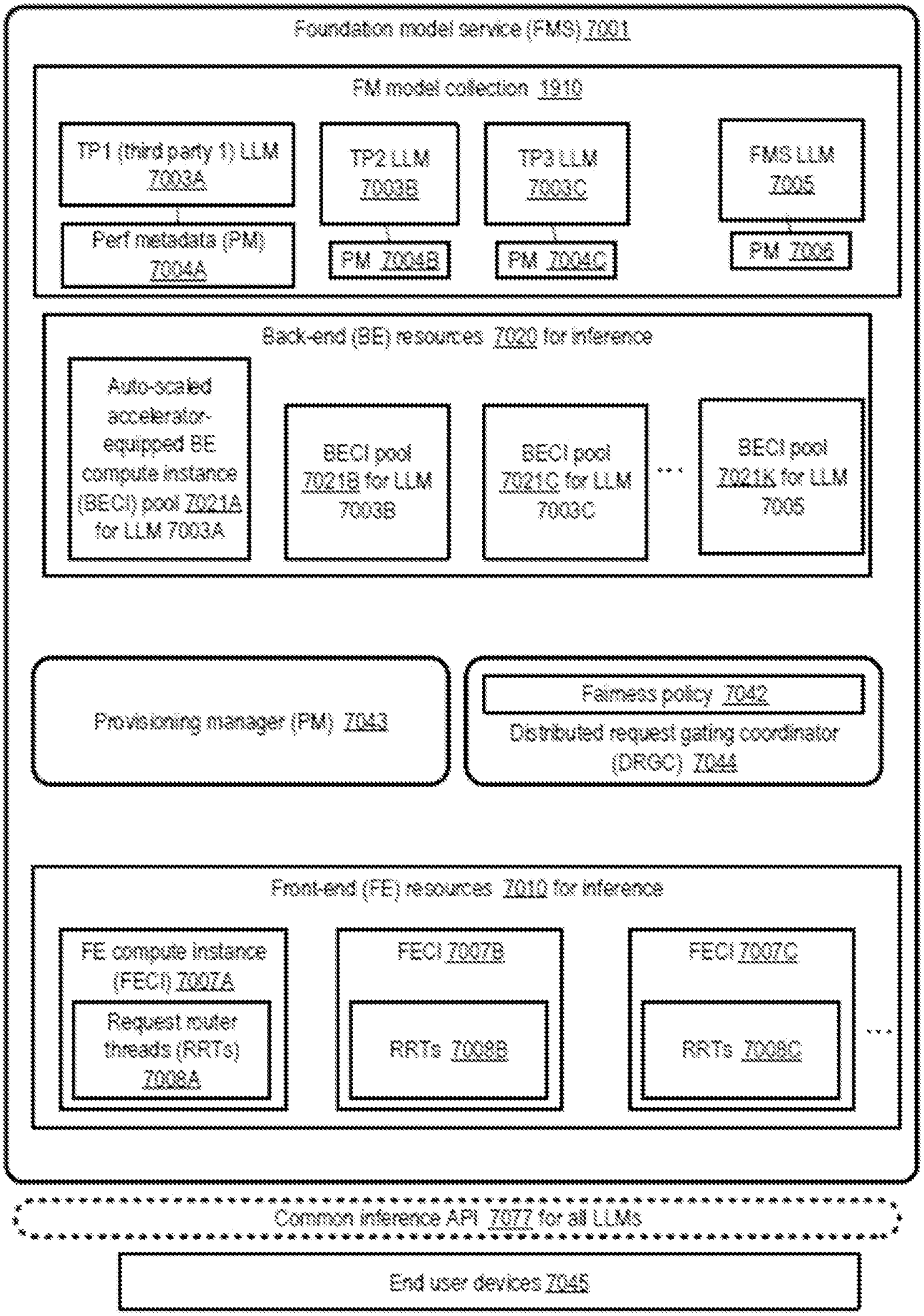
FIG. 26 illustrates an example system environment in which a distributed request gating coordinator (DRGC) of an FMS may ensure that each of the LLMs hosted using the FMS is treated fairly relative to the other LLMs with respect to throttling or rejection of end user inference requests, according to at least some embodiments.

FIG. 26 illustrates an example system environment in which a distributed request gating coordinator (DRGC) of an FMS may ensure that each of the LLMs hosted using the FMS is treated fairly relative to the other LLMs with respect to throttling or rejection of end user inference requests, according to at least some embodiments. That is, the DRGC may ensure that regardless of spikes in the arrival rates of end user inference requests directed to any given hosted LLM, FMS resources are utilized in such a way that at least some end user inference requests directed to each hosted LLM can be accepted for processing. In the embodiment shown in FIG. 26, a common inference API 7077 for all hosted LLMs may be implemented by an FMS 7001. The LLMs hosted at the provider network with the help of the FMS may include TP1 LLM 7003A, TP2 LLM 7003B, TP3 LLM 7003C, and FMS LLM 7005 (a 1P LLM) in the example scenario shown. Some hosted LLMs may comprise pre-trained versions, to which fine tuning has not been applied in the depicted embodiment; other hosted LLMs may be fine-tuned versions. For each of the hosted LLMs, corresponding baseline performance metadata (PM) may be stored at the FMS, such as PM 7004A of TP1 LLM 7003A, PM 7004B of TP2 LLM 7003B, PM 7004C of TP3 LLM 7003C, and PM 7006 of FMS LLM 7005. In some embodiments, as part of the onboarding or registration of an LLM at the FMS, such performance metadata may be provided by the LLM owner/developer. The performance information may for example indicate such data as the expected number of concurrent inference requests of a selected size or complexity can be handled at a given compute instance of a particular category, the expected amount of time required for completing the LLM computations for such inference requests at a given category of compute instance, and so on. Inference requests may be submitted via a network (e.g., including links of the public Internet, or including links within the cloud provider network) from a variety of end user devices 7045, such as desktops, laptops, portable/mobile devices, virtualization hosts of the provider network, and so on.

FE resources 7010 of the FMS that are used for inference may include a plurality of FE compute instances (FECIs) in the depicted embodiment, including FECI 7007A, FECI 7007B and FECI 7007C. At each FECI, a set of request router threads (RRTs) or processes may be instantiated in various embodiments, such as RRTs 7008A at FECI 7007A, RRTs 7008B at FECI 7007B, and RRTs 7008C at FECI 7007C. In at least some embodiments, an RRT may be assigned to each received inference request. In some embodiments, once an RRT is assigned to an inference request, it may remain assigned to that request until the response is provided to the request, so that RRT may not be used for any other inference request. In one embodiment, an individual RRT may be used for inference requests directed to any of the hosted LLMs.

BE resources 7020 for inference may include respective pools of BE compute instances for each of the hosted LLMs in the depicted embodiment. For example, BECI pool 7021A comprising one or more compute instances may be assigned to LLM 7003A, BECI pool 7021B comprising one or more compute instances may be assigned to LLM 7003B, BECI pool 7021C comprising one or more compute instances may be assigned to LLM 7003C, and BECI pool 7021K comprising one or more compute instances may be assigned to LLM 7005. In some embodiments, the LLM owners may provide auto-scaling specifications or rules for their LLMs, which indicate the category (or categories) of BECIs to be included in a BECI pool for a given LLM, an initial number of BECIs to be included in a BECI pool for their LLM, a minimum number of BECIs to be configured in the pool at all times, a maximum number of BECIs to be configured in the pool, and/or one or more triggering conditions for changing the number of BECIs in the pool. In various embodiments, compute instances that have access to ML inference-optimized hardware accelerators (i.e., instances that are run on virtualization hosts that have such accelerators) may be assigned to the BECI pools. In one embodiment, CIs that have access to different kinds of accelerators may be included in respective pools—e.g., while BECIs of pool 7003A may have access to inference accelerators of type IAcc1 which are best suited to perform inference computations for LLM 7003A, BECIs of pool 7003B may have access to inference accelerators of type IAcc2 (different from IAcc1) which are best suited to perform inference computations for LLM 7003B, and so on.

A provisioning manager (PM) 7043 may be responsible for acquiring (and in some cases releasing) FE and/or BE resources for the hosted LLMs in some embodiments, e.g., in accordance with the corresponding auto-scaling rules. In some embodiments, a respective logical inference endpoint of a machine learning service of the provider network may be set up for individual ones of the hosted LLMs, and a set of FE and/or BE resources may be associate with that endpoint. A DRGC 7044 may implement a fairness policy 7042 in the depicted embodiment, to avoid scenarios in which end user requests directed at any given hosted LLM (such as an LLM whose popularity has suddenly spiked) end up preventing end user requests directed to other LLMs from being processed. The DRGC may consume analyze kinds of information, including for example the PMs 7004 of different hosted LLMs, recent performance metrics from BECIs and FECIs, health status information from the BECIs and the FECIs, etc., and provide updated request gating recommendations (i.e., guidance as to whether requests from various end users for specific hosted LLMs should be accepted or rejected) to the FECIs dynamically (e.g., once every few seconds). In some embodiments, the DRGC may comprise a plurality of request gating agents (RGAs) at individual ones of the FECIs and/or the BECIs which implement a distributed data exchange and synchronization protocol to enable the gating recommendations to be generated based on a consistent view of the current state of the system.

Figure 27:
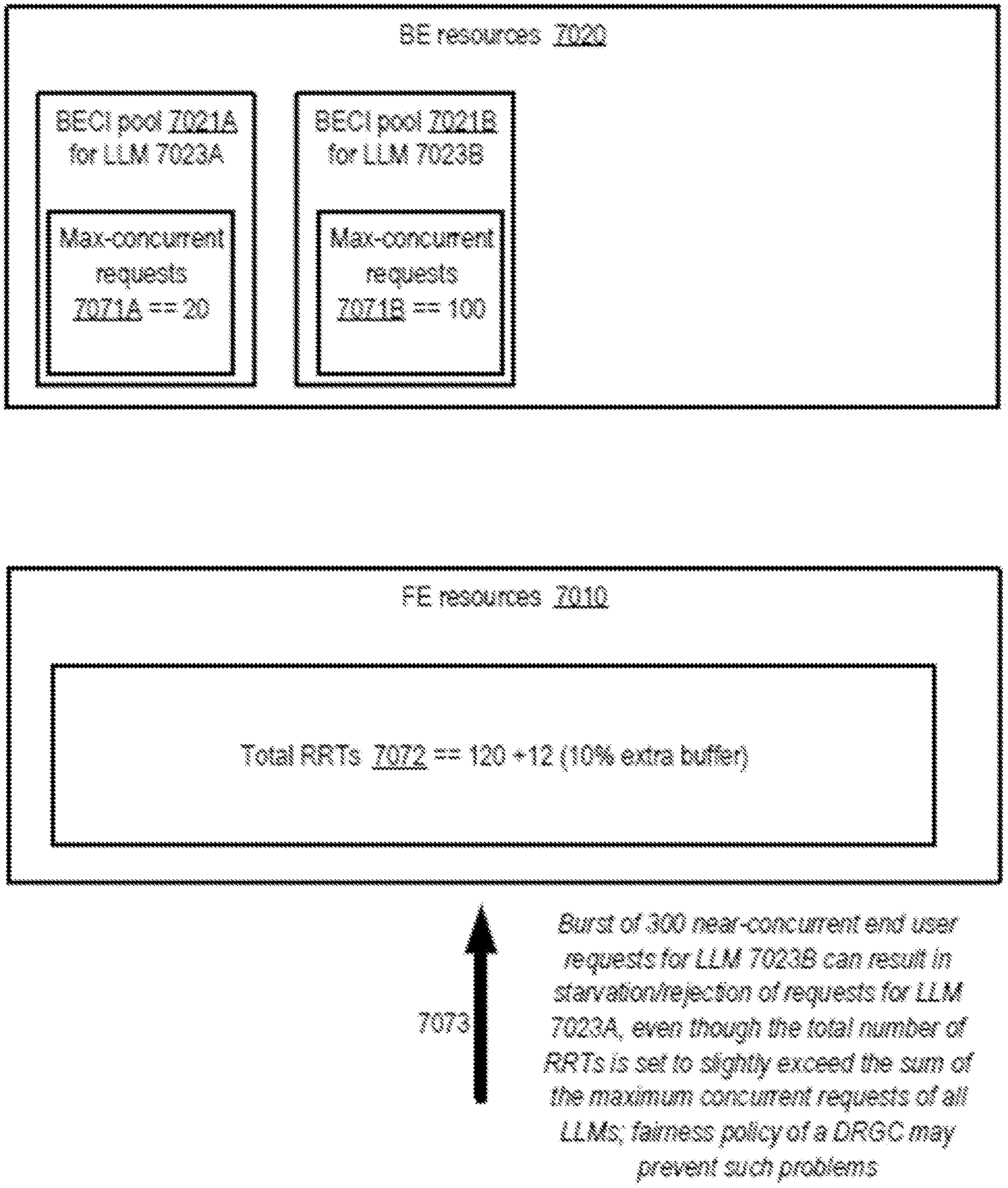
FIG. 27 illustrates an example scenario in which bursts of inference requests directed to a given LLM hosted at an FMS may potentially impact other hosted LLMs, according to at least some embodiments.

FIG. 27 illustrates an example scenario in which bursts of inference requests directed to a given LLM hosted at an FMS may potentially impact other hosted LLMs, according to at least some embodiments. In the depicted simplified example, BE resources 7020 of an FMS may comprise BECI pool 7021A for a hosted LLM 7023A, and BECI pool 7021B for another hosted LLM 7023B. The BECI pools may be set up (e.g., based on input provider programmatically by the LLM providers) such that BECI pool 7021A can handle up to a maximum of 20 concurrent inference requests for LLM 7023A (as indicated by the label "max-concurrent requests 7071A==20"), while BECI pool 7021B may be configured to handle a maximum of 100 concurrent inference requests for LLM 7023B ("max-concurrent requests 7071B==100").

The total number of RRTs 7010 configured at all the FEs of FE resources 7010 combined may be set to 132 (120, the sum of the max-concurrent requests of both hosted LLMs, plus a 10% buffer for safety) in the depicted example scenario. Now assume that LLM 7023B suddenly rises in popularity, e.g., due to a social media event or message that "goes viral", and that during a time interval in which there are only a few concurrent inference requests (fewer than 20) being processed at BECI pool 7021A, a burst of 300 near-concurrent inference requests for LLM 7023B are sent to the FMS concurrently or near-concurrently by end users. Arrow 7073 indicates such a burst or spike. Without implementation of some kind of fairness policy, e.g., by a DRRC of the kind mentioned above, which keeps at least some of the RRTs available for additional requests which may be directed to LLM 7023A, numerous end user requests directed to LLM 7023A may have to be rejected due to a lack of sufficient RRTs. Note that in some cases the time taken to complete inference for a given request may be tens of seconds or longer, so requests directed to LLM 7023A may be starved/rejected for non-trivial durations, even if sufficient BE resources are available to process them. This type of starvation/rejection of requests directed to a given LLM may be referred to as "brown-out" of the LLM in some embodiments, and avoidance of such brown-outs may be one of the design objectives of an FMS which hosts LLMs from several different providers. Note that in the example shown in FIG. 27, several of the 300 requests of the burst directed at LLM 7023B may also be rejected even if RRTs are available for them; such rejections may occur for example because of a lack of BE resources for LLM 7023B after BE processing of 100 of the concurrent requests starts.

Figure 28:
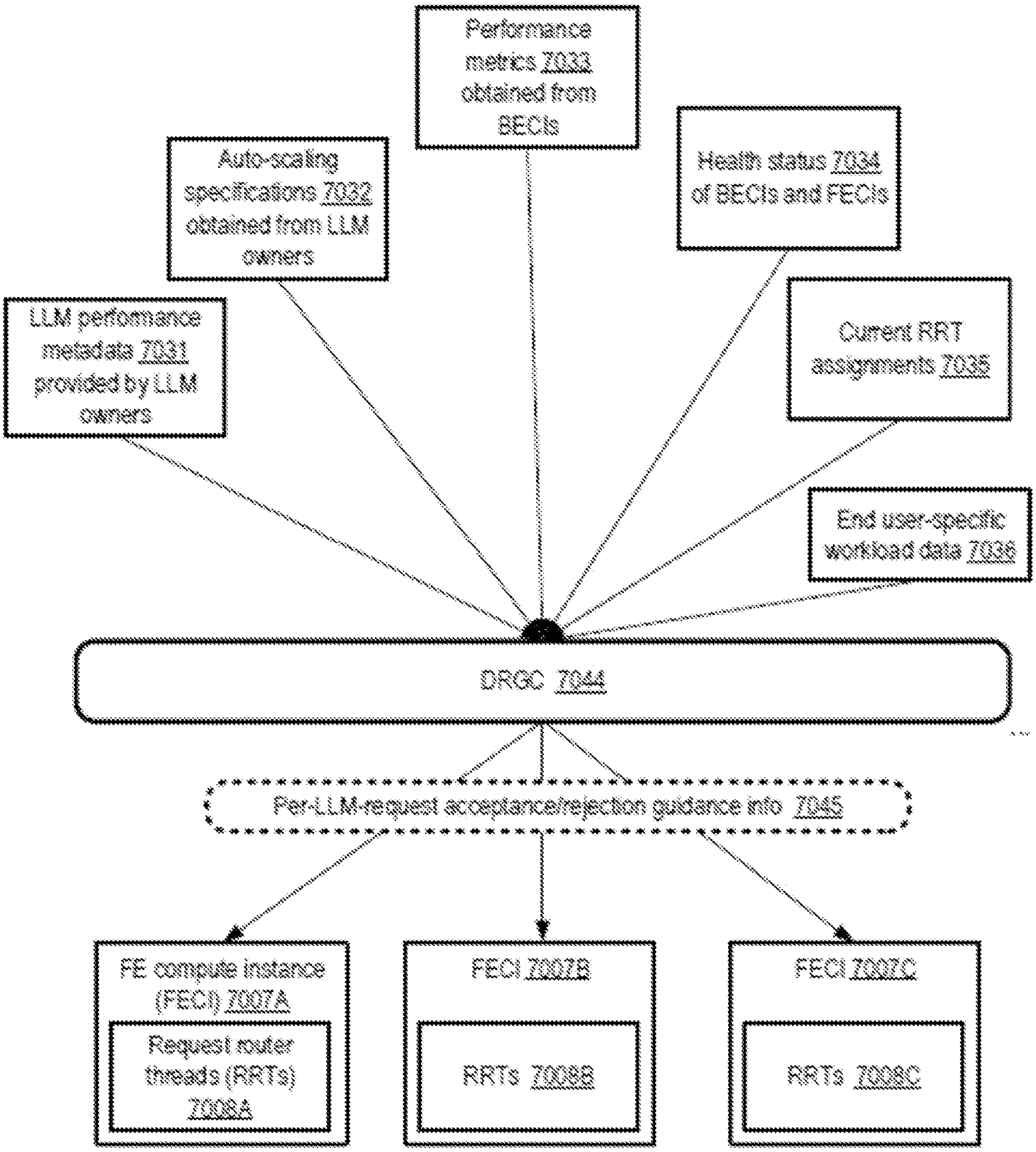
FIG. 28 illustrates examples of the input that may be processed at a DRGC to generate acceptance or rejection guidance for end user requests, according to at least some embodiments.

FIG. 28 illustrates examples of the input that may be processed at a DRGC to generate acceptance or rejection guidance for end user requests, according to at least some embodiments. In the depicted embodiment, a DRGC 7044 may be responsible for providing per-LLM-request acceptance/rejection guidance information 7045 to various FECIs, such as FECI 7007A, FECI 7007B, and FECI 7007C. FECI 7007A may comprise RRTs 7008A, FECI 7007B may comprise RRTs 7008B, and FECI 7007C may comprise RRTs 7007C. In some embodiments, individual ones of the FECIs may comprise one or more DRGC agents (e.g., respective processes or threads), and the guidance information may be provided to those agents periodically, e.g., once every few seconds; the agents may then provide the guidance information to RRCs as and when new end user requests are received. In some embodiments, the guidance may provide a current or near-current snapshot of the total number of concurrent requests being processed at the FE resources as a whole (and/or at the BE resources as a whole) for individual ones of the hosted LLMs, along with the current upper limits of the number of concurrent requests for which the system is configured. In such embodiments, the decision to accept/reject a given end user request directed to a given hosted LLM may be made at the FECI (e.g., by an RRT) using the information about the snapshot. In one embodiment, the guidance information may be provided for individual end user requests—e.g., when a new end user request is received at an FECI, a request in effect asking "should this request be accepted or rejected" may be sent to the DRGC or a DRGC agent, and the request may be rejected or accepted based on the response provided.

In order to generate the guidance information, the DRGC 7044 may obtain and analyze several kinds of data in the depicted embodiment. This may include LLM performance metadata 7031 provided by hosted LLM owners/developers (e.g., similar to PM 7004A, PM 7004B, etc. discussed earlier), auto-scaling specifications 7032 obtained from LLM owners for the LLMs, performance metrics 7033 obtained from BECIs and/or FECIs, health status 7034 of BECIs and FECIs (including notifications of any failures at BECIs/FECIs, software or hardware upgrades that may lead to downtimes, etc.), the current RRT assignments 7035 (how many RRTs are currently handling end user requests for each of the hosted LLMs), and/or end user-specific workload data 7036. The end user-specific workload data may for example indicate how many concurrent requests are currently being handled on behalf of a given end user at a given LLM. If a single end user is consuming a substantial fraction (e.g., more than X % of the total, where X is a tunable parameter which can be set by the LLM owner and/or the FMS) of the BECI pool of a given hosted LLM, additional inference requests from that end user may be rejected in some embodiments in accordance with an end-user-level fairness policy. Other factors than those shown in FIG. 28 may be used by the DRGC to determine its acceptance/rejection guidance in some embodiments. In at least some embodiments, in addition to acceptance or rejection, an addition option may be available at the FECIs: deferral of requests for a selected time interval when the fairness policy and/or the available resources indicate that the requests cannot be immediately accepted.

Figure 29:
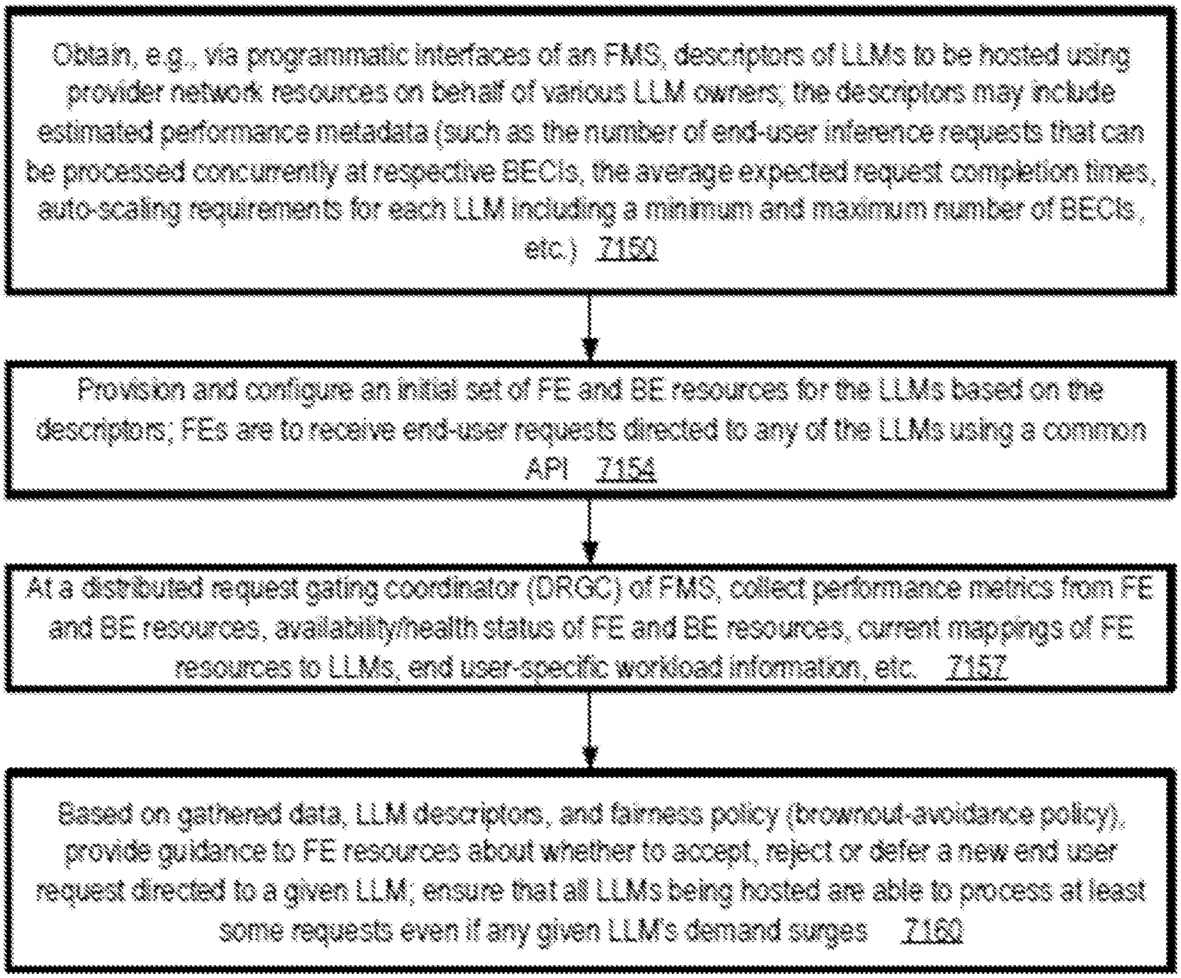
FIG. 29 is a flow diagram illustrating aspects of operations that may be performed to implement a fairness policy for end user inference requests directed to different LLMs hosted at an FMS, according to at least some embodiments.

FIG. 29 is a flow diagram illustrating aspects of operations that may be performed to implement a fairness policy for end user inference requests directed to different LLMs hosted at an FMS, according to at least some embodiments. As shown in element 7150, respective descriptors of LLMs to be hosted using provider network resources on behalf of various LLM owners may be obtained, e.g., via programmatic interfaces of an FMS. Among other details of the LLMs, the descriptors may include estimated performance metadata (such as the number of end-user inference requests that can be processed concurrently at respective BECIs at which a given LLM runs, the average expected request completion times, auto-scaling requirements for each LLM including a minimum and maximum number of BECIs, etc.).

An initial set of BE and FE resources may be configured, based on the received descriptors, for the combination of LLMs that are to be hosted in some embodiments, as shown in element 7154. In some embodiments, a respective set of BECIs may be configured for respective LLMs, while a given FECI may be used to receive requests directed to any hosted LLM. In other embodiments, FECIs may also be segregated by LLM—that is, a given FECI may only be used for requests directed at a corresponding hosted LLM.

At a distributed request gating coordinator (DRGC) of the FMS, data from several sources may be collected as the end user requests start arriving in the depicted embodiment (element 7157). For example, the DRGC (which may in some implementations comprise a plurality of agents, at least some of which may run at the BECIs and/or the FECIs themselves) may collect performance metrics from FE and BE resources, availability/health status of FE and BE resources, current mappings of FE resources to LLMs, end user-specific workload information, etc.

Based at least in part analysis of the gathered data, LLM descriptors, and a fairness policy (also referred to as a brownout-avoidance policy), the DRGC may provide guidance to FE resources about whether to accept, reject or defer a new end user request directed to a given LLM (element 7160). The implementation or enforcement of the fairness policy may help ensure that all LLMs being hosted are able to process at least some requests even if any given LLM's demand surges in the depicted embodiment.

Dynamic Packing and Routing of LLMs

As indicated above, an FMS of a cloud provider network may provide access to a variety of LLMs and other similar FMs, some produced by third party LLM providers, and some produced by the operator of the cloud provider network itself. The former types of LLMs may be referred to as $3^{rd}$-party or 3P LLMs, while the former types of LLMs may be referred to as $1^{st}$-party or 1P LLMs. Many if not all the LLMs may be optimized to run best at compute instances with access to respective types of hardware accelerators (such as GPUs, inference-optimized accelerators of various kinds, and so on). In order to optimize the utilization levels of the machines at which the LLMs are run (and thereby save energy and other costs), dynamic model placement decisions may be made at the provider network. In at least some embodiments, the FMS may utilize model placement and routing components of a more general machine learning service (MLS) of the provider network to coordinate the execution of the LLMs. The task of placing copies of LLMs (or other models) onto selected compute instances of a fleet of compute instances may be referred to as the "model packing" task herein. The task of sending requests received from end users (or sub-requests derived from end user requests) to the right model copy may be referred to as "end user request routing" or simply "routing" herein.

Figure 30:
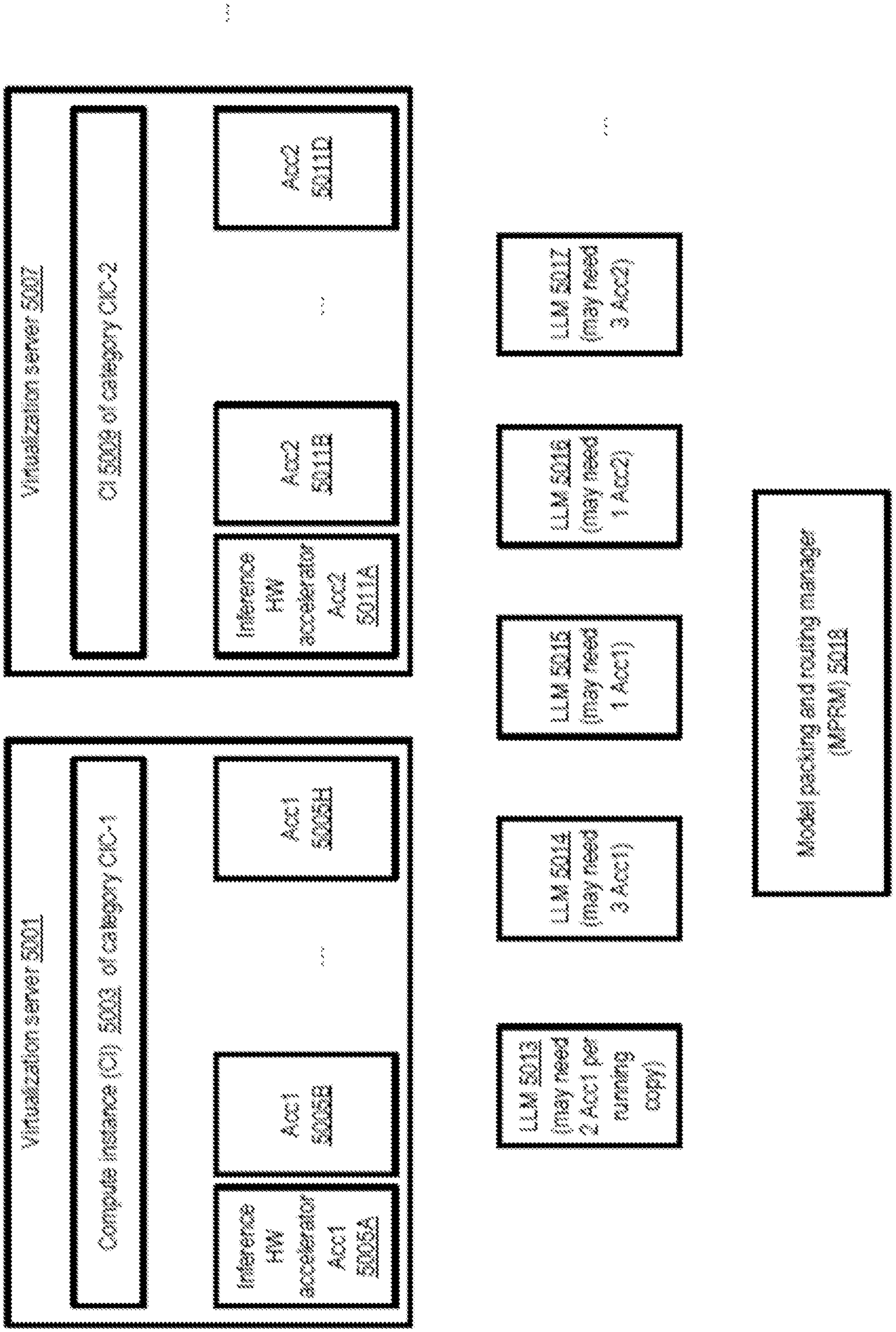
FIG. 30 illustrates an example system environment in which a model packing and routing manager of a cloud computing environment may select particular compute instances at which various copies of LLMs are run, based on a variety of factors including the accelerators accessible at the compute instances, according to at least some embodiments.

FIG. 30 illustrates an example system environment in which a model packing and routing manager of a cloud computing environment may select particular compute instances at which various copies of LLMs are run, based on a variety of factors including the accelerators accessible at the compute instances, according to at least some embodiments. In the depicted embodiment, compute instances of several categories may be available at an MLS or an FMS for running various LLMs. To simplify the presentation, a respective compute instance is shown running at a given virtualization server in the depicted embodiment; in practice, multiple compute instances may be run at any given virtualization server. A virtualization server 5001 available at the provider network for running LLMs may have eight inference hardware accelerators (e.g., chipsets or circuitry designed to speed up typical machine learning inference computations) of a first category called Acc1, while another virtualization server 5007 may have a set of four other inference hardware accelerator cards of a different category Acc2. Acc1 accelerators such as 5005A-5005B may differ from Acc2 accelerators such as 5011A-5011D in various properties: e.g., the semiconductor technology used for the hardware components, the vendors who designed the accelerators, the kinds of machine learning operations for which the accelerators are optimized, the power consumption levels of individual accelerators, and so on. A given accelerator may for example comprise one or more systems on chip (SOCs) in some embodiments. The accelerator categories may also differ in the way that the accelerators are packaged or attached to the remaining components of the virtualization servers in some embodiments.

Compute instance (CI) 5003 of category CIC-1, whose programs (such as software containers running machine learning models) may be able to utilize any or all of the accelerators 5005, may be launched at virtualization server 5001. CI 5009, belonging to a different category CIC-2 of the set of CI categories supported at the provider network's VCS, may run at server 5007, and programs running within CI 5009 may have access to any or all of the inference hardware accelerators 5011.

A number of LLMs may be available for execution in the depicted embodiment at some set of CIs. Each LLM may be designed to utilize a respective number of accelerators for optimum performance—that is, each running copy of each LLM may perform best when run at a compute instance at which at least a particular number of inference hardware accelerators of a particular type can be utilized. LLM 5013 may need 2 Acc1 accelerators for best performance per running copy of the LLM. LLM 5014 may need 3 Acc1 accelerators for best performance per running copy. LLM 5015 may need 1 Acc1 accelerator for best performance per running copy. LLM 5016 may need 1 Acc2 accelerator for best performance per running copy, while LLM 5017 may need 3 Acc2 accelerators for best performance per running copy.

A model packing and routing manager (MPRM) 5108 (which may comprise software and hardware of one or more computing devices) of an FMS may be responsible for determining, based on a set of objectives, how best to place various running copies of LLMs at the available CIs (and the total number of running copies of each LLM that should be used for a given mix of end user requests) in the depicted embodiment. In some embodiments the MPRM may be implemented as part of an inference coordinator of the FMS. Some of the objectives may be specified by the LLM creators (e.g., third party creators or the FMS provider network operator); other objectives may be specified at least in part by end users of the LLMs in the depicted embodiment. The FMS may implement programmatic interfaces which can be used by LLM owners/developers as well as end users to specify performance objectives for one or more LLMs. For example, an LLM owner/developer may send an LLM target performance request indicating that at least N concurrent inference requests with input size X tokens per request should be supported at the FMS, such that the average response time for providing inference results is no greater than T seconds. A given end user may similarly use the programmatic interfaces to inform the FMS about a rate at which that end user expects to submit requests to a particular LLM hosted at the FMS in some embodiments. Any combination of a number of heuristics and optimization algorithms may be utilized by the MPRM to make its decisions in different embodiments.

Figure 31:
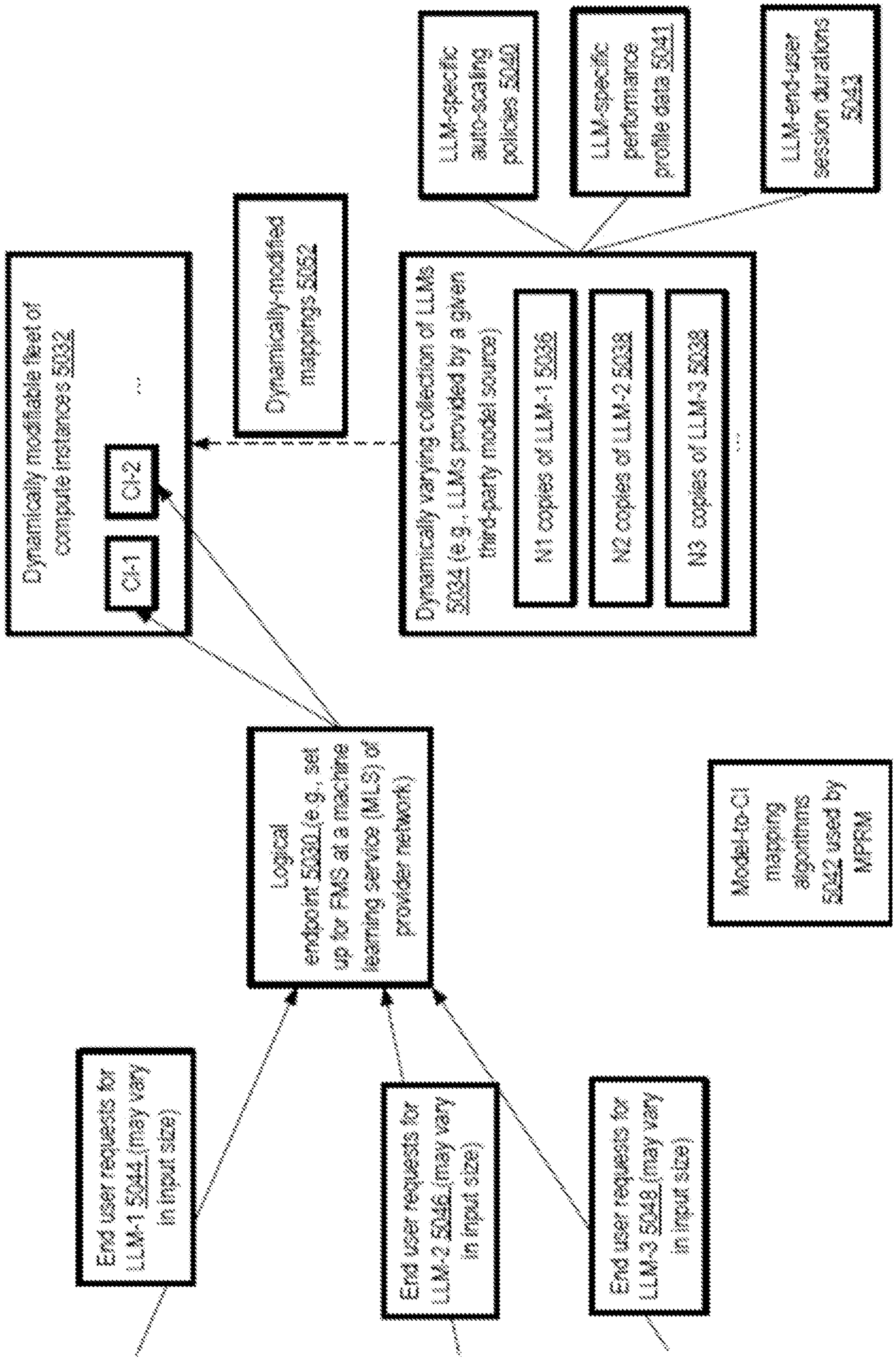
FIG. 31 illustrates an example scenario in which respective model-specific auto-scaling policies may be implemented to place LLMs on a dynamically changing fleet of compute instances configured for a logical endpoint, according to at least some embodiments.

FIG. 31 illustrates an example scenario in which respective model-specific auto-scaling policies may be implemented to place large language models on a dynamically changing fleet of compute instances configured for a logical endpoint, according to at least some embodiments. A logical endpoint 5030 (e.g., a virtual or physical network interface with an assigned Internet Protocol (IP) address, programmatically attached to a compute instance) may be set up to accept end user requests directed to a particular set of LLMs such as LLM-1, LLM-2, and LLM-3. LLM1, LLM-2 and LLM3 may for example all have been prepared by a particular LLM vendor or designer. In at least some embodiments, such a logical endpoint may be established by invoking an API implemented by an MLS of the provider network. Such an API may be invoked, for example, by an FMS component such as an inference coordinator on behalf of the LLM vendor in the depicted embodiment, or by the LLM vendor themselves. End user requests for LLM-1 5044, end user requests for LLM-2 5046, and end user requests for LLM-3 5048 may all be directed towards the logical endpoint 5030. In some embodiments, the end users themselves may not be aware of the existence of the logical endpoint; instead, the end users may simply send their requests to a URL designated for accepting all end user requests directed to the FMS, with a parameter in the request indicating the specific LLM which the end user wishes to utilize. The received requests may be redirected to the logical endpoint by an API handler front-end component of the FMS in various embodiments.

Corresponding to the logical endpoint 5030, a dynamically modifiable fleet of compute instances 5032 may be configured in the depicted embodiment, e.g., by the MLS or the FMS. Individual ones of the compute instances such as CI-1 or CI-2 may comprise zero or more hardware inference accelerators of the kind discussed above. At the time of the establishment of the logical endpoint, in some embodiments a baseline set of compute instances may be allocated to the fleet—e.g., two instances that can be used for running LLM-1, two instances that can be used for running LLM-2, and two instances that can be used for running LLM-3 may be chosen to begin with. As the workload increases, more instances may be added to the fleet, e.g., by an MPRM of the kind introduced above which implements a set of model-to-CI mapping algorithms 5042. A combination of algorithms (e.g., multidimensional optimization algorithms which take several factors into account) and heuristics (e.g., try to place a certain number of LLMs that require K accelerators each first, then place another number of LLMs that require fewer (e.g., K−1) accelerators each next) may be used in different embodiments.

Note that the set of LLMs for which the logical endpoint is established may itself vary over time in the depicted embodiment. At the point of time illustrated in FIG. 24, for example, the dynamically varying collection of LLMS 5034 may include N1 copies of LLM-1 5036, N2 copies of LLM-2 5038, and N3 copies of LLM-3 5038. In some embodiments, the model sources (the entities that provide the LLMs for inclusion in the set of LLMs of the FMS, such as various third parties, or the designers of 1P LLMs) may provide LLM-specific auto-scaling policies 5040 via programmatic interfaces. Such an auto-scaling policy may, for example, indicate a minimum number of copies of a specified LLM that are to remain running, the conditions (e.g., workload levels for that specific LLM) under which new copies should be launched, how many copies should be placed on a CI of a particular category, and so on. The providers/owners of the LLMs may also send LLM-specific performance profile data 5041 to the FMS via programmatic interfaces in some embodiments, indicating the minimum number of accelerators of a particular category that should be provisioned for a given copy to handle a specified end user request rate assuming a particular average input size, and so on. In some embodiments, performance load tests may also be conducted at the FMS itself, e.g., as part of the process of onboarding or registering an LLM at the FMS, so that additional information on the scaling behavior of the LLM can be determined. Results of such load tests, along with LLM-specific auto-scaling policies, and profile data 5041, may be utilized by the MPRM as it generates its dynamically-modified mappings between LLM copies and compute instances of the fleet in the depicted embodiment.

In at least one embodiment, LLMs may be moved from one CI to another based on mapping decisions made by the MPRM. For example, at some point in time two copies of LLM-1 may be running at a given CI, along with four copies of LLM-2. Based on increasing end user demand for LLM-2, and a reduction in demand for LLM-1, an additional copy of LLM-2 may be launched at that CI, while one of the copies of LLM-1 that was originally running at that CI may be moved to a different (e.g., slower) CI by the MPRM. When making decisions about such transfers of models, the MPRM may also take into account the fact the LLM sessions may last for substantial amounts of time (e.g., several seconds or minutes in some cases). Moving a model from one CI to another during the middle of a session may result in poor performance (as some of the contextual or state information of the LLM may have to be replicated at the destination CI), so the MPRM may take metrics of LLM-end-user session durations 5043 into account when making re-location decisions for LLM copies in some embodiments.

In at least some embodiments, as indicated above, the sizes of the inputs (e.g., the number of tokens or words included in the prompts or queries directed at the LLMs by end users) may vary for a given model. Requests sent to a particular LLM by different end users may have different input sizes, for example; the average input size may also vary from one LLM to another, and in some cases, requests sent to the same LLM by a given end user may also vary in input size. The amount of computation needed at the LLM may increase with the size of the input in some cases, so trends in measured input sizes of end user requests may also be taken into account in some embodiments by an MPRM when making LLM placement decisions.

Figure 32:
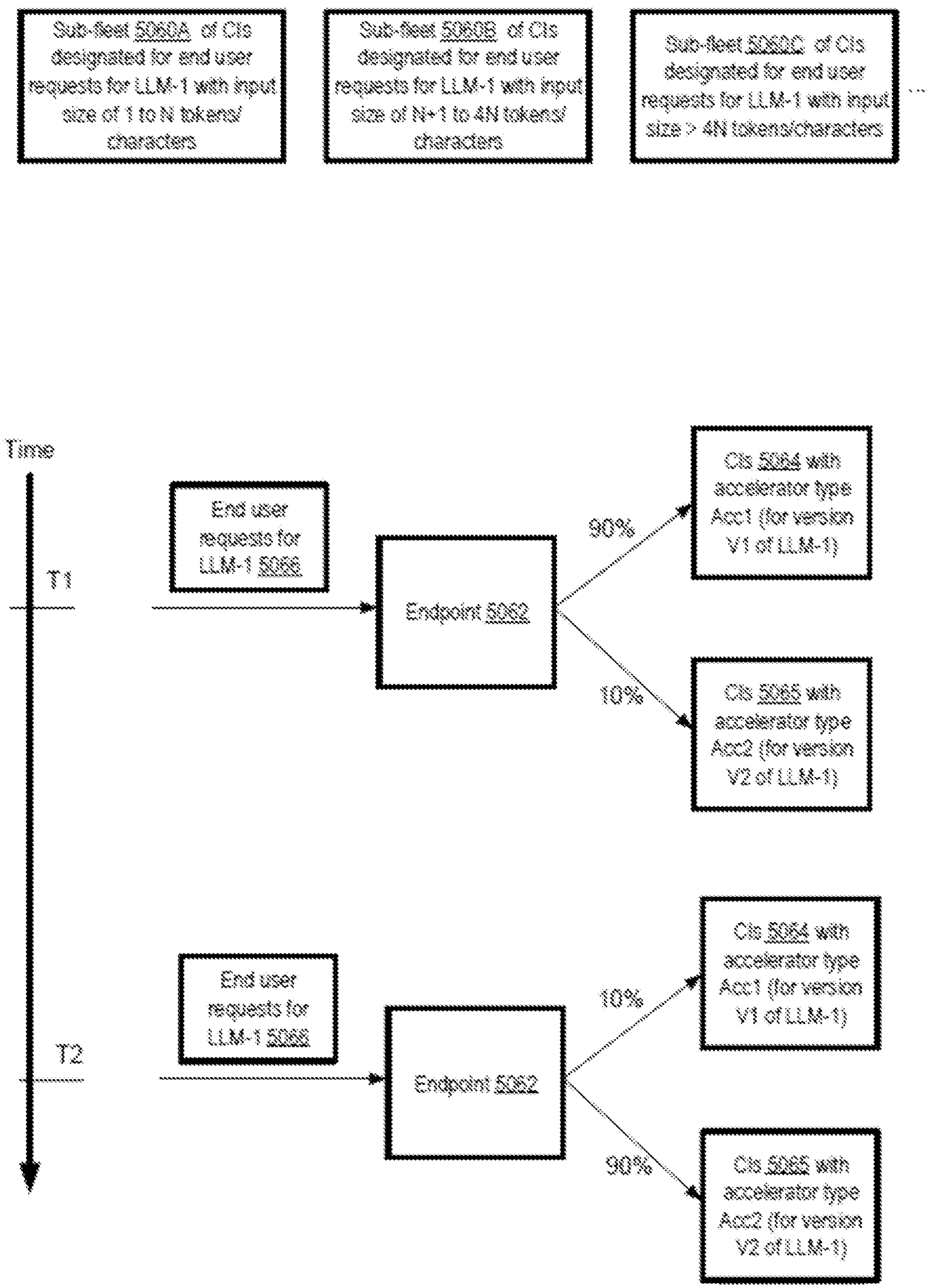
FIG. 32 illustrates a first example scenario in which several sub-fleets of compute instances for running LLMs may be configured for end user requests, with each sub-fleet being used for end user requests with input sizes in a respective range, as well as a second example scenario in which LLM workload may be transitioned over time between groups of compute instances with respective types of hardware accelerators, according to at least some embodiments.

FIG. 32 illustrates a first example scenario in which several sub-fleets of compute instances for running LLMs may be configured for end user requests, with each sub-fleet being used for end user requests with input sizes in a respective range, as well as a second example scenario in which LLM workload may be transitioned over time between groups of compute instances with respective types of hardware accelerators, according to at least some embodiments.

In some cases, as indicated above, the amount of time and/or computing resources needed for processing an end user request directed to an LLM may vary based on the size of the input (e.g., in scenarios in which text is being provided as input, the number of characters, tokens or words in the input) provided in the end user request. This means that it could sometimes be the case that, if all the resources being used for executing an LLM are busy handling very large-input end user requests, other end-user requests (which may have smaller input sizes, and whose processing could therefore in principle be completed fairly quickly) may end up being queued behind the in-progress end user requests. As a result, end users submitting some smaller-input requests may experience longer response times or completion times for their requests in such scenarios. In order to try to provide fairer treatment for requests with different input sizes, the overall fleet of compute instances available for handling end user requests directed to a given LLM may be partitioned into sub-fleets (e.g., by an MPRM or some other component of an FMS or MLS) in some embodiments. In some embodiments, the owner/developer of the LLM may provide guidance regarding the input sizes ranges that should be designated for different sub-fleets, the total number of sub-fleets, etc. In one example scenario, one sub-fleet 5060A may comprise some number of CIs that are designated for those end user requests for a given LLM LLM-1 whose input size lies between 1 and N tokens/characters, a second sub-fleet 5060B may comprise CIs that are designated for those end user requests for LLM-1 whose input size lies between N+1 and 4*N tokens/characters, while a third sub-fleet 5060C may comprise CIs that are designated for those end user requests for LLM-1 whose input size is greater than 4*N. The number of compute instances in each of the sub-fleets may be adjusted dynamically by the MPRM in some embodiments, e.g., based on the observed distribution of the input sizes of end user requests. In one embodiment, the number of CIs in each sub-fleet may be maintained within a selected range, or at least a minimum number of CIs may be kept in each sub-fleet. This type of partitioning may ensure that end user requests with different input sizes are dealt with fairly. The number of sub-fleets may vary in different embodiments and for different LLMs.

In some embodiments, different versions of a given LLM may be run using respective types of hardware accelerators of the kind introduced above. For example, an LLM provider/owner may initially develop and deploy (using the FMS and/or an MLS) a version V1 of an LLM LLM-1 for execution at devices that have access to accelerators of type Acc1. Later, that same LLM provider may develop and deploy a second version V2 of LLM-1, which is optimized for execution using accelerators of type Acc2. Acc1 and Acc2 may provide different levels of acceleration in some cases, for example. By the time that V2 is developed, version V1 may have been in use for some time—e.g., numerous end user requests directed to LLM-1 by end users may have been processed using V1. In order to deploy the new version V2 in a controlled manner, the LLM provider may specify (e.g., via programmatic interfaces of the FMS or MLS) the percentages of the end user requests that should be handled using both versions. In the second example scenario of FIG. 32, at approximately T1 along the timeline shown, the LLM provider may submit a programmatic request indicating that from among the end user requests for LLM-1 5066, 90% should be sent to a set of CIs 5064 with accelerator type Acc1, where version V1 of LLM-1 runs, while the remaining 10% of the requests should be sent to CIs 5065 that are equipped with Acc2 accelerators, where version V2 runs. By causing only a small subset of requests to be sent to the CIs at which the new version of LLM-1 runs, the LLM provider may reduce the risks associated with introducing a new version of the LLM. Later, if and when the results using version V2 indicate that V2 performance is acceptable, the distribution of the requests may be modified if desired. For example, at approximately time T2, the mix may be changed using another programmatic request to 10% of the requests being sent to CIs 5064, and 90% to CIs 5065. Note that a similar approach may be used to roll out new or enhanced versions of LLM-1 for the same type of accelerator in at least some embodiments. In various embodiments, LLM owners or providers may provide guidance programmatically to the MPRMs regarding the preferred distribution of end user requests to different subsets of CIs (which may be running respective versions of a given LLM), and the MPRMs may take such preferences into account along with all the other factors when making LLM placement or LLM migration decisions.

Figure 33:
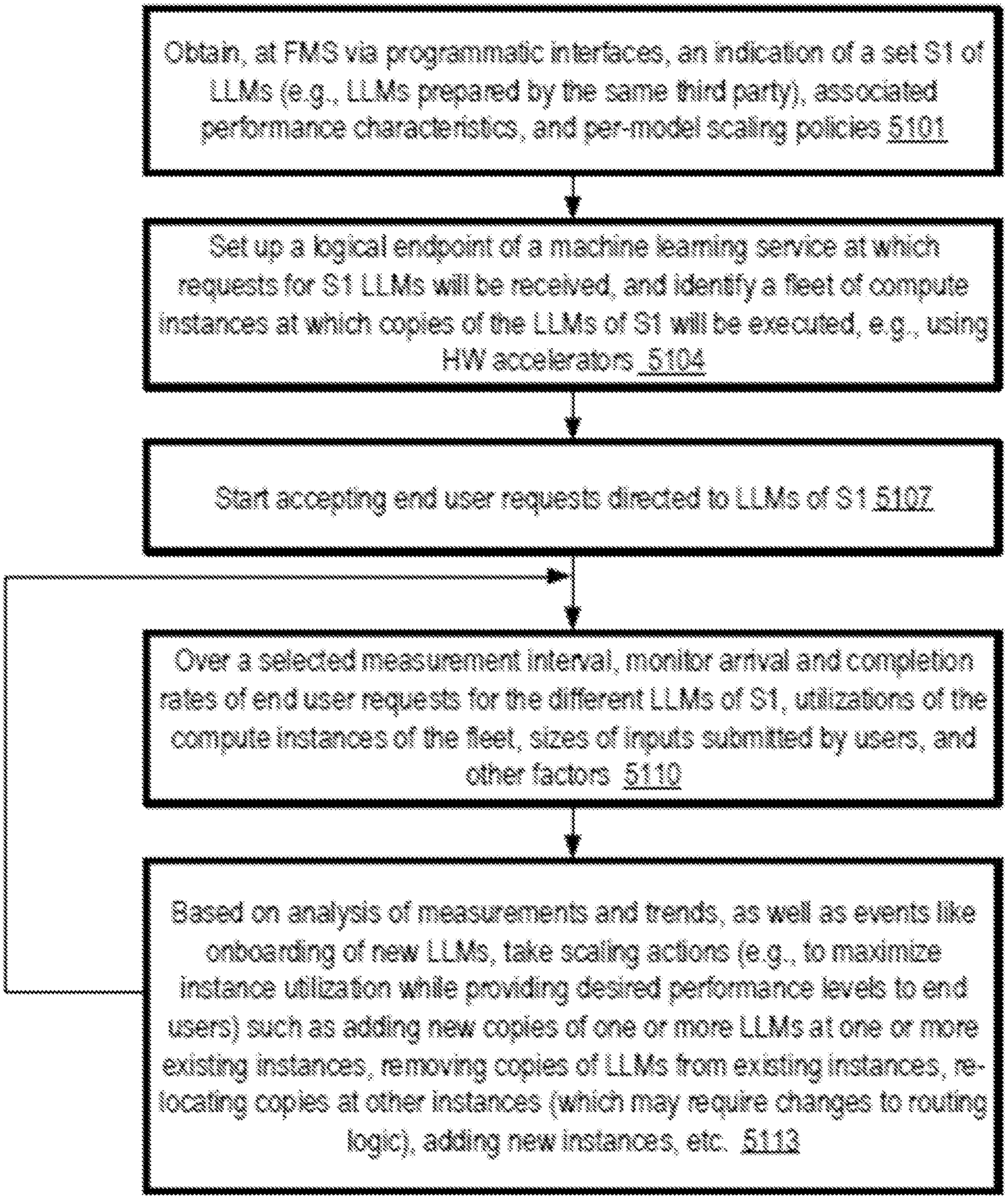
FIG. 33 is a flow diagram illustrating aspects of operations which may be performed to manage LLM placement onto compute instances, according to at least some embodiments.

FIG. 33 is a flow diagram illustrating aspects of operations which may be performed to manage LLM placement onto compute instances, according to at least some embodiments. As shown in element 5101, an indication of a set S1 of LLMs (e.g., LLMs prepared or provided by a given third party) which are to be executed on behalf of end users' inference requests may be received at an FMS via programmatic interfaces. In addition to the artifacts of the LLMs themselves, in some embodiments, performance profiles or characteristics of the LLMs, such as the number of end user requests with a specified input size that can be processed at a given type of CI or accelerator, may be provided. In one embodiment, per-LLM scaling policies, indicating the conditions under which additional copies of the LLMs should be launched, the minimum and maximum number of CIs that should be configured for a given LLM, and so on may be provided to the FMS. The artifacts used for a given LLM may include a software container (prepared by the LLM provider) within which a copy of that LLM runs in some embodiments. In one embodiment, several different versions of the same LLM may be provided—e.g., versions which differ in the type of hardware accelerator they are designed optimized for, versions that differ from one another in their total number of parameters (and hence the sizes of the LLMs), and so on.

In various embodiments, a logical network endpoint may be set up, e.g., in response to a programmatic request, at an MLS of the provider network at which the FMS is implemented, to receive end user requests directed to the LLMs of S1 (element 5104). One or more fleets of compute instances may be initialized/launched or identified to run copies of the LLMs. In at least some embodiments, individual ones of the CIs may comprise one or more hardware accelerators for machine learning inference, which can be used to obtain inference results faster from the LLMs than if the accelerators were not used. In some embodiments, at least one copy of each of the LLMs of S1 may be launched or run at a respective CI, so that inference requests directed to any of the LLMs can be processed as they are received.

End user requests directed to the LLMs of S1 may then be accepted at the endpoint (element 5107). A given end user request may indicate the specific LLM to which it is directed, as well as input (e.g., some number of text tokens or characters, and/or other types of media) that is to be provided to the specified LLM.

A number of iterations of measurement and corresponding LLM placement or re-placement/migration operations may then be initiated. In a given iteration, as shown in element 5110, arrival and completion rates of end user requests for the different LLMs of S1 may be monitored for a selected measurement interval in some embodiments. In at least one embodiment, utilizations of various components (e.g., the accelerators, the CPUs, the memory, etc.) of the compute instances may be collected and analyzed, along with metrics such as the sizes of the inputs of the end user requests and the times taken to complete inference computations. In some embodiments, end users may also submit their projected requirements—e.g., a given end user may indicate that they intend to submit N requests for a given LLM LLM-1 on average for the next T hours, with an average input size of P tokens/characters. In some embodiments, the LLM provider may indicate a preferred distribution of end user requests among different versions of a given LLM as discussed above. New LLMs (or new versions of LLMs) may be registered or on-boarded at the FMS at the request of an LLM provider at various points in time.

Based on a combination of such factors, including analysis of the measurements and trends in the measurements, as well as events such as on-boarding of additional models, an MPRM or similar component of the FMS or the MLS may decide whether any scaling actions are needed, e.g., to maximize CI and accelerator utilization while providing desired performance levels to end users in the depicted embodiment (element 5113). The scaling actions may, for example, include adding new copies of one or more LLMs at one or more existing CIs, removing copies of LLMs from existing CIs, re-locating copies of LLMs from one CI to another, adding new CIs, and so on. As and when such changes are made, the MPRM may modify the routing metadata used for deciding to which particular CI a given request should be sent, and the updated metadata may then be used to route the end user requests. Operations corresponding to elements 5110 and 5113 may be repeated in various embodiments as new end user requests continue to arrive. In at least some embodiments, a set of MPRM operation records, indicating for example the combination of compute instances that were used for various copies of LLMs over time may, as well as the underlying metrics or events that led to the scaling decisions made, may be provided via programmatic interfaces to the LLM owners/developers.

LLM-Based Application Development/Orchestration Service

As indicated above, an FMS implemented at a cloud provider network may enable access to a variety of LLMs and other types of foundation models via easy-to-use interfaces. The FMS may implement several types of programmatic interfaces in some embodiments, including interfaces for end users who wish to submit inference queries or requests to FMs and obtain corresponding answers, interfaces for requesting fine tuning of FMs, and so on.

In at least some embodiments, application developers may wish to utilize one or more FMs of the FMS for applications which may involve chains of thought with multi-step reasoning. In effect, in such applications, which may be referred to as multi-step reasoning applications (MSRAs) or chain-of-thought reasoning applications, complex tasks or queries requested by end users may be decomposed using LLMs into smaller lower-level sub-tasks/sub-queries. Respective actions may be initiated to complete some or all of the lower-level tasks or queries, and the results of the lower-level operations may be added to the contextual information used by a target LLM (or a collection of target LLMs) to arrive at the final response for the complex tax or query requested by the end user.

As a trivial example to illustrate the concepts of query decomposition, consider the following query, submitted using natural language, by an end user to an LLM-based MSRA that may be designed to help reduce expenses of an end user: "Here are pdfs of some of my recent credit card statements. Can you please cancel some subscriptions for me so that I can reduce my payments?" In order to respond to such a query, the following sub-tasks may be required (among others): (a) the PDF documents may have to be converted into text, e.g., using optical character recognition or some other tools; (b) from the extracted text, the set of entities to which the end user has made payments reflected in the credit card statements may have to be identified; (c) from among those entities, the subset that represent subscriptions may have to be identified; (d) the subset of subscriptions that can potentially be canceled without the end user's active participation (e.g., using "unsubscribe" interface elements on web sites) may have to be identified; (e) confirmation may have to be obtained from the end user regarding which of those subscriptions the end user is willing to cancel, and (f) the approved-for-cancellation subscriptions may be canceled. In effect, a chain of reasoning pertaining to these sub-tasks or sub-queries may have to be implemented, with respective actions (which may for example involve using APIs of publicly-accessible services or privately-accessible services, or using other LLMs of the FMS) for at least some of the sub-tasks, and the results of the sub-tasks performed thus far may have to be retained as part of the context used for performing subsequent sub-tasks. The invocation of one or more LLMs based on the request submitted by an end user and intermediate requests generated for the sub-tasks, the coordination of the respective actions, and/or the retention of the context information may all be considered orchestration tasks for an LLM-based application (or one of several possible workflows of a given LLM-based application in various embodiments).

Figure 34:
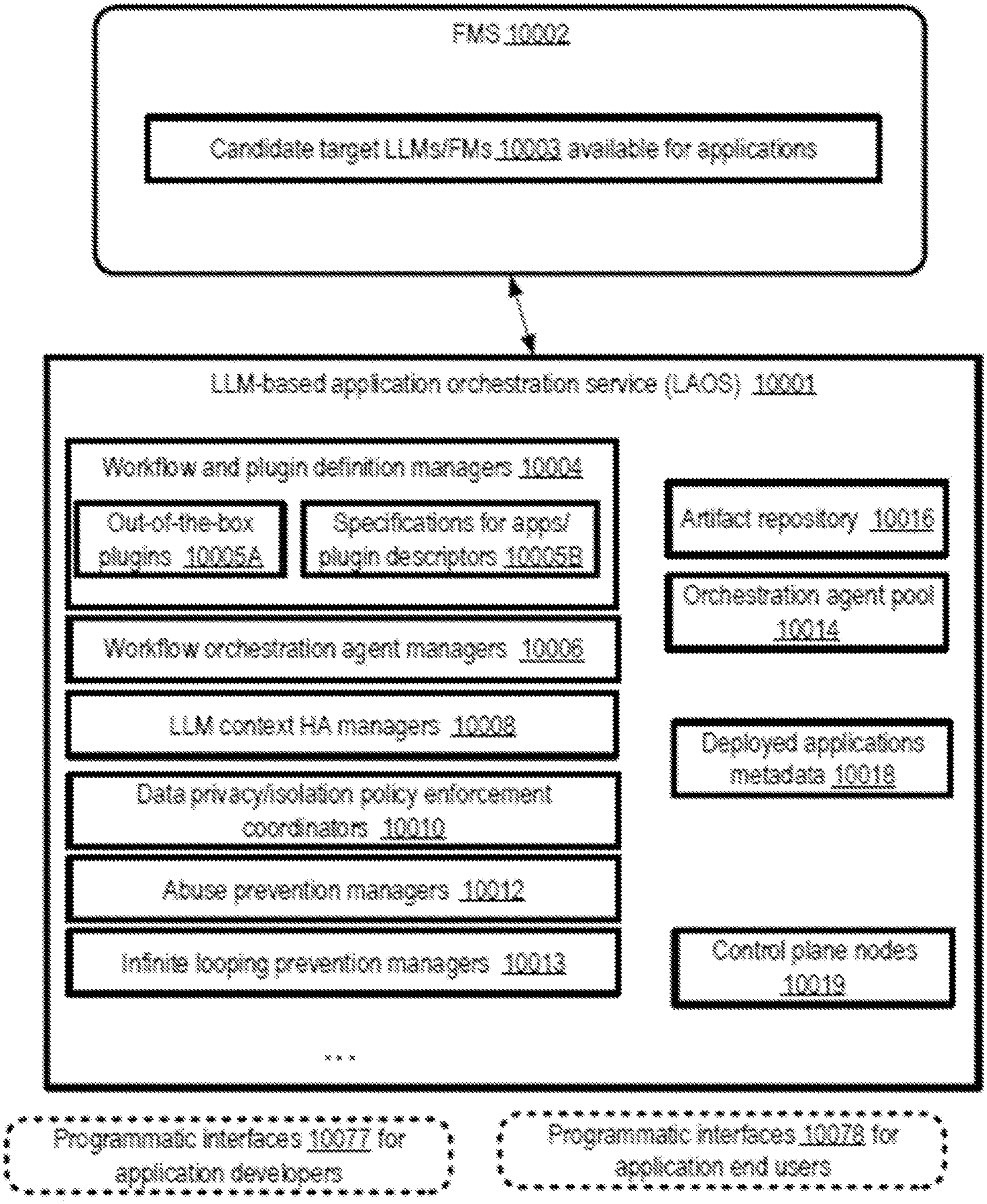
FIG. 34 illustrates example subcomponents and features of an LLM-based application orchestration service (LAOS), according to at least some embodiments.

FIG. 34 illustrates example subcomponents and features of an LLM-based application orchestration service (LAOS), according to at least some embodiments. According to one embodiment, a LAOS 10001 may be implemented at a cloud computing environment or cloud provider network similar to the provider network discussed earlier. The LAOS may be utilized by developers to generate LLM-based applications, with at least some of the LLMs being hosted at and made accessible by an FMS 10002 similar in features and functionality to the FMS introduced earlier. A given application may be used to implement one or more categories of workflows on behalf of end users, with at least some reasoning for intermediate steps of a given workflow being performed using one or more LLMs/FMs. FMS 10002 may comprise a plurality of candidate target LLMs/FMs 10003 available for applications managed with the help of the LAOS; a given application whose workflows are orchestrated with the help of the LAOS may utilize one or more such FMs. The LAOS, which may also be referred to as an FM-based application development and deployment service, may provide a fully managed set of orchestration functionality to application developers. That is, while the application developers may be required to provide descriptors of their applications (including, for example, the target LLM/FM of the application, such as one of the FMs of the FMS, as well as specifications/descriptions of action initiators that might be invoked for various sub-queries or sub-tasks), the application developers may not have to acquire or manage specific computing resources used for coordinating/orchestrating their applications' workflows, ensuring that resources used for the workflows provide a desired level of high availability, scaling up the set of resources used for their application workflows as end user workload levels increase, managing security, ensuring compliance with various policies (e.g., content moderation policies imposed by the relevant jurisdictions, as well as policies of the provider network and/or the organizations to which the application developers belong) and the like. Such administrative tasks may be handled on behalf of the application developers by the LAOS in various embodiments.

The LAOS may implement at least two categories of programmatic interfaces (such as web-based consoles, command-line tools, APIs, graphical user interfaces etc.) in some embodiments. Programmatic interfaces 10077 may be provided for application developers (e.g., to provide descriptors of their applications, to request orchestration, to provide various parameters associated with orchestration, and so on), while programmatic interfaces 10078 may be provided for end users to submit queries/requests to the applications and receive corresponding responses.

As indicated above, for a given end-user request directed to an application being managed using the LAOS, in some cases one or more types of actions may have to be initiated for individual subtasks into which the task indicated in the request has been decomposed. The term "plugin" may be used to refer to action initiators in various embodiments, e.g., programs or services that can be programmatically invoked to perform a given action corresponding to a given subtask. In one embodiment, a descriptor of an application, provided by the developer to the LAOS, may indicate one or more target LLMs to be used for the application's workflow(s), and one or more plugins that may be invoked for various sub-tasks identified in the workflow(s). One example plugin, may, for example, comprise a function (developed or created by the application developer) that can invoke an API of an online database or search engine. While some plugins may perform read-only operations, others (such as a plugin which cancels a subscription to an online content presentation service) may perform mutating actions in some embodiments; yet other plugins may request assistance from other LLMs or from human beings (e.g., via crowdsourcing services).

Various subcomponents of the LAOS 10001 shown in FIG. 34, such as workflow and plugin definition managers, control plane nodes, workflow orchestration agent managers, and the like may be implemented using some combination of hardware and software of one or more computing devices in different embodiments. In at least some embodiments, control plane nodes 10019 may be responsible for administering other components of the LAOS (e.g., ensuring that sufficient resources have been provisioned for workflow and plugin definition managers, workflow orchestration agent managers, and the like, monitoring the health state of the other components, and so on). In some embodiments, control plane nodes may be responsible for initial handling of messages submitted by application developers (such as messages comprising application descriptors); the control plane nodes may analyze the contents of the received messages to determine which of the other components of the LAOS should respond to the received messages and send the messages on to those other components.

Workflow and plugin definition managers 10004 may obtain definitions/descriptors of LLM-based applications/workflows and the plugins that may be used for such applications, perform a set of verification tasks on the received descriptors (e.g., to ensure that the descriptors comply with standards and policies of the LAOS), and accept/reject the descriptors based on the results of the verification tasks in some embodiments. Representations of accepted plugins and applications/workflows may be stored in an artifact repository 10016 in some embodiments. If the submitted application descriptor or plugin is rejected, in at least some embodiments the application developer may be sent an indication of the reason for the rejection; the developer may resubmit a modified version if desired. In some embodiments, the LAOS may provide a set of out-of-the-box plugins 10005A (e.g., plugins for common types of actions such as performing web searches, looking up a topic in Wikipedia or similar information repositories, accessing a cloud database service, etc.), which can be utilized by developers for their applications. In one embodiment, the LAOS may provide or publish requirements specifications 10005B for application descriptors and plugins, indicating for example a set of acceptable formats in which applications and/or plugins can be expressed by the developers when submitting definitions. The verification operations performed by the workflow and plugin definition managers may include ensuring that the workflows and plugins comply with the specifications.

Workflow orchestration agent managers 10006 may be responsible for configuring (e.g., with the help of LAOS control plane nodes) respective agents that are to orchestrate workflows of different applications in some embodiments. An orchestration agent pool 10014 may be set up in some embodiments, comprising for example a plurality of compute instances (e.g., compute instances equipped with machine learning accelerators of the kind discussed above) at which programs are run to coordinate the invocations of target LLMs of an application, as well as the invocation of plugins at various stages of the workflows of the application. In some embodiments, a given orchestration agent may itself comprise an LLM or other machine learning model; in other embodiments, at least some orchestration agent may comprise a program that does not include a machine learning model.

One of the benefits of using a LAOS is that the context information which is used by LLMs at various stages of application workflows is stored and maintained in a highly-available manner, so that for example even if a given device at which the context information is stored happens to fail, the context information is not lost. This feature prevents, for example, having to re-execute all the earlier phases or sub-tasks of workflow in the event of such a failure. One or more LLM context HA (high availability) managers 10008 may be responsible in the depicted embodiment for implementing techniques (such as intelligent replication of context information, which minimizes the amount of storage or memory needed for high availability, and also speeds up the replication of the context information by selecting the most appropriate storage devices) to ensure that context information is retained despite failures at individual devices.

The LAOS may be responsible for ensuring enforcement of a set of data privacy and isolation policies in the depicted embodiment. These may include policies chosen by the LAOS provider (e.g., the operator of the provider network at which the LAOS is implemented), policies indicated by application developers, policies mandated by governments at various levels, and so on. Data privacy/isolation policy enforcement coordinators 10010 may be responsible for putting in place safeguard mechanisms (e.g., mechanisms that involve examining and interpreting output produced by LLMs and/or plugins at various stages of a workflow) to ensure that certain types of personal identification information is not being revealed etc. and providing auditable records of the safeguard mechanism results. Abuse prevention managers 10012 may similarly ensure (e.g., by examining and interpreting output produced by the LLMs and/or plugins) that the LLM-based applications are not being utilized for objectionable purposes (e.g., with the objectionable purposes being defined in policies of the LAOS). In at least some embodiments, the LAOS may include infinite looping prevention managers 10013 that attempt to ensure that LLMs do not enter into infinite loops of sub-query evaluation or sub-task execution. Infinite loops may be prevented, for example, by examining records of the sequences of plugin executions in response to a given end user request, and by examining whether the inputs being provided to a given plugin that happens to be invoked repeatedly overlap substantially or not; if such substantial overlaps are detected multiple times in response to a given end user, this may indicate that a loop that is unlikely to terminate may have been entered, and corrective action (such as terminating the workflow) may be initiated. In at least some embodiments, a subset of the functionality of the LLM context HA managers, data privacy/isolation policy enforcement coordinators 10010, abuse prevention managers 10012 and/or infinite looping prevention managers 10013 may be performed within or by orchestration agents—e.g., a given orchestration agent may include a module that performs some or all of these functions, or in the cases in which the orchestration agent is itself an LLM or some other machine learning model, that LLM or model may be trained to perform one or more of these functions. Deployed applications metadata 10018 may be used to store representations (e.g., including descriptors of resources currently being used for the LLMs of applications) of various applications that have been accepted at the LAOS and are currently in use by end users or available for use by end users in various embodiments.

Figure 35:
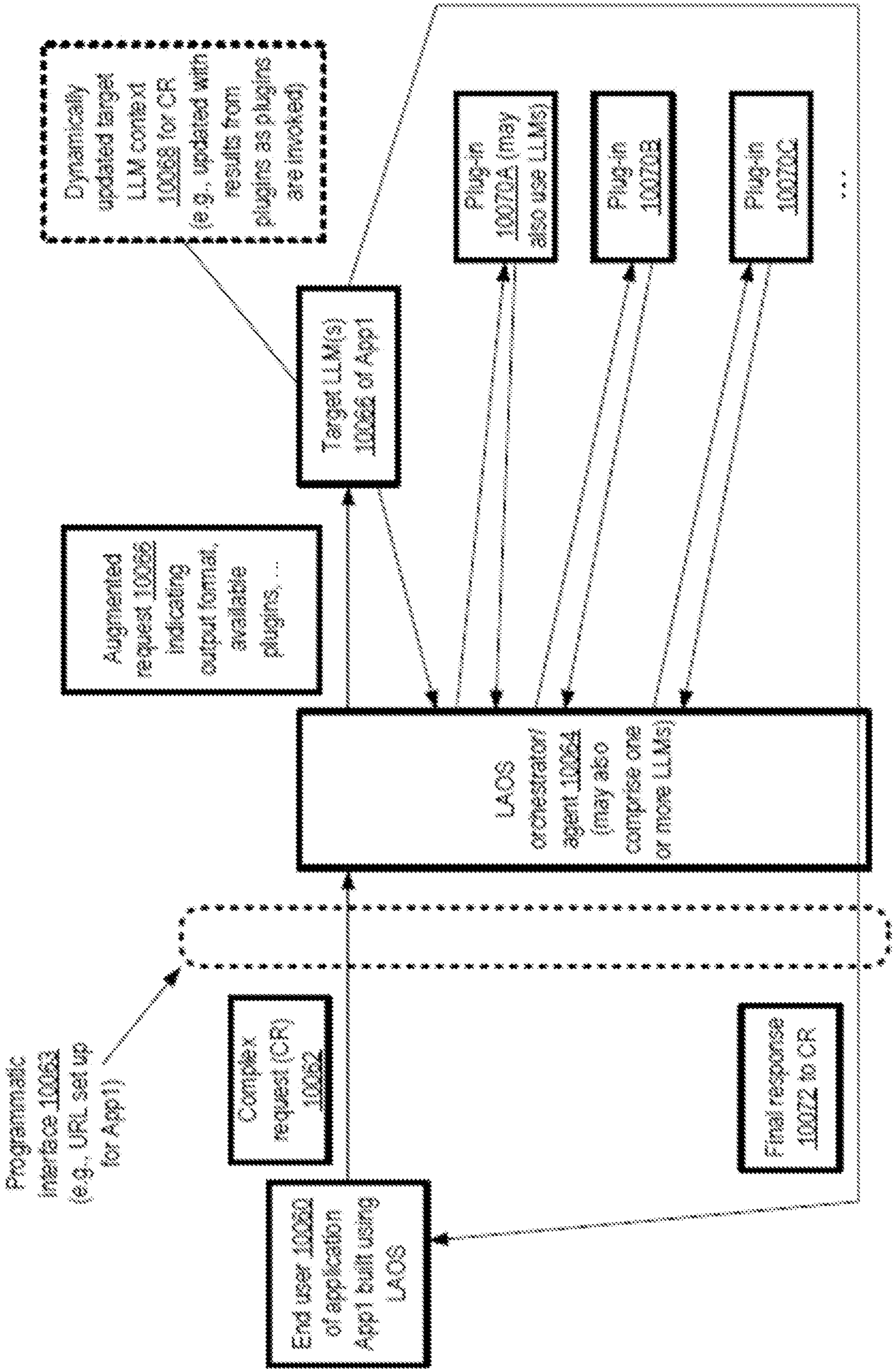
FIG. 35 illustrates an example scenario in which respective plugins may be invoked with the help of a LAOS orchestration agent to generate an overall response for a complex request which requires chain-of-thought reasoning, according to at least some embodiments.

FIG. 35 illustrates an example scenario in which respective plugins may be invoked with the help of a LAOS orchestration agent to generate an overall response for a complex request which requires chain-of-thought reasoning, according to at least some embodiments. In the depicted example scenario, one or more target LLM(s) 10066 (e.g., LLMs that are hosted at and accessible from an FMS of the kind introduced earlier) may be specified by an application developer for a particular application App1 which is built using a LAOS of the kind introduced above. As such, at a high level, the target LLM may be responsible for generating responses to end user queries or prompts.

An end user 10060 of App1 may submit a complex request (CR) 10062 to App1 via a programmatic interface 10063 (such as a web services interface with a Uniform Resource Locator or URL set up by the LAOS or the FMS for App1), and eventually receive a final response 10072 generated with the help of the target LLM(s). From the perspective of the end user, it may appear that the request is being handled by a single entity or device implementing App1. Behind the scenes, however, a more complex workflow may be implemented to prepare the final response in at least some embodiments.

A LAOS orchestrator/agent 10064 assigned to App1 (e.g., by a workflow orchestration agent manager of the LAOS) may receive the raw version of the CR submitted by the end user in the depicted embodiment. The agent may generate an augmented version of the request 10066, which indicates for example an output format (e.g., a machine-readable format such as JavaScript Object Notation (JSON) or the like) in which the target LLM is to provide its output, and a list of available plugins of App1 such as plug-in 100070A, plug-in 100070B, and plug-in 10070C. These plugins may have been provided for App1 by the developer of App1, e.g., as part of the App1 application descriptor sent to the LAOS by the developer.

The target LLM may be able to determine that it will be unable to generate a final response of a desired accuracy or quality without using plugins in the depicted embodiment. Instead of trying to provide the final response immediately, the target LLM may therefore decompose CR into lower-level sub-requests or sub-queries and obtain answers for the sub-queries with the help of the plugins as it attempts to build up or reach the final response using chain-of-thought reasoning. The terms sub-request, sub-task, and sub-query may be used interchangeably herein.

In the depicted embodiment, the target LLM may generate an answer or response to a first sub-query and send the sub-query and its response to the agent 10064. In some cases, the target LLM may identify that a second sub-query (generated for example based on the answer to the first sub-query) is to be sent to plug-in 10070A. The agent may then send the second sub-query to the plug-in 10070A. A response from the plug-in 10070A may be received at the agent and/or the target LLM, and the target LLM context 10068 for responding to CR may be updated dynamically with this response. The target LLM may then send the agent an indication of a second sub-query (generated for example from the combination of results of the earlier sub-queries) to be sent to a second plug-in 10070B. A response from 100070B may be received and used to update the LLM context. A third sub-query may then be sent with the help of the orchestrator to a third plug-in 100070C, and so on. Eventually the accumulated responses to the set of sub-queries may provide the target LLM sufficient information for it to generate the final response 10072. In some cases, as in the scenario shown in FIG. 35, the final response may be sent to the end user by the agent rather than from the target LLM; in other cases, the final response may be sent directly from the target LLM. Note that in some embodiments, an agent 10064 may itself comprise one or more LLMs of an FMS. In one embodiment, one or more plugins may utilize or invoke LLMs.

Variants of the concepts illustrated in the example scenario of FIG. 35 may be employed in some embodiments. For example, multiple target LLMs may be used; not all the sub-queries may be generated by the same target LLM, and results of different sub-queries may be consumed by respective target LLMs in some cases. In one embodiment, one or more plugins may be invoked in parallel (or at least with some degree of concurrency); plugins need not necessarily be invoked in sequence. In some embodiments, the agent may select (or participate, together with a target LLM, in the selection of) the next plugin that is to be invoked. In some embodiments, multiple LLMs may be used collectively to implement orchestration for a given application workflow, e.g., in an effort to implement various safeguards related to abuse of LLM technology as discussed below.

Figure 36:
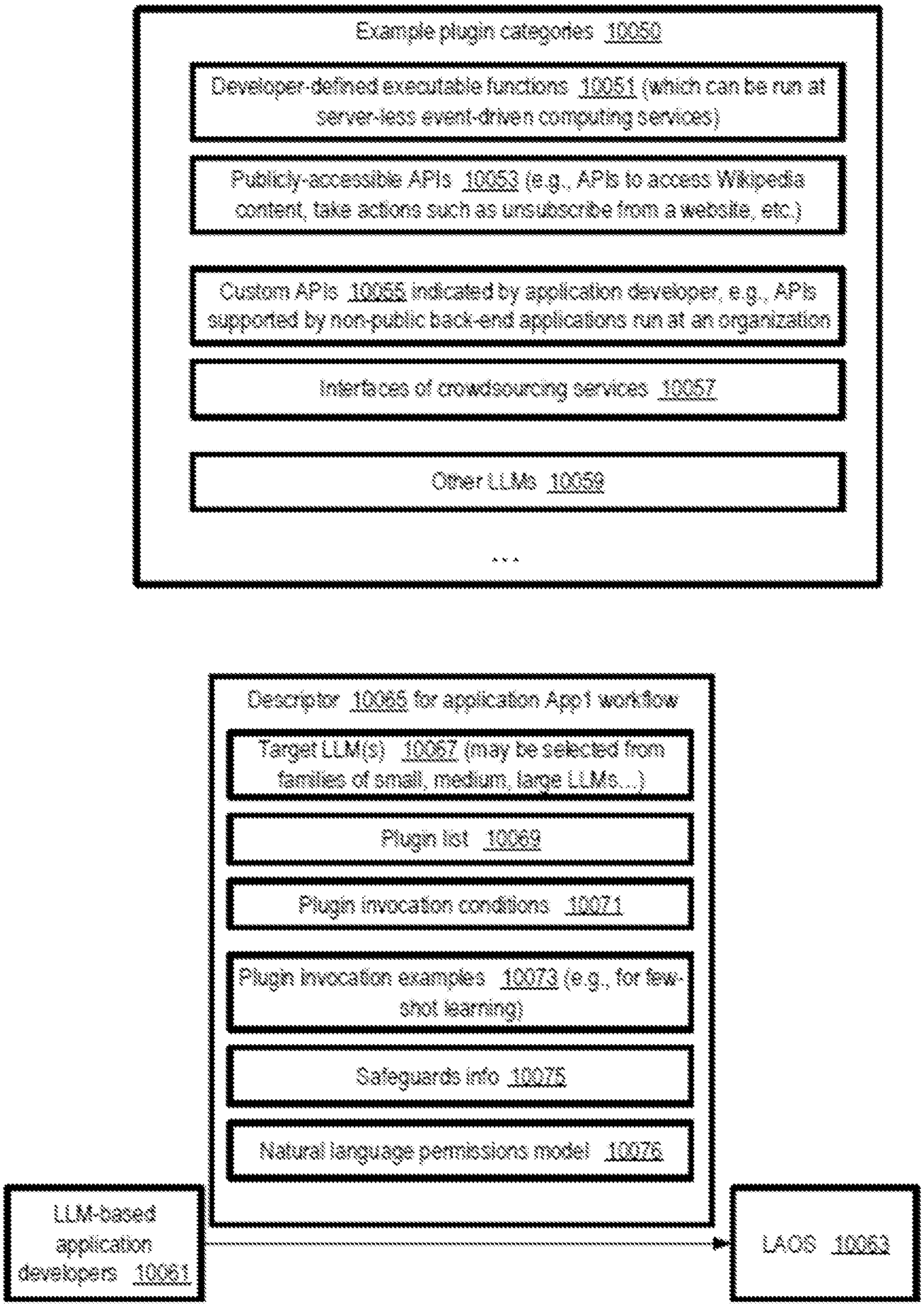
FIG. 36 illustrates example categories of plugins that may be utilized for LLM-based applications, and example contents of an LLM-based application workflow descriptor, according to at least some embodiments.

FIG. 36 illustrates example categories of plugins that may be utilized for LLM-based applications, and example contents of an LLM-based application workflow descriptor, according to at least some embodiments. Example plugin categories 10050 of FIG. 36 may include, among others, developer-defined executable functions 10051 which may be run at server-less event driven computing services such as service 981 of FIG. 9. The developer may specify the logic to be executed in such a function (using any of several programming or scripting languages supported by the server-less computing service, and submitted to the computing service as a zip file or a software container), and the triggering events or conditions (such as a request from an LAOS agent) for the execution of the function, without having to choose a specific virtual or physical computing device at which the logic is to be executed at run time. The computing service may choose the appropriate execution resources for the function just before the function has to be executed in various embodiments. An additional benefit of using a server-less computing service of a cloud provider at which the LAOS is implemented may be that the developer of the LLM-based application may already be familiar with the functional programming model implemented at such a service, and the APIs supported by the server-less computing service, so a learning curve for specifying plugins may not be required.

In at least some embodiments, publicly-accessible APIs 10053, such as APIs for performing Wikipedia lookups or web searches, APIs for unsubscribing to publicly-available services, and the like, may be used as plugins. In one embodiment, an organization to which the developer belongs, or partner organizations, may have non-public APIs that can be used for LLM-based applications. These may include, for example, APIs to access organization-private databases or other back-end applications. Such custom APIs may 10055 may be specified as plugins by application developers some embodiments.

In some embodiments, one or more sub-tasks or sub-queries that are generated during an LLM-based application workflow may require help from humans, e.g., via crowd-sourcing or similar services. Interfaces of crowdsourcing services 10057 may be specified as plugins in such embodiments—that is, requests for sub-tasks may be handed over to a crowdsourcing service, and results may be obtained for the sub-tasks with the help of humans that participate in the crowdsourcing. In one embodiment, LLMs 10059 other than the target LLMs of the application may be used as plugins. That is, the developer may specify fine-tunes versions of one or more LLMs (which may be hosted at an FMS) that should be sent some types of sub-queries of the application.

As mentioned earlier, in some embodiments LLM-based application developers 10061 may submit descriptors of their applications (or individual workflows on an application) to a LAOS 10063 at which orchestration for the applications is to be performed. In some embodiments, each LLM-based application may have a single type of expected workflow for all end user requests; in other embodiments, respective workflows may be designed to handle different kinds of requests directed to the same application (with the same set of target LLMs). Such descriptors may also be referred to as "recipes" for the corresponding applications and workflows.

In the scenario shown in FIG. 36, descriptor 10065 for an application App1 workflow may indicate one or more target LLMs (or FMs) 10067. In some embodiments, an FMS of the kind introduced earlier may include several families of LLMs/FMs. A given family of LLMs may, for example, include multiple LLMs with a similar architecture and designed to solve the same general category of problem, with the individual LLMs differing from each other in their sizes (expressed, for example, in terms of the number of parameters). Thus, for example, family-A LLMs may include large-LLM-A with N1 million parameters, a medium-LLM-A with N2 million parameters (where N2<N1), a small-LLM-A with N3 million parameters (where N3<N2), and so on. Each of the different-sized LLMs within a family may be capable of providing responses to the same input query. However, the accuracy/correctness (and other quality metrics) of the responses may be superior for larger models of the family than for smaller models, and the amount of computing resources (e.g., GPU cycles or other machine learning accelerator cycles) consumed by larger models may generally be greater than the amount of computing resources consumed by the smaller models for the same query. The developer may be able to specify the sizes as well as the families of the target LLMs for their applications in the depicted embodiment.

In at least some embodiments, a developer may provide a plugin list 10069 for a workflow, indicating the set of plugins (with each plugin belonging to one of the categories shown in FIG. 36) available for the workflow. Respective conditions 10071 under which the different plugins should be invoked may be specified in the descriptor in some embodiments, e.g., in natural language. For example, the developer may indicate something along the following lines "If reliable information on a scientific topic T1 on which research has been available for some time is desired, with a set of cited resources for the information, plugin P1 which accesses published articles of a scientific journal on topic T1 can be used".

In some embodiments, the developer may provide examples 10073 of plugin invocations and the corresponding results that were obtained. This may be helpful in a technique called few-shot learning, as a target LLM may be able to consume the examples as input and be able to learn the kinds of situations in which various plugins should be selected for sub-queries that the target LLM has generated.

Depending on the nature of the application, a developer may in some cases provide safeguards information 10075 pertaining to the application or workflow to the LAOS. For example, if the application is intended to help end users cancel subscriptions that the end user may no longer use very much, the safeguards information for the application may indicate that only subscriptions of the requesting end user are to be canceled (as opposed to subscriptions of other people, or subscriptions that may be shared with other people), and even those should only be deleted after double-checking with the end user that requested the cancelations. Other types of safeguard information may be provided in some cases, such as the equivalent of "do not initiate any transaction which involves an expense greater than $X" and the like.

In some embodiments, some of the actions that may be initiated by plugins of an application may require certain types of permissions that may not be granted to all end users. Consider, for example, an LLM-based application pertaining to certain kinds of equipment-related tasks that may need to be performed within a large organization. The end users of the application may be employees of the organization, who may be divided into different sub-groups (e.g., at different layers of an organizational hierarchy). Some sub-groups may be permitted to perform or initiate actions which are not permitted for others. In at least one embodiment, instead of trying to add permission checks separately for each type of action that may be performed as a result of executing an LLM-based model, the developer may provide a permissions model 10076, expressed in natural language, as part of a descriptor 10065. In this natural language permissions model, the developer may indicate for example, something like the following: "Actions of type A can only be performed if the end user belongs to sub-group SG1. Actions of types D, E or F can be performed if the end user belongs to sub-groups SG2 or SG3. To figure out which sub-group an end user belongs to, you can send the end user's request and associated metadata such as source IP address to a plugin P-1". The permissions-related plugin P-1 may be able to look up, using the organization's employee database, for example, the sub-group to which the submitter belongs. In some embodiments, depending on the nature of the application, the developer may be required to submit an indication of a permissions-related plugin that can be used in conjunction with a developer-supplied permissions model; without such a plug-in, the descriptor may be rejected in such embodiments. In some embodiments, an application or workflow descriptor may include other elements than those shown in FIG. 36; for example, a developer may specify a particular LLM (distinct from a target LLM) that should be used as an orchestrator (orchestration agent) for the application in one embodiment. In some embodiments one or more of the elements shown in FIG. 36 may not be required in an application workflow descriptor.

Figure 37:
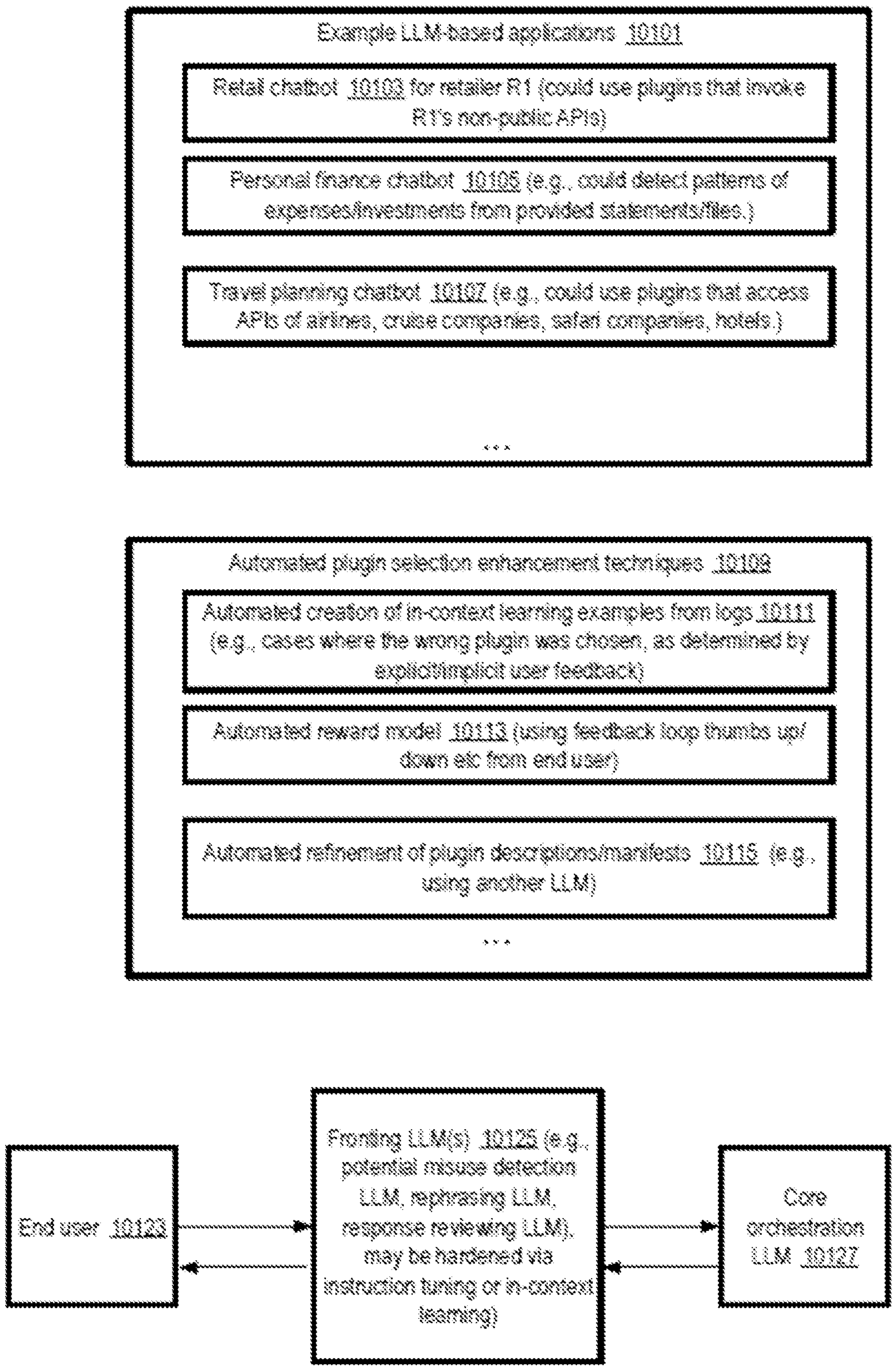
FIG. 37 illustrates example LLM-based applications, automated plugin selection enhancement techniques, and an example scenario in which multiple LLMs may be utilized on a path between an end user and a core orchestration LLM, according to at least some embodiments.

FIG. 37 illustrates example LLM-based applications, automated plugin selection enhancement techniques, and an example scenario in which multiple LLMs may be utilized on a path between an end user and a core orchestration LLM, according to at least some embodiments.

A wide variety of LLM-based applications 10101 which utilize chain-of-thought reasoning for solving problems in different domains may be implemented with the help of a LAOS and an associated FMS in different embodiments. Such applications may include, for example, a retail chatbot 10103 for a retailer R1, a personal finance chatbot 10105, or a travel planning chatbot 10107. The retail chatbot may be used, for example, by end users to ask questions about various products available from the retailer for purchase. The personal finance chatbot may be used, for example, to analyze an individual's finances if the individual is willing to provide access to statements from credit card companies, investment institutions, banks, and the like, and to perform actions such as canceling subscriptions for services that the individual is no longer interested in. The travel planning chatbot may be able to help individuals plan non-trivial trips which involve the use of airlines, cruise ships, hotels, tour guides, safari operators, and the like. The retail chatbot may use at least some plugins that invoke non-public APIs of the retailer in some embodiments. The personal finance chatbot, may for example use plugins that extract content from provided financial statements, from which patterns of expenses and investments may be detected. The travel planning chatbot may utilize plugins that invoke APIs of airlines, cruise companies, safari companies, hotels, and the like.

To help explain additional aspects of the working of a LAOS, consider the retail chatbot application as an example. Assume that the developer of this application is going to use developer-defined functions (to be executed at a server-less computing service of the kind described above) as plugins. To prepare the application, the developer may select a base or target LLM (either an off-the-shelf LLM available from the FMS, or a custom or fine-tuned model). The developer may define and configure a set of functions as plugins to enact actions needed in the chain-of-thought reasoning process and describe the plugins' capabilities in a few sentences each. Assume that three plugins may be used for the retail chatbot: a ProductSearch plugin, a GetProductSpecification plugin, and a GetProductReview plugin. The developer may provide information about the plugins, in natural language, in some embodiments as part of the application descriptor of the retail chatbot. In at least some embodiments, in effect, a prompt similar to the following may be provided by the developer, e.g., as part of the application descriptor. "Have a conversation with a human, answering the following questions as best you can. You have access to the following tools:

Product Search: search a catalog for a product using a keyword.

GetProductSpecification: get specifications for a product ID and return details such as weight, size, colors, etc. This tool needs a product ID that is obtained from ProductSearch. It cannot use a product name to look up specifications.

GetProductReview: Gets reviews for a product ID and returns customer reviews. This tool needs a product ID that is obtained from ProductSearch. It cannot use product name to look up reviews.

Use the following format:

Question: the input question you must answer

Thought: you should always think about what to do

Action: the action to take, should be one of [ProductSearch, GetProductSpecification, GetProductReview]

Action Input: the input to the action

Observation: the result of the action

. . . (this Thought/Action/Action Input/Observation can repeat N times)

Thought: I now know the final answer

Final Answer: the final answer to the original input question

Question: {end customer's prompt}"

As a result of the developer's prompt, an orchestration agent that uses the target LLM to engage in multi-turn conversations and use chain of thought reasoning to orchestrate API calls if needed at each turn may be configured at the LAOS in various embodiments. A fully managed run-time experience may be provided by the LAOS and the FMS for the agent, with aspects such as high availability and scalability being handled transparently. For example, resource consumption and/or evidence of failures may be tracked by the LAOS at the compute instances or virtual machines being used for various components of the application (including the agent and the base LLM), and actions such as configuring larger or more instances, failing over workloads from one instance to another, etc., may be taken transparently.

Below is an example conversation between an end user or customer and the retail chatbot agent, also showing the chain of thought and the plugin-based actions which may be implemented behind the scenes. The customer is assumed to be interested in potentially purchasing, or at least learning more about, toys such as train sets and plane sets that may be available from the retailer on whose behalf the chatbot is created. The LLM being used may provide the orchestration agent with an indication of which plugin should be invoked next, and the agent may then invoke that agent and provide the response of the agent to the LLM. This example conversation illustrates a technique called RAG (retrieval-augmented generation) as part of a multi-turn experience using several plugins, based on the ability to persist memory and pass relevant context across turns.

----Start example conversation----

Customer query: Do you have "Train Set XYZ"?

Chatbot thought: I need to search the catalog for this product.

Plugin invoked: ProductSearch (with "Train Set XYZ" as input keyword), returns PID1.

Chatbot thought: I need to get the specification for this product.

Plugin invoked: GetProductSpecification (with PID1 as product ID), returns detailed spec Spec1 of Train Set XYZ Chatbot thought: I need to get reviews for this product.

Plugin invoked: GetProductReview (with PID1 as product ID), returns list of reviews RL1.

Chatbot thought: I now know the final answer.

Chatbot response to customer: Yes, we have "Train Set XYZ". [Additional description of the train set, based on Spec1, may be provided here]

Customer query: How about "Plane Set DEF"?

Chatbot thought: I need to search the catalog for this product.

Plugin invoked: ProductSearch (with "Plane Set DEF" as input keyword), returns PID2.

Chatbot thought: I need to get the specification for this product.

Plugin invoked: GetProductSpecification (with PID2 as product ID), returns detailed spec Spec2 of Plane Set DEF Chatbot thought: I need to get reviews for this product.

Plugin invoked: GetProductReview (with PID2 as product ID), returns list of reviews RL2.

Chatbot thought: I now know the final answer.

Chatbot response to customer: Yes, we also have "Plane Set DEF".

[Additional description of the plane set, based on Spec2, may be provided here]

Customer query: Do both require batteries?

Chatbot thought: I need to check the specification of each product.

Plugin invoked: GetProductSpecification (with PID1 and PID2 as product IDs), returns detailed specs Spec1 and Spec2 (results may be retrieved from a cache in memory in some cases, so no actual APIs may need to be invoked in some embodiments)

Chatbot thought: I need to check the reviews for these products.

Plugin invoked: GetProductReview (with PID1 and PID2 as product IDs), returns list of reviews RL2 (results may be cached)

Chatbot thought: I now know the final answer.

Chatbot response to customer: "Plane Set DEF" requires batteries, but "Train Set XYZ does not".

Customer query: What do customers dislike about "Train Set XYZ"?

Chatbot thought: I need to check the reviews for this product.

Plugin invoked: GetProductReview (with PID1 as product ID), returns list of reviews RL2 (results may be cached)

Chatbot thought: I now know the final answer.

Chatbot response to customer: Some customers have mentioned that the trains break easily.

----End example conversation----

As indicated above, in some embodiments the target LLM may select the particular plugin which is to be invoked or utilized at various stages of the application workflow. The plugin selected may not necessarily be the right choice in some cases; that is, the LLM may make mistakes in plugin selection, based for example on errors in the LLM's reasoning. In various embodiments, any of several automated plugin selection enhancement techniques may be employed to improve the LLM's selections of plugins over time. These techniques may include, among others, automated creation of in-context learning examples from logs 10111, an automated reward model 10113, and automated refinement of plugin descriptions/manifests 10115. In various embodiments, logs may be generated and stored at the LAOS, indicating the plugins selected by the target LLMs at various workflow stages in response to queries from different users. In scenarios in which end user feedback (e.g., either explicit feedback in which the user declares to the application that a result provided by the LLM seems incorrect, or implicit feedback in the form of the user leaving a conversation mid-stream etc.) indicates that the wrong plugin was selected, in-context learning examples may be created from the corresponding log entries and used to train the LLM to make better decisions. In some cases, the end user may be provided simple feedback interface elements (such as a thumbs-up or thumbs-down interface that can be used to indicate approval or disapproval of the responses provided by the LLM), and a reward model for the LLM may be created which utilizes the feedback to indicate which of the LLM's plugin selection decisions were considered better than others. The use of the reward model may result in automated enhancement of the LLM's decision-making abilities regarding plugins. In various embodiments, as indicated above, the developer of an LLM-based application may provide short natural language descriptions (sometimes referred to as manifests) of the plugins available for the application. In some cases, the descriptions may not provide sufficiently clear distinctions between plugins, and the LLM may choose an incorrect plugin because of the lack of clear distinctions in the descriptions. In at least one embodiment, the descriptions/manifests may themselves be automatically refined, e.g., using one or more other LLMs, to make the distinctions between the different plugins clearer, and thereby to improve the ability of the target LLM to choose the right plugins.

In the embodiment shown in FIG. 37, the orchestration agent or orchestrator (the entity that performs tasks such as invoking plugins on behalf of a target LLM of an application, or invokes several different target LLMs on behalf of an end user request) may itself comprise an LLM referred to as a core orchestration LLM 10127. LLMs and other FMs are in general typically extremely capable in their reasoning abilities and can at least in principle potentially initiate tasks which may end up being harmful. One of the ways in which such abuses of LLM technology can potentially be triggered is if a malicious end user is able to supply a cleverly formulated complex request which confuses the orchestrator itself, or is able to cause the orchestrator to initiate (e.g., via the target LLM or via one or more plugins) operations that the developer did not intend. In order to avoid such scenarios, in at least one embodiment a set of other LLMs, referred to as fronting LLMs 10125, may be interposed between the end user and a core orchestration LLM 10127.

Any of several types of fronting LLMs may be used in the depicted embodiment. One type of fronting LLM may be referred to as a general-purpose misuse detection LLM, which analyzes the raw input query sent by an end user to try to determine whether the language used in the input could confuse the core orchestrator LLM or the target LLMs. If the misuse detection LLM predicts that there is a non-trivial probability of misuse, the query submitted by the end user may be rejected in some embodiments. In one embodiment, a rephrasing LLM may be used, e.g., in addition to a general purpose LLM. The rephrasing LLM may rephrase or modify the input provided by the end user, in a scenario in which the predicted misuse probability is non-negligible, in such a way that the probability of misuse is reduced to zero (or near zero), for example. In some embodiments, the final response being sent back to the end user (e.g., via the core orchestration LLM) may also be analyzed by another LLM referred to as a response reviewing LLM. The response reviewing LLM may ensure that the content being provided to the end user satisfies certain quality criteria of the LAOS (e.g., that the content cannot be construed as inciting violence, does not include language that can be considered discriminatory or inflammatory, and so on). The fronting LLM(s) may be hardened or enhanced via instruction tuning or in-context learning techniques in at least one embodiment. In some embodiments, fronting LLMs may not be used.

Figure 38:
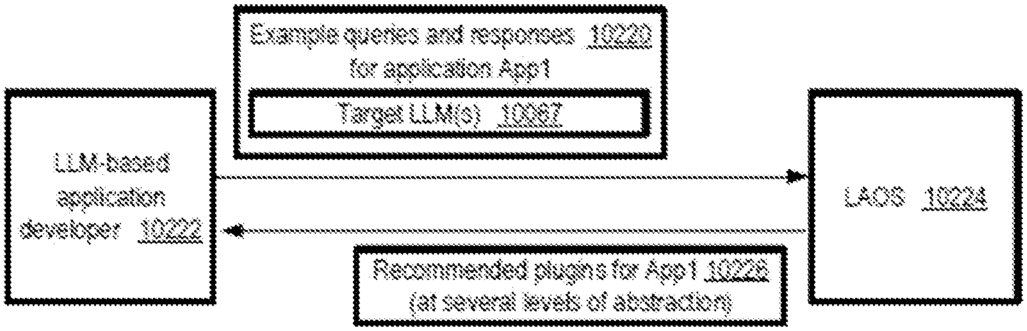
FIG. 38 illustrates an example scenario in which an LLM-based application orchestration service may recommend plugins for an application, as well as a flow diagram illustrating aspects of example operations which may be performed at such a service, according to at least some embodiments.
Figure 38:
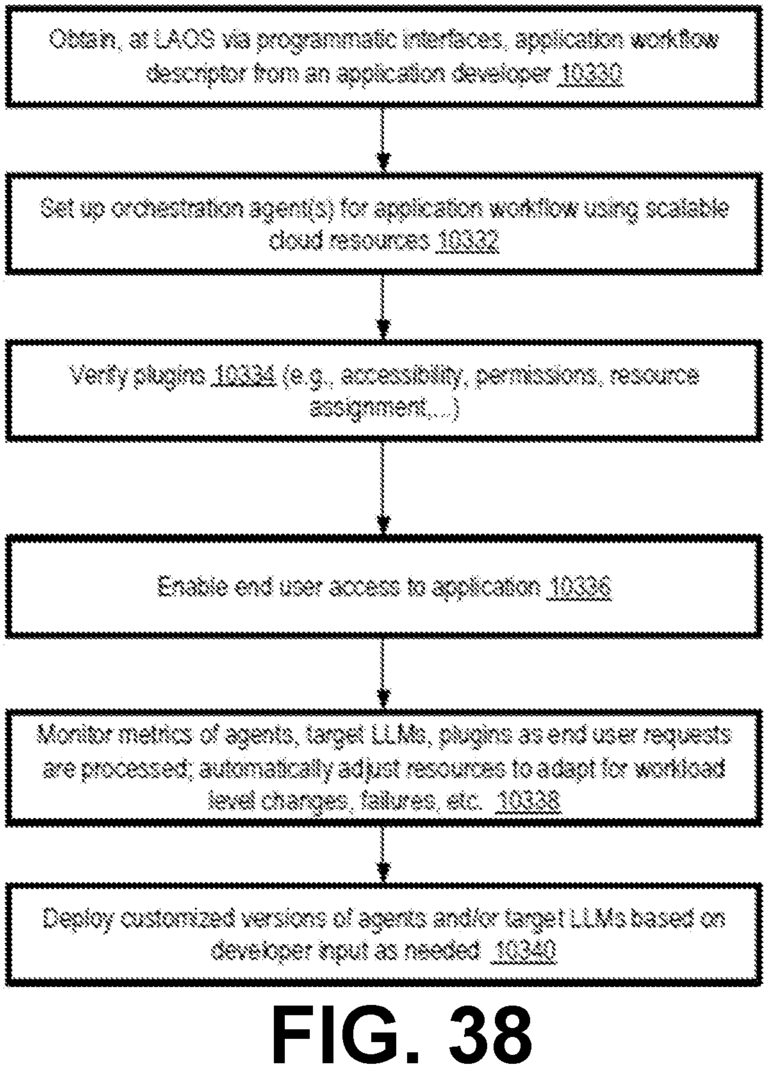

FIG. 38 illustrates an example scenario in which an LLM-based application orchestration service may recommend plugins for an application, as well as a flow diagram illustrating aspects of example operations which may be performed at such a service, according to at least some embodiments. In some embodiments, an LLM-based application developer 10222 may use the programmatic interfaces of a LAOS 10224 to submit example queries and response 10220 for an application App1 to be built using one or more target LLMs 10067 of the LAOS. The application developer may not indicate a complete list of the plugins that may be needed for App1; in one scenario, the developer may indicate no plugins at all. The example queries and responses may be analyzed at the LAOS, e.g., using one or more other LLMs (or one or more of the target LLMs themselves). Input provided to these other LLMs may, for example, comprise natural language equivalent to the following: "Here are some example queries and corresponding expected responses. Can you think of some intermediate actions that, if the actions were performed when similar queries were submitted, would help an LLM such as yourself to come up with appropriate responses?" In a scenario similar to the example of the retail chatbot described above, the LLM to which this question was posed may come back with responses such as "Some of the helpful actions could include obtaining a product ID from a set of keywords, getting detailed specifications of the products, and getting a list of reviews of the products".

This type of response may be included in a message 1026 indicating a recommended set of plugins for App1 which may be provided to the developer by the LAOS. The recommendations may be provided at any of several levels of abstraction in different embodiments—e.g., in some cases, the recommendations may indicate plugin requirements expressed in natural language, in other cases a set of proposed recommended APIs with specified parameters as input may be indicated, and so on. In at least one embodiment, a code generation LLM may be used to generate template or skeleton code for the proposed plugins (e.g., in a language which can be used to specify functions that can be executed at server-less computing service of the provider network), and the developer may take the templates and fill them out appropriately to generate the plugins. The developer may then submit a list of plugins (at least some of them generated in accordance with the recommendations) and send it for orchestration of App1 workflows to the LAOS in the depicted embodiment.

As shown in element 10330 of the flow diagram of FIG. 38, an application workflow descriptor may be obtained at a LAOS via programmatic interfaces from an LLM-based application developer in various embodiments. The LAOS may set up one or more orchestration agents for the application workflow, e.g., using scalable computing services and/or other services of a cloud provider network (element 10332). For example, an orchestrator agent running at a particular compute instance of a virtualized computing service of the provider network may be assigned for App1. In some embodiments, multiple agents may be set up for App1, with individual ones of the agents being used for handling the invocation of a target LLM (or multiple target LLMs) and a set of plugins in response to respective sets of end user requests. For example, agent-1 may be used to orchestrate processing of end user requests from a first group of end users EUG1, agent-2 may be used to orchestrate processing of end user requests from a second group of end user requests EUG2, and so on.

In at least some embodiments a set of verification operations may be performed with respect to the plugins indicated in the descriptor (element 10334). Such verification operations may include, for example, ensuring that the plugins can be executed remotely (i.e., that connectivity to the resources implementing the plugins is available), permission checking to ensure that the target LLM(s) and/or the agent(s) being used have permissions to invoke the plugins, assignment of resources for certain types of plugins which may require programs to be hosted at cloud resources allocated in advance, and so on.

After the orchestrators have been configured to accept end user requests, and the plugins have been verified, in at least some embodiments end user access to the application may be enabled (element 10336) by the LAOS. For example, network connections to a URL or other network endpoint designated to receive end user input directed to App1 may be accepted. As end user request arrive via the network connections arrive, the corresponding workflows for each end user request may be initiated and orchestrated by the agent—the agent may invoke the target LLM and invoke various plugins as needed during the workflow. Log records of the chain of thought, the invoked plugins, and responses, etc., may be maintained in various embodiments.

The LAOS may monitor metrics collected from the agent(s), target LLM(s), and plugins as end user requests directed to App1 are processed (element 10338). Resources being used for these various components may be adjusted (e.g., scaled up or scaled down) as workload levels change in the depicted embodiment. If and when any of the resources happen to fail, replacement or failover resources may be allocated by the LAOS to ensure that responses to end user requests continue to be provided on a timely basis in various embodiments. In at least some embodiments, the target LLMs (and/or LLMs being used as the agents) may be enhanced over time, e.g., by creating and utilizing in-context learning examples automatically. Customized versions of the agents and/or target LLMs may be deployed based on programmatic input from the developer in some embodiments (element 10340).

In various embodiments, one or more of the kinds of operations of an FMS or LAOS that are described herein may be initiated in response to programmatic requests submitted by customers of the FMS or LAOS. It is noted that some of the operations indicated in the flow diagrams of the various figures discussed herein may be performed in a different order than that shown, and some of the operations may be performed in parallel instead of in the order shown in some embodiments. In at least some embodiments, one or more of the operations shown in a given flow diagram may not be required.

Figure 39:
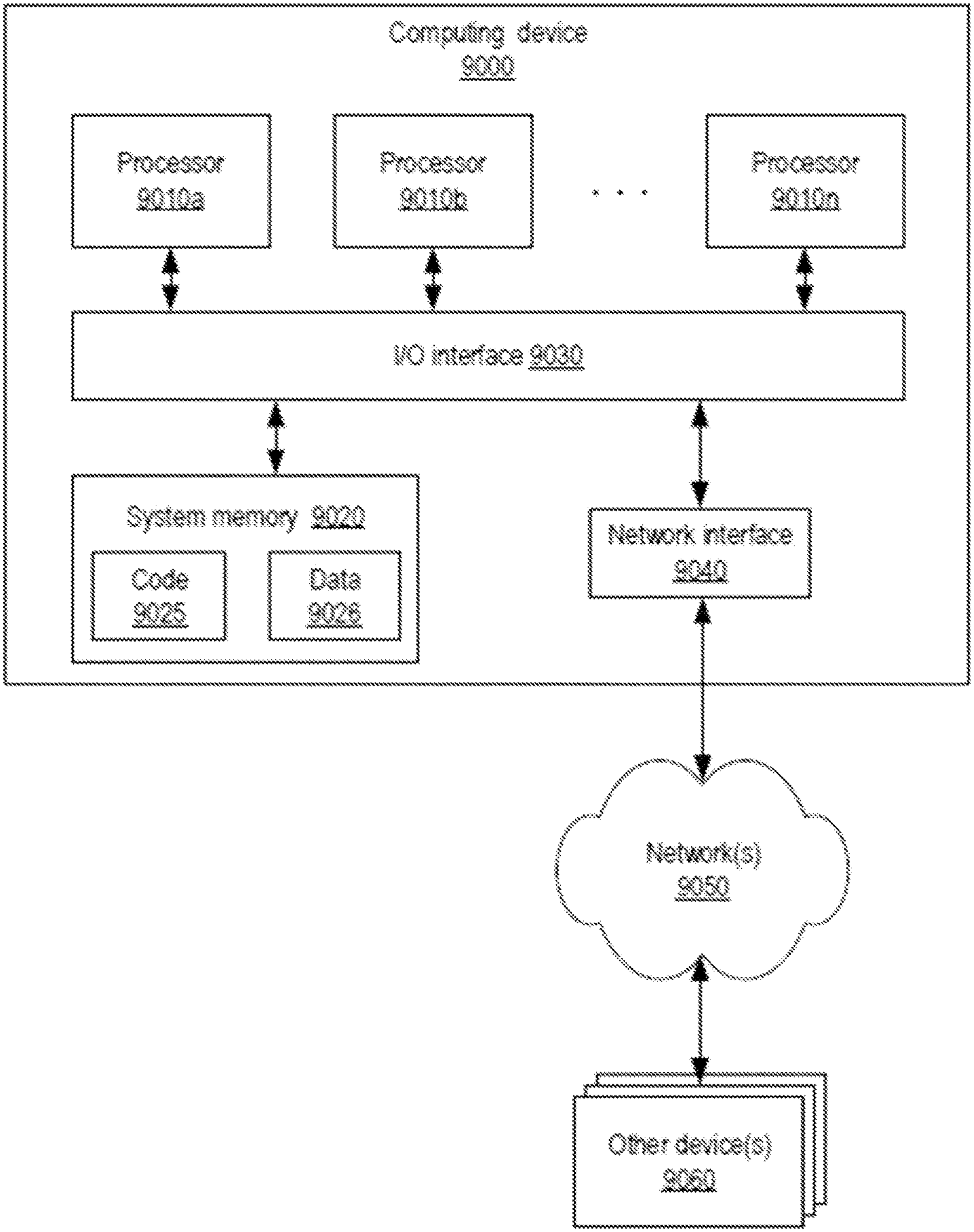
FIG. 39 is a block diagram illustrating an example computing device that may be used in at least some embodiments.

In at least some embodiments, a server that implements the types of techniques described herein (e.g., various functions of an FMS, an LLM-based application orchestration/development service and/or other services of a provider network), may include a general-purpose computer system that includes or is configured to access one or more computer-accessible media. FIG. 39 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random-access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing, or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 8 through FIG. 38, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 8 through FIG. 38. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 39 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

The invention claimed is:

1. At least one non-transitory, computer-readable medium, comprising machine-readable instructions that, when executed by a computing system comprising a processor, cause the computing system to at least:

receive a selection of a foundation model from a plurality of foundation models;

receive action information about an application programming interface (API), the action information comprising an API source location, an API function identifier, a description for when the API function is used, and an API schema;

receive knowledge base information comprising at least one knowledge base data source;

generate an agent prompt based at least in part on the selection of the foundation model, the action information, and the knowledge base information; and deploy an agent configured using the agent prompt.

2. The non-transitory, computer-readable medium of claim 1, wherein the agent is a test agent, the test agent being mutable, and the machine-readable instructions, when executed by the computing system, further cause the computing system to at least create a versioned agent by copying the test agent configured by at least using the agent prompt to execute, the versioned agent being immutable.

3. The non-transitory, computer-readable medium of claim 1, wherein the action information further comprises input parameters and a plain-language description for when to use the API.

4. A system, comprising:

a computing device comprising a processor and a memory; and machine-readable instructions stored in the memory that, when executed by the processor, cause the computing device to at least:

receive a selection of a foundation model from a plurality of foundation models;

receive action information about an application programming interface (API), the action information comprising an API source location, an API function identifier, a description for when the API function is used, and an API schema;

generate an agent prompt based at least on the selection of the foundation model and the action information; and deploy an agent from the foundation model that is configured using the agent prompt.

5. The system of claim 4, wherein the machine-readable instructions, when executed by the processor, further cause the computing device to at least:

receive, from a client device, client input;

send the client input to the agent;

parse an activity request from the agent, wherein the activity request comprises a request to perform an activity on behalf of the agent;

perform the activity on behalf of the agent;

format an activity response from performing the activity; and send the activity response to the agent.

6. The system of claim 5, wherein the activity is invoking the API identified by the action information.

7. The system of claim 6, wherein the action information further comprises input parameters and the API is invoked with one or more values that correspond to the input parameters.

8. The system of claim 5, wherein the machine-readable instructions, when executed by the processor, further cause the computing device to at least:

log the activity request to a conversation history;

log the activity response to the conversation history; and log a client communication request to the conversation history.

9. The system of claim 5, wherein the machine-readable instructions, when executed by the processor, further cause the computing device to at least receive a knowledge base data source, and wherein the activity is retrieving a knowledge base response from the knowledge base data source.

10. The system of claim 5, wherein the machine-readable instructions, when executed by the processor, further cause the computing device to at least:

receive, in response to sending the activity response to the agent, a contextualized response from the agent; and send, to the client device, the contextualized response.

11. The system of claim 10, wherein the client input is a first client input, the activity request is a first activity request, the activity is a first activity, the activity response is a first activity response, the contextualized response is a first contextualized response, and the machine-readable instructions, when executed by the processor, further cause the computing device to at least:

receive, from the client device, a second client input;

send the client input to the agent;

parse a second activity request from the agent, wherein the second activity request comprises a request to perform a second activity on behalf of the agent;

perform the second activity on behalf of the agent;

format, in response to performing the second activity, a second activity response;

send the second activity response to the agent;

receive, in response to sending the second activity response to the agent, a second contextualized response; and send, to the client device, the second contextualized response.

12. The system of claim 5, wherein the client input is a second client input and the machine-readable instructions, when executed by the processor, further cause the computing device to at least:

receive, from the client device, a first client input;

send the first client input to the agent;

receive a contextualized response from the agent indicating that additional information is needed; and send, to the client device, the contextualized response.

13. A computer-implemented method comprising:

receiving a selection of a foundation model from a plurality of foundation models;

receiving action information about an application programming interface (API), the action information comprising an API source location, an API function identifier, a description for when the API function is used, and an API schema;

generating an agent prompt based at least on the selection of the foundation model and the action information; and deploying an agent from the foundation model that is configured using the agent prompt.

14. The computer-implemented method of claim 13, further comprising:

receiving, from a client device, client input;

sending the client input to the agent;

parsing an activity request from the agent, wherein the activity request comprises a request to perform an activity on behalf of the agent;

performing the activity on behalf of the agent;

formatting an activity response from performing the activity; and sending the activity response to the agent.

15. The computer-implemented method of claim 14, wherein the activity is invoking the API identified by the action information.

16. The computer-implemented method of claim 15, wherein the action information further comprises input parameters and the API is invoked with one or more values that correspond to the input parameters.

17. The computer-implemented method of claim 14, further comprising:

logging the activity request to a conversation history;

logging the activity response to the conversation history; and logging a client communication request to the conversation history.

18. The computer-implemented method of claim 14, further comprising receiving a knowledge base data source, and wherein the activity is retrieving a knowledge base response from the knowledge base data source.

19. The computer-implemented method of claim 14, further comprising:

receiving, in response to sending the activity response to the agent, a contextualized response from the agent; and sending, to the client device, the contextualized response.

20. The computer-implemented method of claim 14, wherein the client input is a second client input and the method further comprising:

receiving, from the client device, a first client input;

sending the first client input to the agent;

receiving a contextualized response from the agent indicating that additional information is needed; and sending, to the client device, the contextualized response.

* * * * *